United States Patent
Walters et al.

(10) Patent No.: US 12,350,775 B2
(45) Date of Patent: Jul. 8, 2025

(54) MULTI-JOINING SYSTEM

(71) Applicants: James D. Walters, Aurora, IL (US); Taylor James Hall, Palatine, IL (US); Raymundo Mejia Yera, Round Lake Beach, IL (US)

(72) Inventors: James D. Walters, Aurora, IL (US); Taylor James Hall, Palatine, IL (US); Raymundo Mejia Yera, Round Lake Beach, IL (US)

(73) Assignee: BAM IP Holding LLC, Saint Charles, IL (US)

( * ) Notice: Subject to any disclaimer, the term of this patent is extended or adjusted under 35 U.S.C. 154(b) by 334 days.

(21) Appl. No.: 17/962,111

(22) Filed: Oct. 7, 2022

(65) Prior Publication Data

US 2023/0055340 A1    Feb. 23, 2023

Related U.S. Application Data

(63) Continuation-in-part of application No. 15/881,206, filed on Jan. 26, 2018, now Pat. No. 11,491,601.

(51) Int. Cl.
*B27F 1/00* (2006.01)
*B23P 19/10* (2006.01)

(52) U.S. Cl.
CPC .................... *B23P 19/10* (2013.01)

(58) Field of Classification Search
CPC .... B27F 1/00; B27F 1/005; B27F 1/02; B27F 1/04; B27F 1/08; B27F 1/10; B27F 1/12; B27F 1/16
See application file for complete search history.

(56) References Cited

U.S. PATENT DOCUMENTS 3,109,466 A   11/1963   Jones
3,159,394 A   12/1964   Burns
(Continued)

FOREIGN PATENT DOCUMENTS

CA        2611233 A1    5/2008

OTHER PUBLICATIONS

Stepp, Lewis, "Router Boss Multi-Purpose Routing Jig", *The Craftsman Gallery*, Chipsfly.com (Website), Feb. 19, 2008, PO Box 54101, Cincinnati, Ohio 45254 USA, 3 pages. URL: https://web.archive.org/web/20080219220902/https://www.chipsfly.com/.
(Continued)

*Primary Examiner* — Matthew Katcoff
(74) *Attorney, Agent, or Firm* — Reinhart Boerner Van Deuren P.C.

(57) ABSTRACT

A template holding jig for holding a template for use with a router for routing a workpiece is provided. The holding jig may also be part of a workpiece joining jig that includes a plurality of templates. The template holding jig includes a template support, a workpiece support and a template guide. The template support defines a template support plane. The workpiece support defines a workpiece support plane extending perpendicular to the template support plane. The template guide defines at least one abutment preventing motion of a template located on the template support parallel to a first axis being parallel to the workpiece support plane and parallel to the template support plane. The at least one abutment permits motion of the template parallel to a second axis being orthogonal to the workpiece support plane and perpendicular to the first axis and parallel to the template support plane.

26 Claims, 68 Drawing Sheets

(56) References Cited

U.S. PATENT DOCUMENTS

| | | | |
|---|---|---|---|
| 3,764,126 | A | 10/1973 | Arenas |
| 3,800,840 | A | 4/1974 | McCord, Jr. |
| 3,834,435 | A | 9/1974 | McCord, Jr. |
| 3,878,875 | A | 4/1975 | McCord, Jr. |
| 3,880,047 | A | 4/1975 | Dosier |
| 4,137,003 | A | 1/1979 | Budoff |
| 4,373,562 | A | 2/1983 | Vernon |
| 4,405,004 | A | 9/1983 | Dicke |
| 4,407,344 | A | 10/1983 | Dicke |
| D272,038 | S | 1/1984 | Dicke |
| 4,428,408 | A | 1/1984 | Grisley |
| 4,479,523 | A | 10/1984 | Peterson et al. |
| 4,561,478 | A | 12/1985 | Fields |
| 4,607,673 | A | 8/1986 | McCord, Jr. |
| 4,749,013 | A | 6/1988 | Ducate, Sr. |
| 4,809,755 | A | 3/1989 | Pontikas |
| 4,821,365 | A | 4/1989 | Charters |
| 4,995,435 | A | 2/1991 | Godfrey |
| 5,123,463 | A | 6/1992 | Grisley |
| 5,285,832 | A | 2/1994 | Gibson |
| 5,421,384 | A | 6/1995 | Nuwordu |
| 5,423,357 | A | 6/1995 | Szymanski |
| 5,492,160 | A | 2/1996 | McCracken |
| 5,494,089 | A | 2/1996 | Lubbe |
| 5,598,878 | A | 2/1997 | Wirth, Jr. et al. |
| 5,692,861 | A | 12/1997 | Stottmann |
| 5,711,356 | A | 1/1998 | Grisley |
| 5,832,977 | A | 11/1998 | Hampton |
| 5,931,208 | A | 8/1999 | Gifkins |
| 6,012,497 | A | 1/2000 | Stottmann |
| 6,032,706 | A | 3/2000 | Lear |
| 6,076,575 | A | 6/2000 | Harkness |
| 6,315,017 | B1 | 11/2001 | Stottmann |
| 6,357,194 | B1 | 3/2002 | Jones, Jr. |
| 6,736,173 | B1 | 5/2004 | Grisley et al. |
| 6,799,615 | B2 | 10/2004 | Smith |
| 6,899,152 | B2 | 5/2005 | Godfrey |
| 6,954,979 | B2 | 10/2005 | Logan |
| D559,287 | S | 1/2008 | McDaniel et al. |
| D559,875 | S | 1/2008 | McDaniel et al. |
| D560,235 | S | 1/2008 | McDaniel |
| D569,882 | S | 5/2008 | McDaniel et al. |
| D571,836 | S | 6/2008 | McDaniel |
| D573,615 | S | 7/2008 | McDaniel |
| D577,752 | S | 9/2008 | McDaniel et al. |
| 7,434,604 | B2 | 10/2008 | McDaniel et al. |
| 7,455,089 | B2 | 11/2008 | McDaniel et al. |
| 7,507,060 | B2 | 3/2009 | Grisley |
| 7,654,181 | B2 | 2/2010 | Quinlan |
| 7,658,214 | B2 | 2/2010 | McDaniel |
| 7,703,488 | B1 | 4/2010 | Douglas |
| 7,819,146 | B2 | 10/2010 | McDaniel |
| 7,857,020 | B2 | 12/2010 | McDaniel |
| 7,896,041 | B2 | 3/2011 | Becker et al. |
| 8,016,005 | B1 | 9/2011 | Weinstein |
| 8,156,973 | B2 | 4/2012 | Stepp |
| 8,256,475 | B2 | 9/2012 | Grisley |
| 9,375,860 | B2 | 6/2016 | Grisley |
| 9,707,695 | B2* | 7/2017 | Grisley ............... B27F 1/12 |
| D795,317 | S | 8/2017 | Wenning et al. |
| 10,016,868 | B2 | 7/2018 | Sheldon et al. |
| 10,363,643 | B2* | 7/2019 | Grisley ............... B27F 5/02 |
| 10,639,754 | B2 | 5/2020 | Sheldon et al. |
| D924,513 | S | 7/2021 | Owens et al. |
| 2004/0025602 | A1 | 2/2004 | Norton |
| 2006/0249228 | A1* | 11/2006 | Hout ................ B27F 1/12 144/144.1 |
| 2010/0000631 | A1 | 1/2010 | Van Valkenburg |
| 2011/0146844 | A1 | 6/2011 | Becker et al. |
| 2014/0064868 | A1 | 3/2014 | Clark |
| 2020/0206856 | A1 | 7/2020 | Sheldon et al. |

OTHER PUBLICATIONS

Marshall, Chris, "Five Box Joint Jig Reviews", *Woodworker's Journal* (Website), Jan. 19, 2018, 22 pages. URL: www.woodworkersjournal.com/boc-joint-jig-reviews.

Gibson, Kerry, "Router Boss Multi-Purpose Routing Jig", *The Craftsman Gallery* (Manual), Sep. 2009, PO Box 54101, Cincinnati, Ohio 45254 USA, 74 pages.

Henn, Guido; *Workshop Training for Woodwork, Router Manual, Choose, Operate, Master* (Book), Apr. 2011, Vincentz, Plannerstrasse 4c 30175 Hannover, 26 pages. URL: www.HolzWerken.net.

"Rockler's Complete Dovetail Jig with Dovetail Jig Dust Collector Combo", *Rockler Companies, Inc.* (Website), last visited Jan. 5, 2023, 4 pages. URL: https://www.rockler.com/rockler-s-complete-dovetail-jig-with-dovetail-jig-dust-collector-combo-offer?country=US&sid=V91040&promo=shopping&utm_source=google&utm_medium=cpc&utm_term=&utm_content=pla&utm_campaign=PL&gclid=EAlaIQobChMI38qp5M-w_AIIVvhXUAR3ciQEREAQYBiABEglOSfD_BwE.

"Leigh D4R Pro Dovetail Jig", *Leigh Industries* (Website), last edited Jun. 27, 2014, last visited Jan. 5, 2023, 15 pages. URL: https://www.leightools.com/d4r-pro-overview.

"Leigh RTJ400 Router Table Dovetail Jig", *Leigh Industries* (Website), last edited Jan. 30, 2015, last visited Jan. 5, 2023, 10 pages. URL: https://www.leightools.com/rtj400-overview/.

"Leigh FMT Pro Mortise & Tenon Jig", *Leigh Industries* (Website), last edited Jan. 20, 2016, last visited Jan. 5, 2023, 18 pages. URL: https://www.leightools.com/fmt-pro-overview/.

"Super FMT Mortise & Tenon Jig", *Leigh Industries* (Website), last edited Oct. 3, 2009, last visited Jan. 5, 2023, 6 pages. URL: https://www.leightools.com/super-fmt-overview/.

"Mastery Joinery Dovetail Set", *MLCS Ltd.* (Website), last visited Jan. 5, 2023, 5 pages. URL: https://www.mlcswoodworking.com/shopslte_sc/store/html/smarthtml/pages/dovetailjig.html.

"Welcome to Pantorouter® Woodworking Machine", *PantoRouter* (Website), last visited Jan. 6, 2023, 9 pages. URL:https://www.pantorouter.com/?gclid=EAlaIQobChMIyYGX5M2w_AIVIDetBh1lUwEUEAAYASAAEglsQPD_BwE.

"Rockler Complete Dovetail Jig", *Rockler Companies, Inc.* (Website), last visited Jan. 6, 2023, 3 pages URL: https://www.rockler.com/rockler-s-complete-dovetail-jig.

"Porter Cable Dovetail Jig", *Porter-Cable* (Website), last visited Jan. 6, 2023, 5 pages. URL: https://www.portercable./com/product/4216/12-deluxe-dovetail-jig-combination-kit.

"Leigh Super Jigs Dovetail Jigs", *Leigh Industries* (Website), last visited Jan. 6, 2023, 13 pages. URL:https://www.leightools.com/super-jigs-overview.

"VRS Vacuum & Router Support", *Leigh Industries* (Website), last visited Jan. 6, 2023, 6 pages. URL: https://www.leightools.com/vrs-vacuum-router-support/.

"Leigh VRS1200 Vacuum & Router Support for Porter-Cable 4200 Dovetail Jigs", *Leigh Industries* (Website), last visited Jan. 6, 2023, 7 pages. URL: https://www.leightools.com/vrs1200-vacuum-router-support-details/.

"12-1/2" Deluxe Dovetail Jig With Half-Blind Template", *Woodcraft Supply LLC* (Website), last visited Jan. 6, 2023, 6 pages. URL: https://www.woodcraft.com/products/13-inch-dovetail-jig-blind-template-woodriver.

"Dovetail Jig", *Harbor Freight Tools* (Website), last visited Jan. 6, 2023, 7 pages. URL: https://www.harborfreight.com/dovetail-machine-34102.html?utm_source=google&utm_medium=cpc&utm_campaign=12126402660&campaignid=12126402660&utm_content=118354992673&adsetid=118354992673&product=34102&store=&gclid=EAlaIQobChMI35mQnNWw_AIVihXUAR3tlAEaEAQYAvABEqLyyvD_BwE.

"Peachtree Dovetail Jig Master System", *Peachtree Woodworking Supply, Inc* (Website), last visited Jan. 6, 2023, 7 pages. URL: https://www.ptreeusa.com/rtr_jigs_dovetail_wiz.html.

(56) References Cited

OTHER PUBLICATIONS

"E-Z Pro Dovetailer II Dovetail Jig", *General Tools & Instruments LLC* (Website), last visited Jan. 6, 2023, 4 pages. URL: https://generaltools.com/e-z-pro-dovetailer-ii-dovetail-jig.

"Multi-Router", *Woodpeckers* (Website), last visited Jan. 6, 2023, 5 pages. URL: https://www.woodpeck.com/multi-router-group.html.

"Workstation", *Shaper Tools, inc.* (Website), last visited Jan. 6, 2023, 12 pages. URL: https://www.shapertools.com/en-us/workstation/overview.

"CDJ300—Craft Dovetail Jig 300mm 1/4-inch shank", *Trend Tool Technology Ltd* (Website), last visited Jan. 6, 2023, 2 pages. URL: https://www.trend-uk.com/cdj300-craft-dovetail-jig-3000mm-1-4-inch-shank.

"U*MT/JIG—Mortise and Tenon Jig", *Trend Tool Technology Ltd* (Website), last visited Jan. 6, 2023, 2 pages. URL: https://www.trend-usa.com/u-mt-jig-mortise-and-tenon-jig.

"E-Z Pro Aluminum Mortise & Tenon Jig Kit", *General Tools & Instruments LLC* (Website), last visited Jan. 6, 2023, 4 pages. URL: https://generaltools.com/e-z-pro-aluminum-mortise-tenon-jig-kit.

"Plantillas De Cola De Milano Porter Cable 4216 Super Jig", *mercadolibre* (Website), last visited Jan. 6, 2023, 7 pages. URL: https://articulo.mercadolibre.com.mx/MLM-842558546-plantillas-de-cola-de-milano-porter-cable-4216-super-jig-_JM.

"ENT Cutter Set with Dovetail Template—Imperial Scale", *sauter GmbH* (Website), last visited Jan. 6, 2023, 3 pages. https://www.sautershop.com/ent-router-bit-set-dovetail-template-e-09041.

"Milescraft 1218 Dove Tail Template Master—Create an Endless Array of Project-specific Dovetail Jigs with Your Router", Amazon.com (Website), last visited Jan. 6, 2023, 9 pages. https://www.amazon.com/Milescraft-1218-Endless-Project-specific-Dovetail/dp/B079Y3PJ1C/ref=asc_df_B079Y3PJ1C/?tag=hyprod-20&linkCode=df0&hvadid=344024281175&hvpos=&hvnetw=q&hvrand=13839696276657505774&hvpone=&hvptwo=&hvgmt=&hvdev=c&hvdvcmdl=&hvlocint=&hvlocphy=9021509&hvtargid=pla-751450714793&psc=1&tag=&ref=&adgrpid=69357499375&hvpone=&hvptwo=&hvadid=344024281175&hvpos=&hvnetw=g&hvrand=13839696276657505774&hvgmt=&hydev=c&hvdvcmdl=&hvlocint=&hvlocphy=9021509&hvtargid=pla-751450714793.

"CMT300 Universal Dovetail Jig", Amazon.com (Website), last visited Jan. 6, 2023, 7 pages. URL: https://www.amazon.com/CMT-CMT300-Universal-Dovetail-Jig/dp/B000Q97YPY/ref=pd_lpo_1?pd_rd_i=B000Q97YPY&psc=1.

* cited by examiner

MULTI-JOINING SYSTEM

CROSS-REFERENCE TO RELATED PATENT APPLICATIONS

This patent application is a continuation-in-part of U.S. patent application Ser. No. 15/881,206, filed Jan. 26, 2018, the entire teachings and disclosure of which are incorporated herein by reference thereto.

FIELD OF THE INVENTION

This invention generally relates to jigs for use with routers and particularly jigs for supporting templates and workpieces.

BACKGROUND OF THE INVENTION

Routers are often used by woodworkers to form recesses, pockets or connectors in workpieces to connect the workpieces together. To provide accurate and precise connection of the multiple workpieces, it is important to accurately guide the motion of the router as it routes the workpieces to form the recesses or pockets that receive connectors or to directly form the connectors in the workpieces themselves.

Currently a large number of connections are available to connect workpieces including, but not limited to: dovetails, box joints, mortise and tenon, dowels, biscuits, dominos, butterfly, etc. Unfortunately, each of these connections typically use individual structures to help form the appropriate structures in the workpieces to allow for the various connections to be made. This can be very expensive as well as take up a significant amount of space within a woodworker's workshop.

The present invention provides improvements over the current state of the art.

BRIEF SUMMARY OF THE INVENTION

The present invention provides a new and improved template holding jig as well as a new and improved workpiece joining jig. The template holding jig can properly orient a workpiece relative to a template. The template is removable from the template holding jig so that a different template may be used for a different type of guided motion of a router.

In an embodiment, a template holding jig for holding a template for use with a router for routing a workpiece is provided. The template holding jig includes a template support, a workpiece support and a template guide. The template support defines a template support plane. The workpiece support defines a workpiece support plane extending perpendicular to the template support plane. The template guide defines at least one abutment preventing motion of a template located on the template support parallel to a first axis being parallel to the workpiece support plane and parallel to the template support plane. The at least one abutment permits motion of the template parallel to a second axis being orthogonal to the workpiece support plane and perpendicular to the first axis and parallel to the template support plane.

In one embodiment, the at least one abutment of the template guide is provided by first and second walls that are parallel to one another and spaced apart from one another parallel to the first axis. The first and second walls are offset from the template support plane parallel to a third axis that is parallel to the workpiece support plane and perpendicular to the first and second axes.

In one embodiment, the first and second walls are positioned at opposite first and second ends of the template support with the template support being positioned between the first and second walls. This provides channel therebetween in which a template may be positioned.

In one embodiment, the template holding jig includes a template attachment for affixing a template to the template support. The template attachment has a first configuration securing the template to the template support such that the template is affixed to and cannot be moved relative to the template support and a second configuration that allows the template to be moved relative to the template support parallel to the second axis.

In one embodiment, the template attachment is a bolt extending parallel to a third axis being orthogonal to the template support plane and a releasable nut. The nut and template support sandwiching the template therebetween when the template attachment is in the first configuration and a template is mounted thereto.

In one embodiment, a portion of the template support that defines the template support plane is an exterior surface of the template support. A portion of the workpiece support that defines the workpiece support plane is an exterior surface of the workpiece support. The exterior surface of the template support does not extend beyond the exterior surface of the workpiece support. The template support plane and the workpiece support plane have an exterior angle of 270 degrees therebetween. This forms an L-shape configuration with the exterior surfaces being on the outsides of the L-shape (e.g. left side and bottom side of the L-shape).

In one embodiment, first and second workpiece side stops are mounted adjacent the workpiece support. The first and second workpiece side stops are adjustably positionable parallel to the first axis relative to the workpiece support to adjust spacing between the first and second workpiece side stops to accommodate different sized workpieces. The side stops position a workpiece relative to the template support along the workpieces support plane parallel to the first axis.

In one embodiment, first and second workpiece side stop mounts selectively fix the position of the first and second workpiece side stops relative to the workpiece support. The mounts may be releasable to allow for adjusting the position of the first and second workpiece side stops.

In one embodiment, a clamp attaches to the first workpiece side stop. The clamp is movable with the first workpiece side stop relative to the workpiece support. The clamp is actuatable to provide a force orthogonal to the workpiece support plane to a workpiece being supported by the workpiece support positioned adjacent the first workpiece side stop.

In one embodiment, a miter fence defines first and second miter abutments defining first and second miter abutment planes. The first miter abutment plane extends orthogonally relative to the workpiece support plane and at a 45 degree angle to the template support plane. The second miter abutment plane extends orthogonal to the first miter abutment plane and orthogonally relative to the workpiece support plane and at a 45 degree angle to the template support plane. The miter fence being fixably attachable adjacent to the workpiece support.

In one embodiment, a position of the template support is adjustably fixable relative to the miter fence parallel to a third axis being parallel to the workpiece support plane and perpendicular to the first and second axes and orthogonal to the template support plane.

In one embodiment, first and second workpiece support guides are attached to the miter fence. The first and second workpiece support guides being spaced a part parallel to the first axis forming a gap therebetween. The workpiece support being positioned between and in abutment with the first and second workpiece support guides.

In one embodiment, the first and second workpiece support guides and miter fence form a support base that is releasably attachable to the workpiece support and template support. The support base may be clamped to a workbench to support the workpiece support and template support relative to the workbench.

In one embodiment, first and second clamps attach to the miter fence. The first clamp is actuatable to provide a force orthogonal to the workpiece support plane between the template support plane and the first miter abutment plane. The second clamp is actuatable to provide a force orthogonal to the workpiece support plane between the template support plane and the second miter abutment plane.

In one embodiment, the at least one abutment of the template guide is provided by first and second walls that are parallel to one another and spaced apart from one another along the first axis. The first and second miter abutment planes intersect at an intersection that is centered between the first and second walls along the first axis.

In one embodiment, the template holding jig includes a void formed by the template support and the workpiece support proximate the intersection of the template support plane and the workpiece support plane.

In one embodiment, a sacrificial support piece is located within the void.

In one embodiment, one side of the sacrificial support piece forms part of the workpiece support plane and supports a workpiece when mounted to the workpiece support plane. In a more particular embodiment, a second side of the sacrificial support piece forms part of the template support plane and supports a template when mounted thereto.

In one embodiment, the sacrificial support piece is replaceable.

In one embodiment, a sacrificial support piece is releasably mounted to the workpiece support against the workpiece support plane. The sacrificial support defines a second workpiece support plane offset from and parallel to the workpiece support plane defined by the workpiece support.

In one embodiment, a clamp for securing the workpiece against the second workpiece support plane defined by the sacrificial support piece is provided.

In another embodiment, a workpiece joining jig for use with a router for joining workpieces is provided. The workpiece joining jig includes a template holding jig as outlined above and a first template. The first template is removably mountable to the template support in abutment with the template guide. The first template is fixed to the template guide and template support when the first template is mounted to the template support and the template attachment is in the first configuration. The template guide could be provided the template attachment. The template guide properly aligns a mounted template for precision operation.

In one embodiment, the first template is movable relative to the template guide and template support when the first template is mounted to the template support and the template attachment is in the second configuration.

In one embodiment, the first template has a first router guide region configured to guide motion of a router relative to the first template in a first predetermined manner such that the router may engage a workpiece mounted to a workpiece support. The system further includes a second template removably mountable to the template support in abutment with the template guide. When used, the second template is fixed to the template guide and template support when the second template is mounted to the template support and the template attachment is in the first configuration. The second template has a second router guide region configured to guide motion of a router relative to the second template in a second predetermined manner such that the router may engage a workpiece mounted to the workpiece support. The second predetermined manner is different than the first predetermined manner such that the router will engage a workpiece in a different manner than when using the first template.

In one embodiment, the first router guide region is at least one circular hole extending through a first body of the of the first template permitting axial motion of the router parallel to a central axis of the hole through the first body. The central axis of the hole is perpendicular to the first and second axes and the template support plane and parallel to the workpiece support plane. The at least one hole prevents motion of the router parallel to the template support plane when engaged with the router. Typically, the hole is sized to the outer diameter of a guide bushing of a router. This prevents slop therebetween. The second router guide region is an elongated slot formed in and extending through a second body of the second template. The elongated slot permits axial motion of the router parallel to the second axis and parallel to the template support plane and orthogonal to the workpiece support plane. The elongated slot prevents motion of the router parallel to the first axis when engaged with the router. Typically, the elongated slot would engage the guide bushing. The elongated slot may be U-shaped and be open ended in some forms.

In one embodiment, the at least one abutment of the template guide is provided by first and second walls that are parallel to one another and spaced apart from one another parallel to the first axis. The first and second walls are offset from the template support plane parallel to a third axis being parallel to the workpiece support plane and perpendicular to the first and second axes and the template support. The first template includes first and second spaced apart abutments configured to abut the first and second walls to prevent movement of the first template parallel to the first axis when the first template is mounted to the template support. The spaced apart walls may be sides of the template when a rectangular template body is used. The first and second abutments permit movement of the first template parallel to the second axis when the template attachment is in the second configuration. The second template includes third and fourth spaced apart abutments configured to abut the first and second walls to prevent movement of the second template parallel to the first axis when the second template is mounted to the template support. The spaced apart walls may be sides of the template when a rectangular template body is used. The third and fourth abutments permit movement of the second template parallel to the second axis when the template attachment is in the second configuration.

In one embodiment, the at least one abutment of the template guide is provided by first and second walls that are parallel to one another and spaced apart from one another parallel to the first axis, the first and second walls being offset from the template support plane parallel to a third axis being parallel to the workpiece support plane and perpendicular to the first and second axes. The first template includes first and second spaced apart abutments configured to abut the first and second walls to prevent movement of the first template parallel to the first axis when the first template is mounted to the template support. The first and second abutments permit movement of the first template parallel to the second axis when the template attachment is in the second configuration.

In one embodiment, the first and second walls face each other along the first axis and the first and second spaced apart abutments face away from one another along the first axis.

In one embodiment, the workpiece joining jig includes a miter fence as outlined above. The miter fence maybe releasably attachable adjacent to the workpiece support.

In one embodiment a template holding jig for holding a template for use with a router for routing a workpiece is provided. The template holding jig is mounted to a worksurface of a workbench. The template holding jig includes a base having a bottom face for resting on the worksurface. The template holding jig includes a template support for supporting a template, the template support is spaced apart from the base. A first sidewall frame extends between the template support and base. A first side panel has a first face. The first side panel is transitionable between an open state in which the first face is aligned with the bottom face and a closed state wherein the first face is not aligned with the bottom face. A second sidewall frame extends between the template support and base. The second sidewall frame is laterally spaced apart from the first sidewall frame. A second side panel has a second face. The second side panel is transitionable between an open state in which the second face is aligned with the bottom face and the first face and a closed state wherein the second face is not aligned with the bottom face. A workpiece support extends orthogonal to the template support and between the first sidewall frame and the second sidewall frame.

In one embodiment the first side panel is selectively fixable in the closed state relative to the first sidewall frame with a first closing arrangement and the second side panel is selectively fixable in the closed state relative to the second sidewall frame with a second closing arrangement.

In one embodiment the first and second closing arrangements each include a first eyelet on a first side of the sidewall frame. A second eyelet is located on an opposite second side of the sidewall frame. A hollow cylinder is located on an end of the side panel. A closing pin extends through the second eyelet, the hollow cylinder, and through the first eyelet to fix the corresponding side panel to the corresponding sidewall frame in the closed state.

In one embodiment each closing pin includes a first arm and a second arm extending from the first arm at an angle. The first arm extends through the first and second eyelets and hollow cylinder when in the closed state. A retainer is located on each of the first and second sidewall frames. A second arm is snap fit into the retainer to secure the closing pin in the first and second eyelets and the hollow cylinder. A closing pin rotates about the first arm to snap engage the second arm within the retainer.

In one embodiment the first side panel is pivotably connected to the base with a first hinge arrangement and the second side panel is pivotably connected to the base with a second hinge arrangement.

In one embodiment the first hinge arrangement and the second hinge arrangement each include a channel at a second end of the side panel. A pin is operably secured to the base and extends generally parallel to the bottom of the base. The pin is seated in the channel. The side panel is free to pivot about the pin between the open and closed states while maintaining the pivotal connection between the side panel and the base.

In one embodiment the first sidewall frame defines a first side panel receiving opening that receives the first side panel to a greater extent when the first side panel is in the closed state as compared to when the first side panel is in the open state. The second sidewall frame defines a second side panel receiving opening that receives the second side panel to a greater extent when the second side panel is in the closed state as compared to when the second side panel is in the open state.

In one embodiment the bottom, first face, and second face are coplanar when in the open state.

In one embodiment the base defines a flat plane. The flat plane is coplanar with the first face and the second face in the open state.

In one embodiment in the closed state a first closing arrangement selectively secures a first end of the first side panel to the first sidewall frame. A second closing arrangement selectively secures a first end of the second side panel to the second sidewall frame. A first hinge arrangement pivotably connects a second end of the first side panel to the base. A second hinge arrangement pivotably connects a second end of the second side panel to the base.

In one embodiment a template guide defines at least one abutment preventing motion of the template located on the template support parallel to a first axis being parallel to the workpiece support plane defined by the workpiece support and parallel to a template support plane defined by the template support but permitting motion of the template parallel to a second axis being orthogonal to the workpiece support plane and perpendicular to the first axis and parallel to the template support plane. A third axis is parallel to the workpiece support plane and perpendicular to the first and second axes. A first channel is defined by the workpiece support. The first channel is T-shaped in cross section. The first channel extends parallel to the first axis. A second channel is defined by the workpiece support. The second channel is T-shaped in cross section. The second channel extends parallel to the first sidewall. The first channel is spaced apart from the second channel in a direction along the third axis.

In one embodiment a clamp for clamping a workpiece to the template support is provided. The clamp is mounted to the workpiece support with at least one fastener for selectively fixing the position of the clamp relative to the workpiece support. The at least one fastener has a head portion received in the first or the second channel. The head portion is sized to limit rotation of the head portion within the first or the second channel but permits axial sliding within the first or second channel parallel to the first axis.

In one embodiment the clamp is a workpiece side stop.

In one embodiment a threaded portion of the fastener extends from the head through the first workpiece stop. A knob is threaded to the threaded portion of the fastener. The knob portion is rotatable to move the knob in directions parallel to the second axis along the threaded portion to selectively fix the position of the first workpiece side stop between the knob and the workpiece support and rotatable to release the first workpiece side stop.

In one embodiment the workpiece side stop is adjustably positionable parallel to the first axis along the workpiece support by rotating the head to loosen the fastener such that the fastener is moveable within the first channel or the second channel in directions parallel to the first axis. The workpiece stop moves with the fastener.

In one embodiment the workpiece side stop defines at least one slot having a major axis and a minor axis. The workpiece side stop has a first orientation wherein the major axis of the at least one slot is aligned perpendicular to the first channel or the second channel and the at least one fastener extends through the at least one slot such that the workpiece side stop is movable in directions parallel to the third axis to selectively fix the workpiece side stop.

In one embodiment the workpiece side stop has a second orientation. The major axis of the at least on slot is aligned parallel to the first channel or the second channel such that the workpiece stop is moveable in directions parallel to the first axis along the workpiece support without having to move the at least one fastener in the same directions.

In one embodiment a second slot is spaced apart and extends parallel to the at least one slot. A second fastener selectively fixes the workpiece side stop together with the at least one fastener. The head of the first fastener is in the first channel and the second fastener has a head in the first or the second channel. The second fastener extends through the second slot. The second fastener has a second threaded portion received in a knob of the second fastener. The second fastener is moveable within the first channel or the second channel in directions parallel to the first axis to move the workpiece stop in directions parallel to the first axis.

In one embodiment a second slot is spaced apart and extends parallel to the at least one slot. A second fastener selectively fixes the workpiece side stop together with the at least one fastener. The head of the first fastener is in the first channel and the second fastener has a second head in the second channel. The second fastener extends through the second slot and has a second threaded portion received in a second knob.

In one embodiment a miter fence with at least one clamp for clamping a workpiece to the template support for routing the workpiece is provided. The miter fence is mounted to the workpiece support with at least one fastener for selectively fixing the position of the miter fence relative to the workpiece support. The at least one fastener has a head portion in the first or the second channel.

In one embodiment the fastener extends from the head portion through a first slot of the miter fence. A threaded portion of the fastener is received in a knob portion. The knob portion is removable from the threaded portion and rotatable to move the knob in directions parallel to the second axis to selectively fix the position of the miter fence between the knob and the workpiece support.

In one embodiment the miter fence is movable in directions parallel to the third axis to selectively fix the miter fence to the workpiece support.

In one embodiment the miter fence has a second slot extending along a same axis as a major axis of the first slot. The first slot receives a first fastener extending from the first channel. The second slot receives a second fastener extending from the second channel.

In one embodiment a workpiece joining jig assembly includes a template holding jig for holding a template for use with a router for routing a workpiece. The template holding jig includes a template support that defines a template support plane. A workpiece support defines a workpiece support plane extending perpendicular to the template support plane. A template guide defines at least one abutment preventing motion of the template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane.

In one embodiment a template attachment attaches a template to the template support and prevents movement of the template in directions parallel to a third axis. The third axis is parallel to the workpiece support plane and perpendicular to the first and the second axes.

In one embodiment a micro-adjustment arrangement connecting the template support to the template. The micro-adjustment arrangement is actuatable to provide a force orthogonal to the workpiece support plane and parallel to the second axis to move the template in directions parallel to the second axis.

In one embodiment the micro-adjustment arrangement includes a micro-adjustment abutment wall defining a receptacle. A micro-adjustment threaded screw has a head at a first end seated in the receptacle and a threaded second end threadingly engaged with the template.

In one embodiment rotation of the micro-adjustment threaded screw in a first rotational direction moves the template in a first linear direction parallel to the second axis. Rotation of the micro-adjustment threaded screw in a second rotational direction that is opposite the first rotational direction moves the template in a second linear direction opposite to the first linear direction and parallel to the second axis.

In one embodiment the micro-adjustment abutment wall of the micro-adjustment arrangement is fixed to a side of the template support facing away from the workpiece support plane.

In one embodiment the head of the micro-adjustment threaded screw has a first head portion and a second head portion axially spaced from the first head portion. A groove is defined between the first and second head portions. The groove is received in a receptacle of the micro-adjustment abutment wall such that rotation in a first direction causes the first head portion top push against a first side of the abutment wall to generate a force on the template in a first linear direction. Rotation in a second direction causes the second head portion to push against a second, opposite, side of the abutment wall to generate a force on the template in a second linear direction.

In one embodiment the receptacle is u-shaped in cross section and is positioned offset from the template support plane along the third axis.

In one embodiment the template attachment includes a first and a second slot defined in the template support. The first and the second slot extend through a top surface of the template support and a bottom surface of the template support. The template attachment includes a first and a second template fastener. Each first and second template fastener has a head sized to prevent its passing through the slots. The heads are located on the bottom side of the template support. A first and a second threaded hole provided by the template are spaced to match a distance between the pair of slots. The first template fastener has a first threaded portion inserted from the bottom of the template support through the first slot and is threadingly received in the first threaded hole of the template to attach the template to the template support. The second template fastener has a second first threaded portion inserted from the bottom of the template support through the second slot and is threadingly received in the second threaded hole of the template to attach the template to the template support.

In one embodiment the template attachment has a first state wherein the fasteners are threadingly received into the template such that the template is moveable in directions parallel to the second axis via a micro-adjustment arrangement.

In one embodiment the template arrangement has a second state wherein the template is fixed and cannot move.

In one embodiment a workpiece joining jig assembly is provided. The workpiece joining jig assembly includes a template holding jig for holding a template for use with a router for routing a workpiece. The template holding jig includes a template support defining a template support plane. A workpiece support defines a workpiece support plane extending perpendicular to the template support plane. A template guide defines at least one abutment preventing motion of the template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane. A template attachment attaches a template to the template support. A vacuum arrangement includes a cavity defined by a top surface of the template support and a bottom surface of the template. The vacuum arrangement defines a flow path for a flow of dust from the workpiece through an inlet of the cavity and an outlet of the cavity.

In one embodiment the outlet is a vacuum aperture forming part of the vacuum arrangement and extending through the top surface of the template support and a bottom surface of the template support.

In one embodiment the vacuum aperture is connected to and in fluid communication with a coupling configured for fluid communication with a source of vacuum. The coupling forms part of the vacuum arrangement.

In one embodiment there is a fluid flow path through the inlet of the cavity, through the outlet of the cavity, and through the coupling.

In one embodiment the coupling is attached to the bottom surface of the template support and surrounds the vacuum aperture.

In one embodiment the template includes at least one router guide region through which a router bit extends in use. The inlet of the cavity is defined by at least one port in fluid communication with the router guide region.

In one embodiment the at least one port includes a plurality of ports. Each one of the plurality of ports is defined by a wall. The wall defines a height of the cavity and extends from the bottom surface of the template to a bearing surface of the template.

In one embodiment the bearing surface bears against the top surface of the template support.

In one embodiment the template includes a plurality of router guide regions through which a router bit extends in use. The inlet of the cavity is defined by a plurality of ports. Each router guide region has a corresponding port in fluid communication therewith. The cavity includes a collection region and a plurality of flow passages. The fluid flow passages fluidly connecting the plurality of ports with the collection region.

In one embodiment the collection region, flow passages, and ports define a dust collection manifold, the manifold is defined by a wall.

In one embodiment the collection region at least partially covers the vacuum aperture. The flow path extending from the collection region through the vacuum aperture through the coupling.

In one embodiment the router guide regions are in the form of through holes extending through the top surface of the template and the bottom surface of a template for receiving a router bit there through.

In one embodiment a continuous wall extends around the plurality of through holes and the continuous wall defines the plurality of ports, the flow passages, and the collection region, the wall defining a height of the cavity and extending from the bottom surface of the template to a bearing surface of the template.

In one embodiment wherein the flow path extends from the plurality of through holes, through the plurality of ports, through the flow passages, through the collection region, through the vacuum aperture, and through the coupling, the coupling configured for connection to a source of vacuum and extending the flow path into the source of vacuum.

In one embodiment the router bit receiving regions are in the form of elongated open ended slots that extend through the top surface of the template and the bottom surface of a template for receiving a router bit there through. Each open ended slot has a corresponding port from the plurality of ports associated therewith. Each corresponding port is located at an opposite end of the open end of the open ended slot.

In one embodiment the ports, collection region, and flow passages are formed from a plurality of wall portions forming a discontinuous wall. The wall portions of the discontinuous wall define a height of the cavity and extend from the bottom surface of the template to a bearing surface of the template.

In one embodiment the flow path extends from the plurality of open ended slots, through the plurality of ports, through the flow passages, through the collection region, through the vacuum aperture, and through the coupling. The coupling is configured for connection to a source of vacuum.

In one embodiment the template support includes a first through slot having a major axis extending in directions parallel to the second axis. A second through slot has a major axis. The second through slot is spaced from the first slot in a direction parallel to the first axis. A first fastener is inserted from the bottom of the template support through the first slot and received into the template. A second fastener is inserted from the bottom of the template support through the second slot and received into the template. The first and second fasteners are moveable within the first and second slots, respectively, in directions along the major axes of the first and second slots. The template is moveable with the fasteners. The collection region is sized to cover at least partially the vacuum aperture throughout the full extent of the movement of the template due to movement of the fasteners along the major axes of the first and second slots to provide a flow path from the collection region through the vacuum aperture.

In one embodiment a template holding jig for holding a template for use with a router for routing a workpiece is provided. The template holding jig includes a template support defining a template support plane. A workpiece support defines a workpiece support plane extending perpendicular to the template support plane. A template attachment attaches a template to the template support. A template provides a plurality of router guide regions extending through a top surface and a bottom surface of the template. The bottom surface of the template abuts the template guide. A vacuum arrangement provides a flow path for a flow of dust generated by routing a workpiece with a router guided by the router guide regions.

In one embodiment the vacuum arrangement includes a router support removably attached to the template proximate the plurality of router guide regions. The plurality of router guide regions being in the form of a plurality of open ended slots of the template.

In one embodiment the vacuum arrangement further includes a dust collector removably attached under the router support on an opposite side of the template, the dust collector operably couplable to a source of vacuum.

In one embodiment a dust collection cavity is defined by the router support and the dust collector. The dust collection cavity is positioned, at least in part, below the template support plane.

In one embodiment the template includes a mounting cavity proximate the open ended slots and a second mounting cavity proximate the open ended slots. The open ended slots are located between the first mounting area and the second mounting area. The router support includes a first arm having a first tab and a second arm having a second tab. A longitudinal member extends between the first arm and the second arm. The first arm, the second arm and the second arm define a gap facing the plurality of open ended slots. The first tab is received into the first mounting cavity. The second tab is received into the second mounting cavity to removably fix the router support to the template.

In one embodiment the dust collector has a first side, a second side and a third side extending between the first side and the second side. The cavity is surrounded, at least in part, by the router support, the first side, the second side and the third side.

In one embodiment the workpiece joining jig assembly includes a first mounting flange extending from the first side of the dust collector. A second mounting flange extends from the second side of the dust collector. A first channel is defined by the first arm of the router support. A second channel is defined by the second arm of the router support. The first detent is received in the first channel and the second detent is received in the second channel to mount the dust collector to the router support.

In one embodiment the template is a box joint template or a dovetail template or a dovetail pins template.

In one embodiment a clamping bar arrangement is removably fixed to the workpiece support and located under the template to selectively position and secure the workpiece for routing. The clamping bar arrangement includes a base having a length greater than a width of the workpiece support along a first axis being parallel to the workpiece support plane and the template support plane. The width is parallel to the first axis. A clamping bar is removably fixed to the base to clamp a workpiece to the base. The dust collector is located between the router support and the clamping bar.

In one embodiment the clamping bar arrangement includes a pair of fasteners removably fixing the clamping bar to the base. Each one of the pair of fasteners includes a spring mounted thereto. The spring acts between the base and the clamping bar. The spring biases the clamping bar away from the base.

In one embodiment the clamping bar arrangement includes a first stop defining a first slot having a first major axis extending parallel to the first axis. A second stop defines a second slot having a second major axis extending parallel to the first axis. The second stop is laterally spaced apart defining a gap between the first stop and the second stop. A first fastener extends through the first slot to selectively fix the first stop to the base. A second fastener extends through the second slot to selectively fix the second stop to the base. The first stop and the second stop are independently moveable in directions parallel to the first axis to selectively position the workpiece parallel to the first axis.

In one embodiment a template holding jig for holding a template for use with a router for routing a workpiece is provided. The template holding jig includes a template support defining a template support plane. A workpiece support defining a workpiece support plane extends perpendicular to the template support plane. A template attachment attaches a template to the template support. A template provides a plurality of router guide regions extending through a top surface and a bottom surface of the template. The bottom surface of the template abuts the template guide. A router bit depth tool has a body having an outer periphery. A first router bit abutment spaced inward a first distance from the outer periphery of the body defines a first extent that a router bit can extend into the body when the body is located below and against the bottom surface of the template with the first router bit abutment aligned with one of the router guide regions. A second router bit abutment is spaced inward a second distance from the outer periphery of the body defining a second extent that a router bit can extend into the body when the body is located below and against the bottom surface of the template. The second distance is different than the first distance and the second extent is different than the first extent.

In one embodiment a method for adjusting a router bit of a router is provided. The method includes the step of using the workpiece joining jig assembly. The method includes the step of locating the router on the top surface of the template. The method includes the step of locating the body of the router bit depth tool against the bottom surface of the template with the first router bit abutment located aligned with one of the router guide regions. The method includes the step of abutting a free end of the router bit against the first router bit abutment. The method includes the step of affixing the router bit to the router such that the depth of the router bit is fixed at a first extent.

In one embodiment the method includes the step of locating the router on the top of the template. The method includes the step of locating the body of the router bit depth tool against the bottom surface of the template with the second router bit abutment located aligned with one of the router guide regions. The method includes the step of abutting the free end of the router bit against the second router bit abutment. The method includes the step of affixing the router bit to the router such that the depth of the router bit is fixed at a second extent.

In one embodiment a workpiece joining jig assembly includes a template holding jig for holding a template for use with a router for routing a workpiece. The template holding jig includes a template support defining a template support plane. A workpiece support defines a workpiece support plane extending perpendicular to the template support plane. A template attachment attaches a template to the template support. A template provides a plurality of router guide regions extending through a top surface and a bottom surface of the template. The bottom surface of the template abuts the template guide. A centerline alignment insert is removably mountable within at least one of the router guide regions. The centerline alignment insert has a slit formed therein that is smaller in dimension than the router guide regions. The slit is configured to view a mark formed on an edge of a workpiece when the workpiece is abutted against the workpiece support.

In one embodiment the centerline alignment insert includes a head portion and an insert portion that extends from the head portion. The insert portion is sized to extend into the router guide region. The head portion is sized larger than the router guide region such that it does not pass through the router guide region when the insert portion is received in the router guide region.

In one embodiment a method of aligning a workpiece relative to the workpiece joining jig is provided. The method includes the step of inserting the centerline alignment insert into one of the router guide regions. The method includes locating the workpiece against the workpiece support. The method includes the step of adjusting the position of the workpiece relative to the workpiece support until the mark is visible within the slit. The method includes the step of fixing the location of the workpiece against the workpiece support when the mark is visible within the slit.

In one embodiment a workpiece joining jig assembly includes a template holding jig for holding a template for use with a router for routing a workpiece. The template holding jig includes a template support defining a template support plane. A workpiece support defines a workpiece support plane extending perpendicular to the template support plane. A template attachment attaches a template to the template support. A template provides a plurality of router guide regions extending through a top surface and a bottom surface of the template. The bottom surface of the template abuts the template guide. The template support has a top that includes upward opening first and second upward grooves therein. The template has first and second alignment projections. The first alignment projection extends into the first alignment groove and the second alignment projection extending into the second alignment groove.

In one embodiment the template is slidable relative to the template support along an axis perpendicular to the workpiece support plane while the first alignment projection is received in the first alignment groove and the second alignment projection is received in the second alignment groove. Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
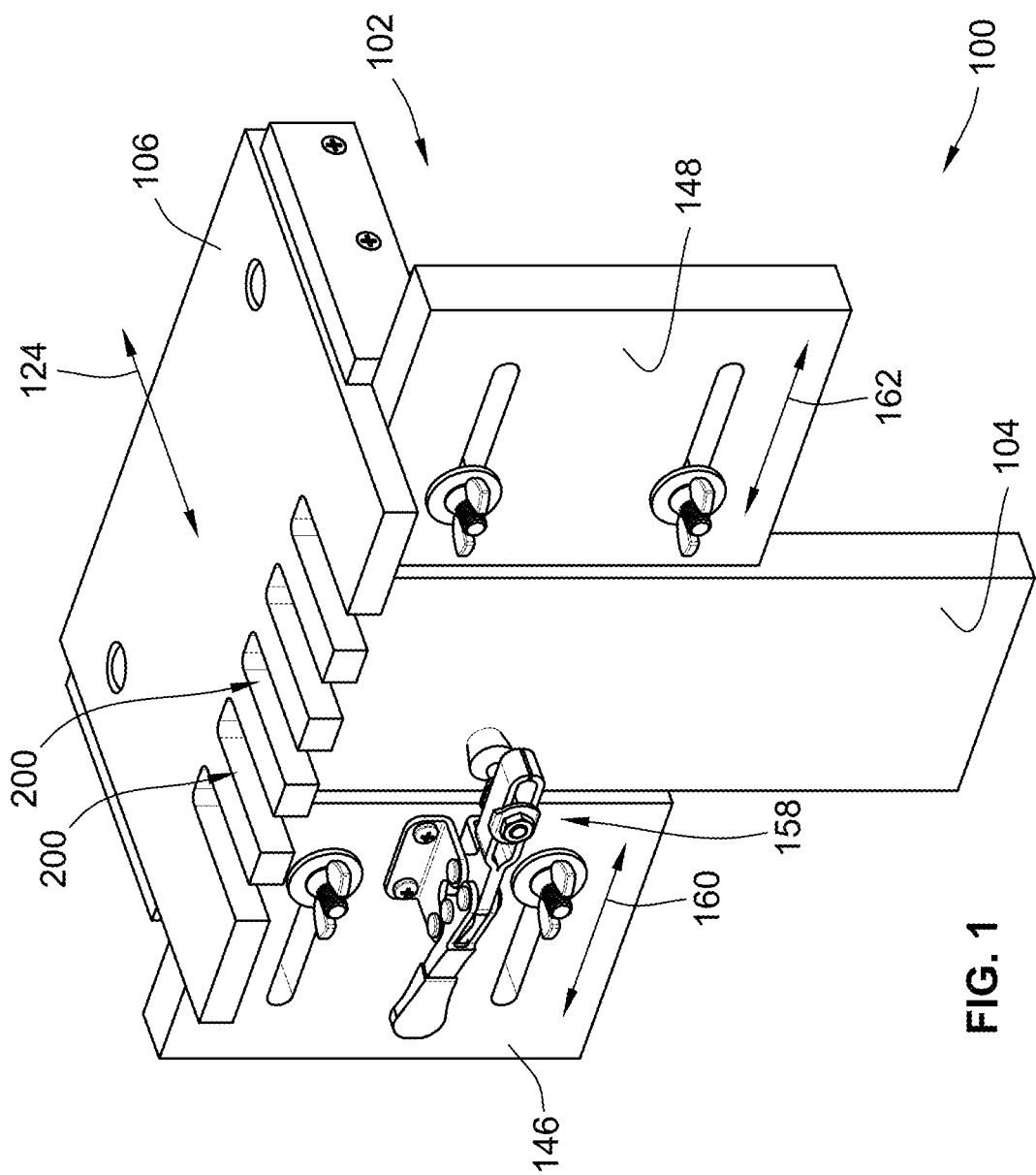
FIG. 1 is a perspective illustration of a first configuration of a workpiece joining jig.

FIG. 1 illustrates a workpiece joining jig 100 (also referred to as a router jig or a multi joining system) in a first configuration. The workpiece joining jig 100 is used with a router (not shown) to route or otherwise cut one or more of a plurality of workpieces for subsequent joining of the workpieces. Using the workpiece joining jig 100 in this or alternative configurations that will be described below, workpieces may be connected with connections formed directly into the workpiece with the router such as using a dovetail or mortise and tenon connection. Additionally, workpieces could be connected using connectors that extend into recesses or cavities formed in one each of the workpieces using the router and the workpiece joining jig 100. Examples of connectors that can be used in connection with recesses or cavities formed in the workpieces using this or other configurations of the workpiece joining jig 100 and associated additional components described herein include, but are not limited to: dowels, dominos, butterflies, biscuits.

Further, depending on the configuration of the workpiece joining jig 100, workpieces may be able to be connected end-to-end, at 90 degree angles to one another as well as with connected mitered ends.

In FIG. 1, the workpiece joining jig 100 includes a template holding jig 102 holding a workpiece 104 adjacent a first template 106. The workpiece joining jig 100 is in a first configuration. In some embodiments, the workpiece joining jig 100 can only be provided in this configuration. In other embodiments, other configurations are provided, such as described below with regard to FIGS. 5-9.

Figure 2:
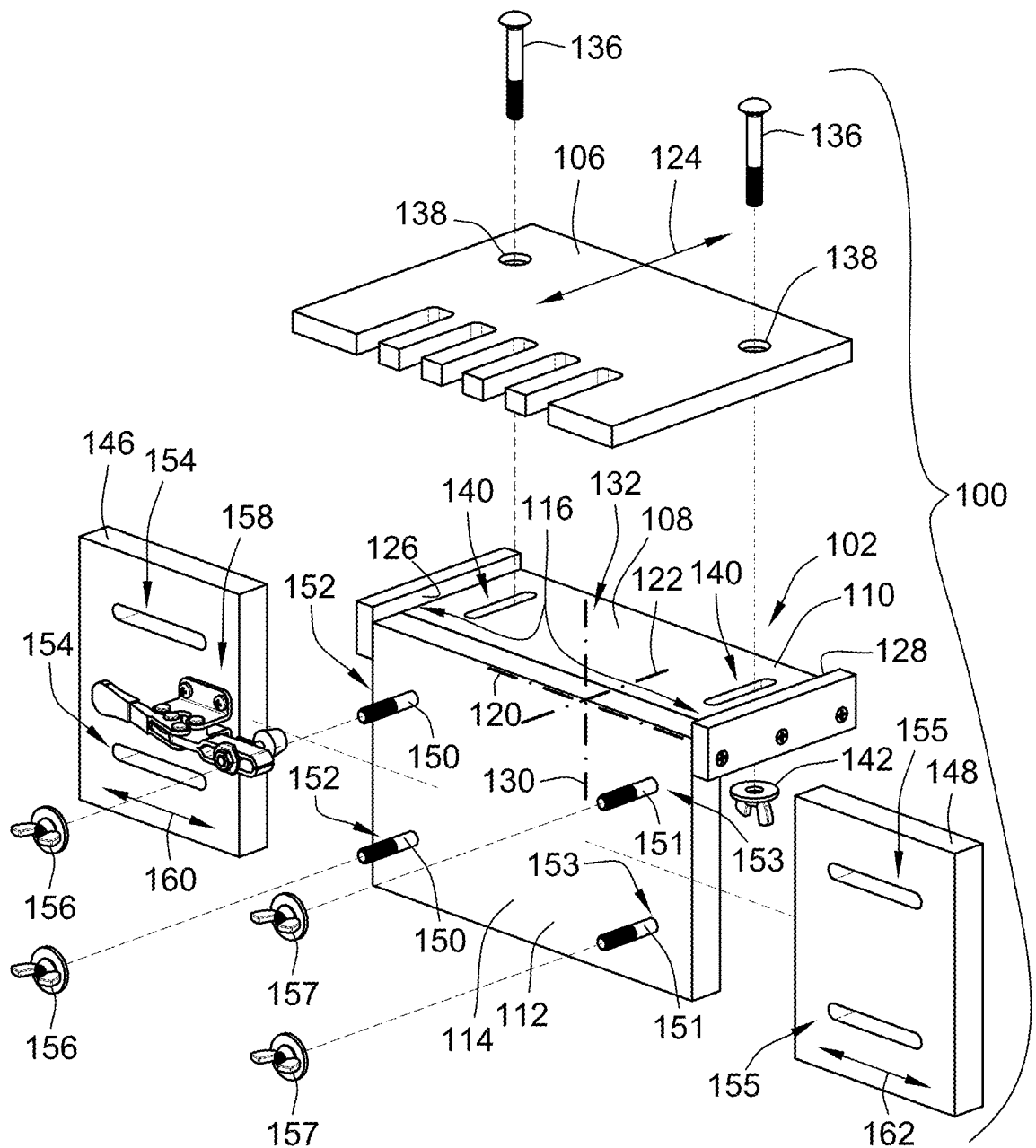
FIG. 2 is a perspective exploded illustration of the workpiece joining jig of FIG. 1.

With additional reference to FIG. 2, the template holding jig 102 includes a template support 108 defining a template support plane. Template 106 may operably removably and adjustably attach to the template holding jig 102 for properly orienting and positioning the template 106 relative to workpiece 104. A top surface 110 (also referred to as an exterior surface) of the template support 108 defines the template support plane. In the illustrated embodiment, the top surface 110 itself is planar defining the template support plane. However, the top surface 110 need not be planar and could have surface textures. These textures would define the template support plane upon which the first template 106 would be supported.

In addition to the template support 108, the template holding jig 102 includes a workpiece support 112 defining a planar workpiece support. Workpiece 104 may be operably held against the workpiece support 112 for properly orienting and positioning the workpiece 104 relative to the template 106 for proper routing of the workpiece 104. A front surface 114 (also referred to as an exterior surface) of the workpiece support 112 defines the workpiece support plane. In the illustrated embodiment, the front surface 114 itself is planar defining the workpiece support plane. Similar to the template support 108, the front surface 114 need not be planar and could have surface textures. These textures would define the workpiece support plane upon which the workpiece 104 would be supported.

The workpiece support plane extends perpendicular to the template support plane. As noted above, these planes are provided by exterior surfaces, e.g. they are exterior to the L-shape that is defined by the template support 108 and workpiece support 112. The exterior surface of the template support 108 does not extend beyond the exterior surface of the workpiece support 112. As such, it can be explained that the template support plane and the workpiece support plane define an exterior angle of 270 degrees therebetween.

This orientation allows the router to properly engage the workpiece 104 when guided by the template 106 depending on the type of connection being formed using the workpiece joining jig 100.

To properly orient the template 106 relative to the template holding jig 102 and particularly the workpiece support 114, a template guide 116 is provided. The template guide 116 of this embodiment includes at least one abutment that laterally locates the template 106 along a first axis 120. This allows the template to properly laterally align with the workpiece 104 when the template 106 is engaged with the template guide 116. The first axis is parallel to both the template support plane and the workpiece support plane. However, the template guide 116 permits motion of the template 106 parallel to a second axis 122 that is perpendicular to the first axis 120, orthogonal to the workpiece support plane and parallel to the template support plane. As such, in the illustrated embodiment, the template guide 116 allows the template to be adjusted parallel to second axis 122 illustrated by arrow 124 in FIG. 1.

In the illustrated embodiment, the at least one abutment of the template guide 116 includes a plurality of abutments provided by first and second walls 126, 128 formed by side plates that are attached to sides of the template support 108 and the workpiece support 112. The side plates can also be used to secure the template support 108 to the workpiece support 112. The first and second walls 126, 128 are parallel to one another and spaced apart from one another parallel to the first axis 120. Further, to engage the template 106, the first and second walls 126, 128 are offset from the template support plane, e.g. the top surface 110, parallel to a third axis 130 that is parallel to the workpiece support plane (e.g. front surface 114) and perpendicular to the first and second axes 120, 122 as well as orthogonal to the template support plane (e.g. top surface 110). In this embodiment, the first and second walls 126, 128 extend outward and beyond top surface 110 parallel to third axis 130.

The first and second walls 126, 128 are positioned at opposite first and second ends of the template support 108 with the template support 108 being positioned between the first and second walls 126, 128. This forms a template receiving channel 132 between the first and second walls 126, 128. Thus, when the template 106 is mounted to the template support 108, at least a portion of the template 106 is positioned axially between the first and second walls 126, 128 within the template receiving channel 132. However, it is contemplated that in alternative embodiments, the abutment could take other forms. For instance, the first and second walls 126, 128 could simply be provided by ends of the template support. In such an embodiment, the template itself could define a similar channel with a portion of the template support being positioned between walls of the template to properly locate the template 106 relative to the template support 108. Further, embodiments could use smaller or wider channels. Further, the walls need not be parallel along the third axis 130. For example, a non-rectangular groove could be formed in top surface 110 that extends axially parallel to the second axis 122 and the template 106 could have a corresponding projection that locates within the groove to properly laterally orient the template 106 along first axis 120. Again, the groove and projection could be inverted between the template support 108 and template 106. This could be a groove that is of a dovetail configuration to prevent disconnection of the template and the template support 108 in a direction parallel to the third axis 130.

The template holding jig 100 also includes a template attachment for operably affixing template 106 to the template support 108 while routing the workpiece 104. In the illustrated embodiment, the template attachment is in the form of a pair of bolts 136 that pass through holes 138 formed in the template 106, corresponding slots 140 in the template support 108, and a pair of wing nuts 142 (only one illustrated in FIG. 2). With the wing nuts 142 tightened, e.g. in a first configuration, the template 106 may be sandwiched against the template support 108 and prevented from moving parallel to the template support plane parallel to second axis 122. However, with the wing nuts 142 loosened or even removed, e.g. in a second configuration, the position of the template 106 may be adjusted along the second axis 122. The slots 140 allow the bolts 136 to slide therein. Adjustment of the position of the template 106 is limited to being parallel to second axis 122 due to template guide 116 and is illustrated by arrow 124 in FIG. 1. This allows the template 106 to be used with workpieces 104 of different thicknesses (the thickness being measured parallel to the second axis 122 when the workpiece 104 is mounted to the workpiece support 112). It is contemplated that the slots 140 and holes 138 could be reversed. Further, the bolts need not extend through the body of the template 106. Instead, the bolts or similar device could simply cantilever over the template 106 and provide an axial force parallel to third axis 130 to sandwich the template 106 against the template support 108. It is noted that the bolts 136 could also provide the template guide. The bolts and nuts provide a form of a clamping arrangement. Other clamping arrangements are contemplated. For instance, a handle with a cam surface mounted to an end of a shaft, e.g. a bolt, could pivot to releasably sandwich the template 106 into the template support 108. This applies to other nut and bolt arrangements described below.

Figure 3:
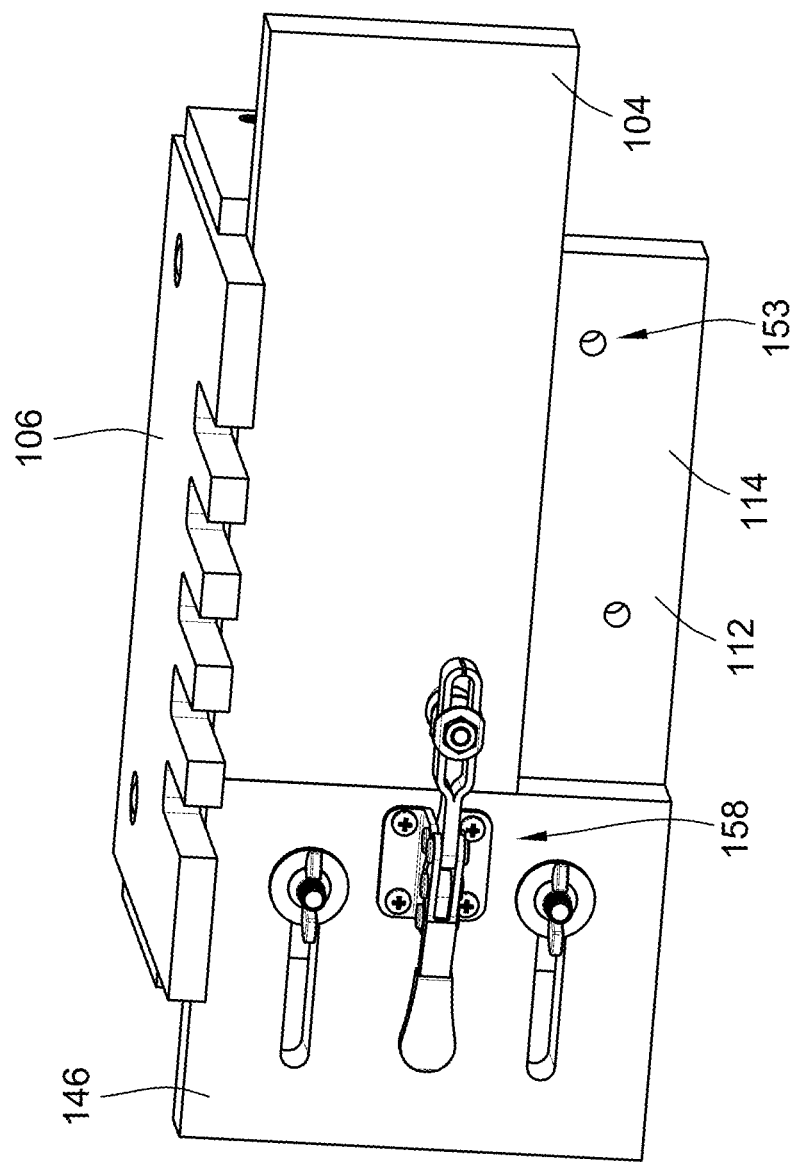
FIG. 3 is an alternative orientation of the workpiece joining jig of FIG. 1.
Figure 4:
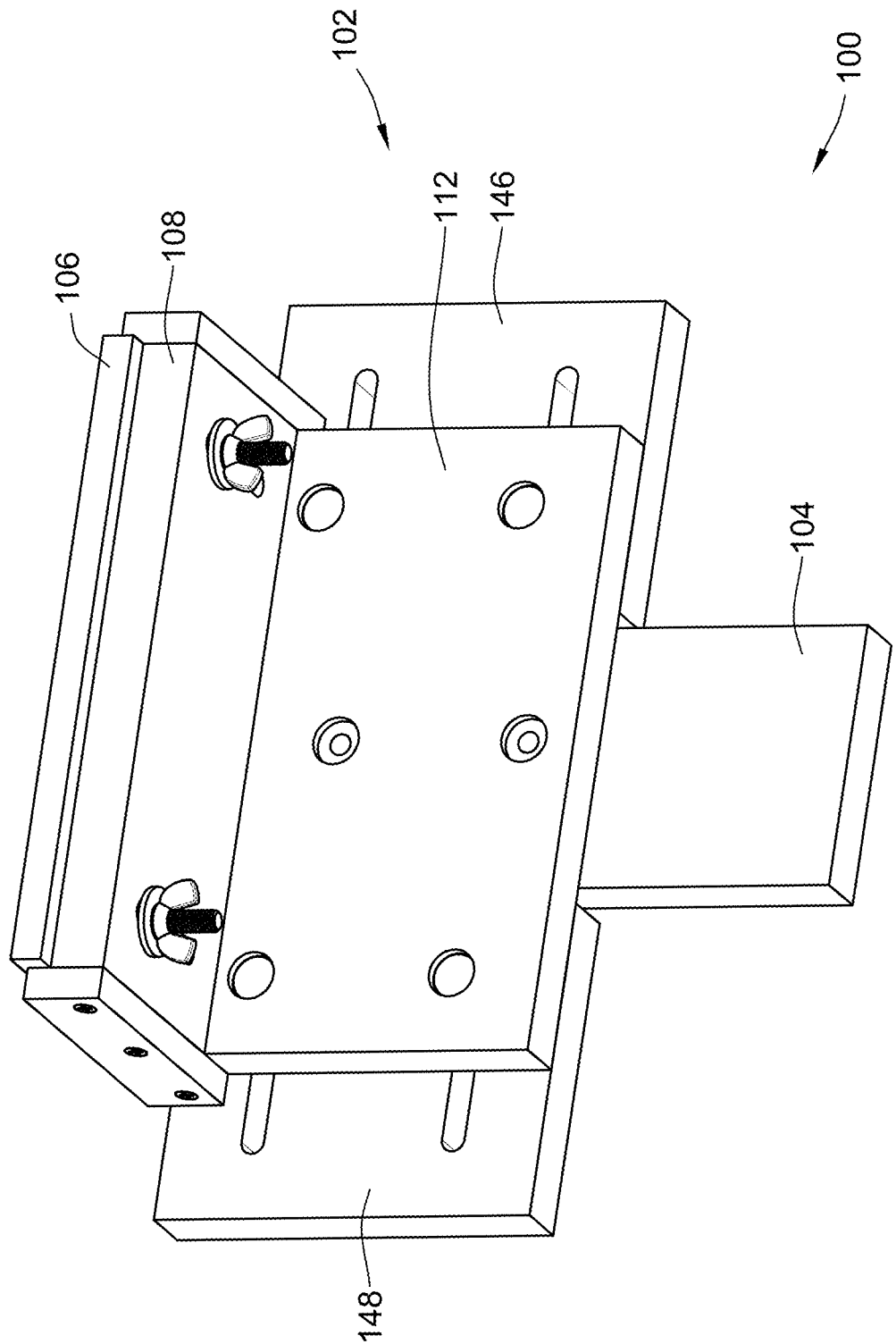
FIG. 4 is a rear view of FIG. 1.

In this configuration, the template holding jig includes first and second workpiece side stops 146, 148. The workpiece side stops 146, 148 are operably mounted adjacent the workpiece support 112 and laterally position the workpiece 104 relative to the template 106 parallel to the first axis 120. The workpiece side stops 146, 148 provide abutment against which the workpiece 104 abuts in a direction parallel to the first axis. The first and second workpiece side stops 146, 148 are adjustably positionable parallel to the first axis 120 relative to the workpiece support 122 to adjust a spacing therebetween when both workpiece side stops 146, 148 are being used. Preferably, one or both of the first and second workpiece side stops 146, 148 are removable away from the workpiece support 112 such that larger workpieces can be attached to the workpiece support 112 or longer workpieces can be properly oriented relative to the template 106 (see e.g. FIG. 3).

First and second workpiece side stop mounts in the form of bolts 150, 151, holes 152, 153 formed in the workpiece support 112, slots 154, 155 formed in the workpiece side stops 146, 148 and wing nuts 156, 157 selectively fix the position of the first and second side stops 146, 148 relative to the workpiece support 112 laterally along the first axis 120 (illustrated by arrows 160, 162). In an embodiment, the positions of the first and second workpiece side stops 146, 148 are independently adjustable along the first axis 120. In other embodiments, the positions are simultaneously adjusted relative to a center point located at the midpoint between the first and second walls 126, 128 such that the workpiece 104 can be auto-centered relative to the template 106. The slots 154, 155 and holes 152, 153 could be reversed such that the slots are formed in the workpiece support 112 and the holes are formed in the workpiece side stops 146, 148. Further, side stop guides could be provided similar to template guide 116 that guide the lateral positioning of the workpiece side stops 146, 148 as they move parallel to the first axis 120.

A clamp 158 is attached to the first workpiece side stop 146. The clamp 158 is thus movable with the first workpiece side stop 146 relative to the workpiece support 112. The clamp 158 is operably actuatable to provide a force orthogonal to the workpiece support plane (e.g. parallel to second axis 122) to a workpiece 104 that is supported by the workpiece support 112 and positioned adjacent the first workpiece side stop 146. Preferably, sufficient force can be provided by clamp 158 to prevent movement of the workpiece 104 during routing operations. Preferably, the clamp 158 is adjustable to accommodate workpieces 104 of different thicknesses and or material properties (e.g. to avoid damaging the contacted surface of the workpiece 104). While only a single clamp 158 is illustrated, multiple clamps may be provided. For example, a clamp could be mounted to the second workpiece side stop 148. Additionally, one or both of the workpiece side stops 146, 148 could include multiple clamps.

Figure 5:
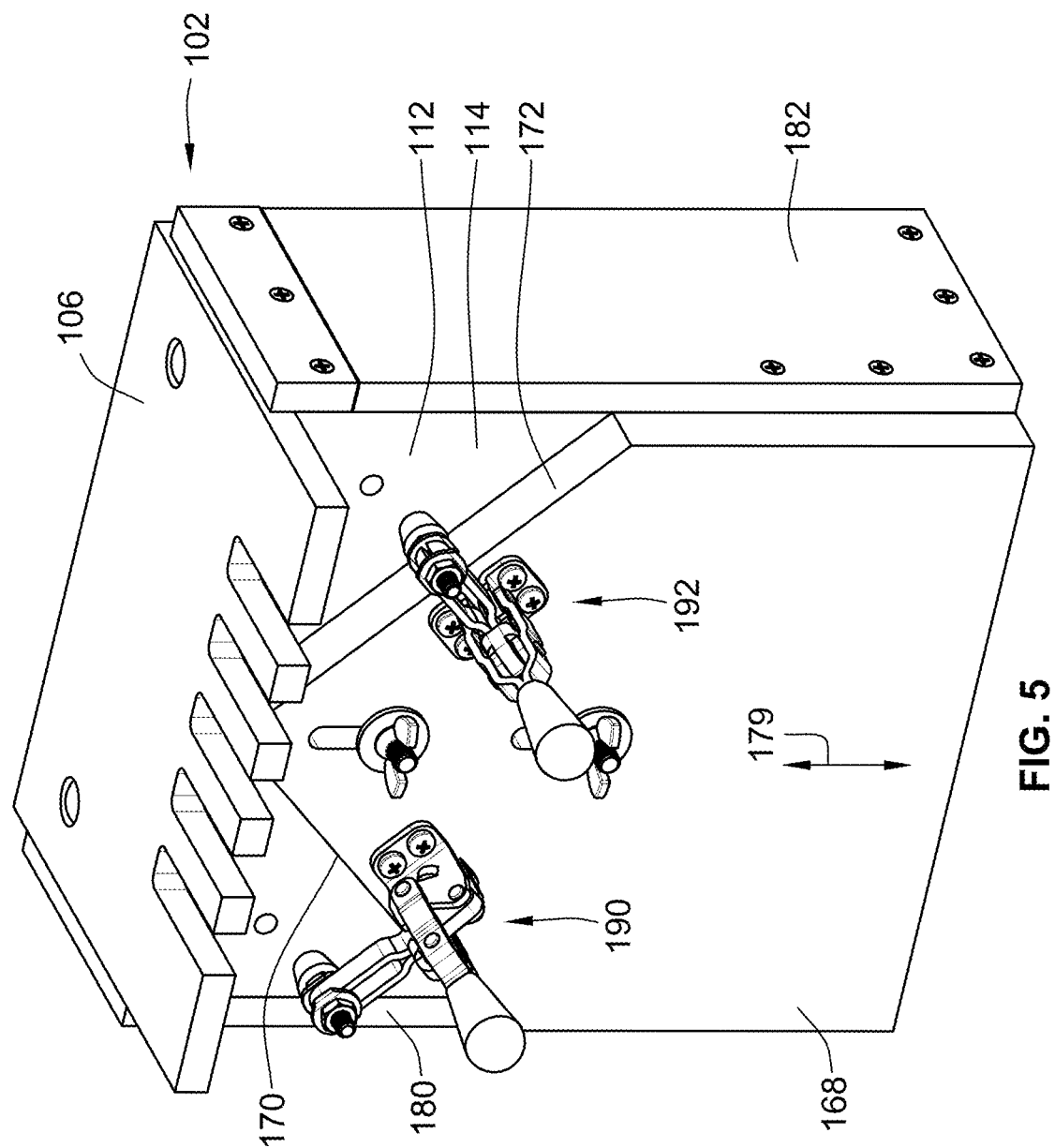
FIG. 5 is a perspective illustration of an alternative configuration of the workpiece joining jig.
Figure 6:
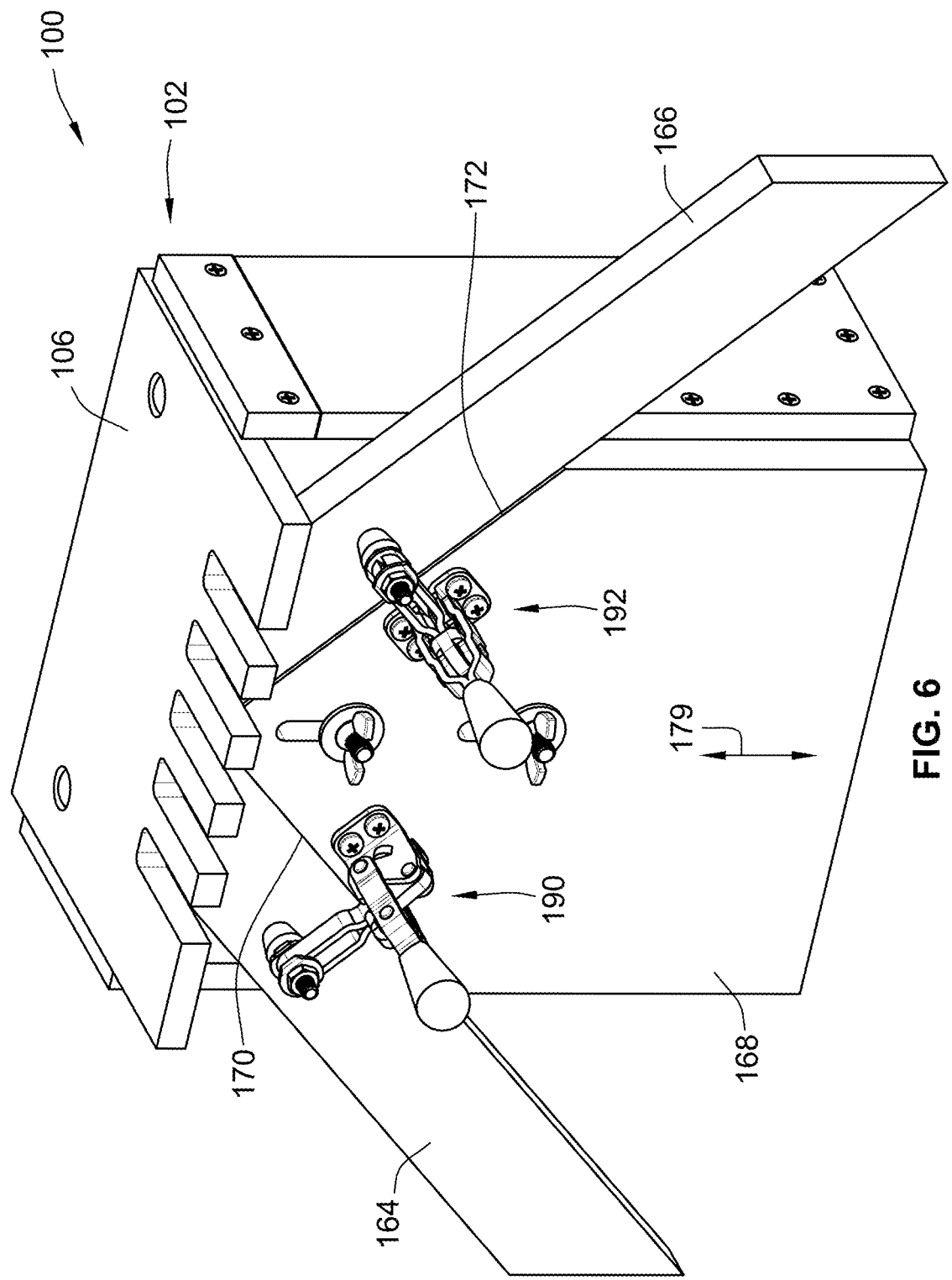
FIG. 6 is a perspective illustration of the workpiece joining jig of FIG. 5 supporting mitered workpieces.
Figure 7:
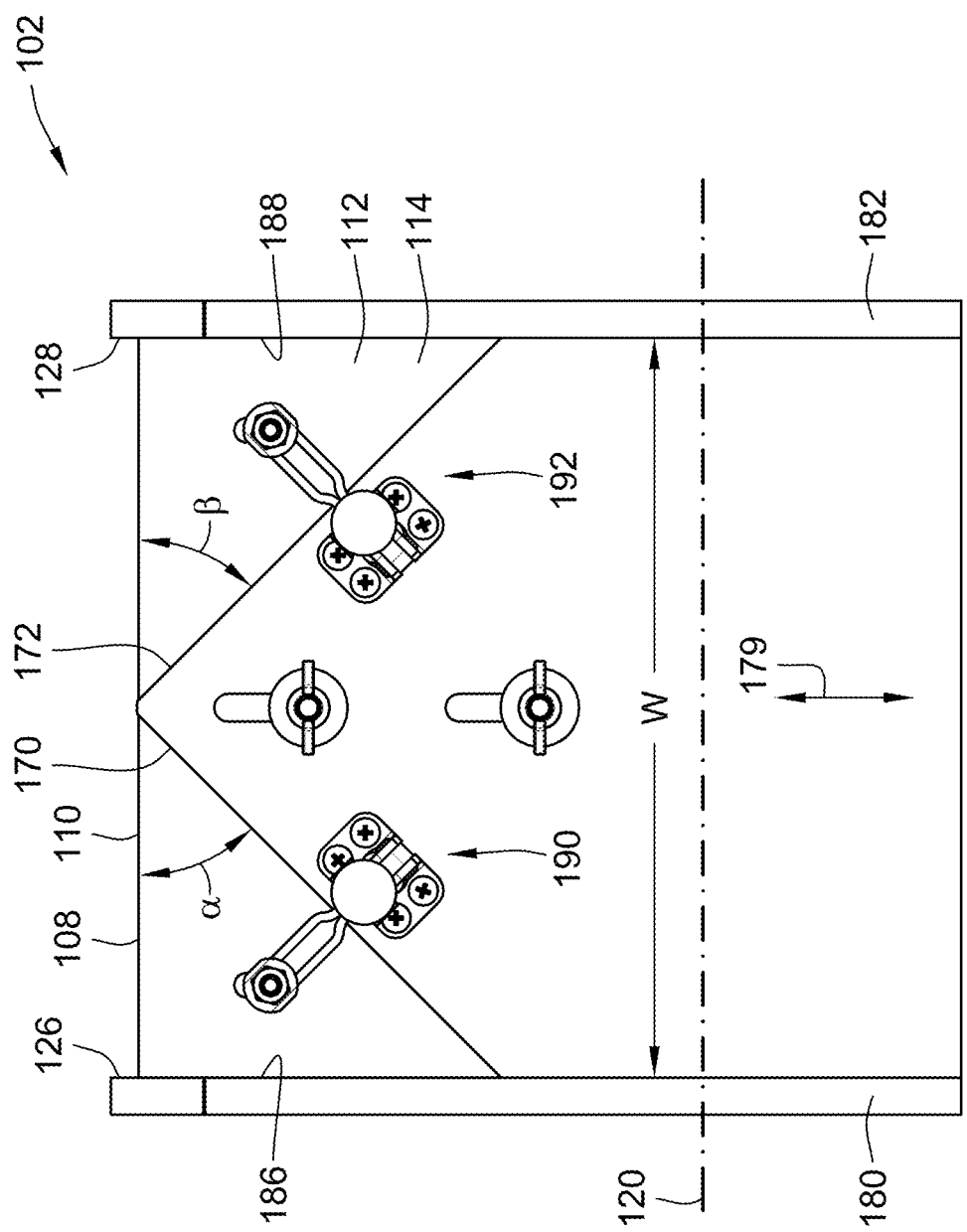
FIG. 7 is a front illustration of the workpiece joining jig of FIG. 5.
Figure 8:
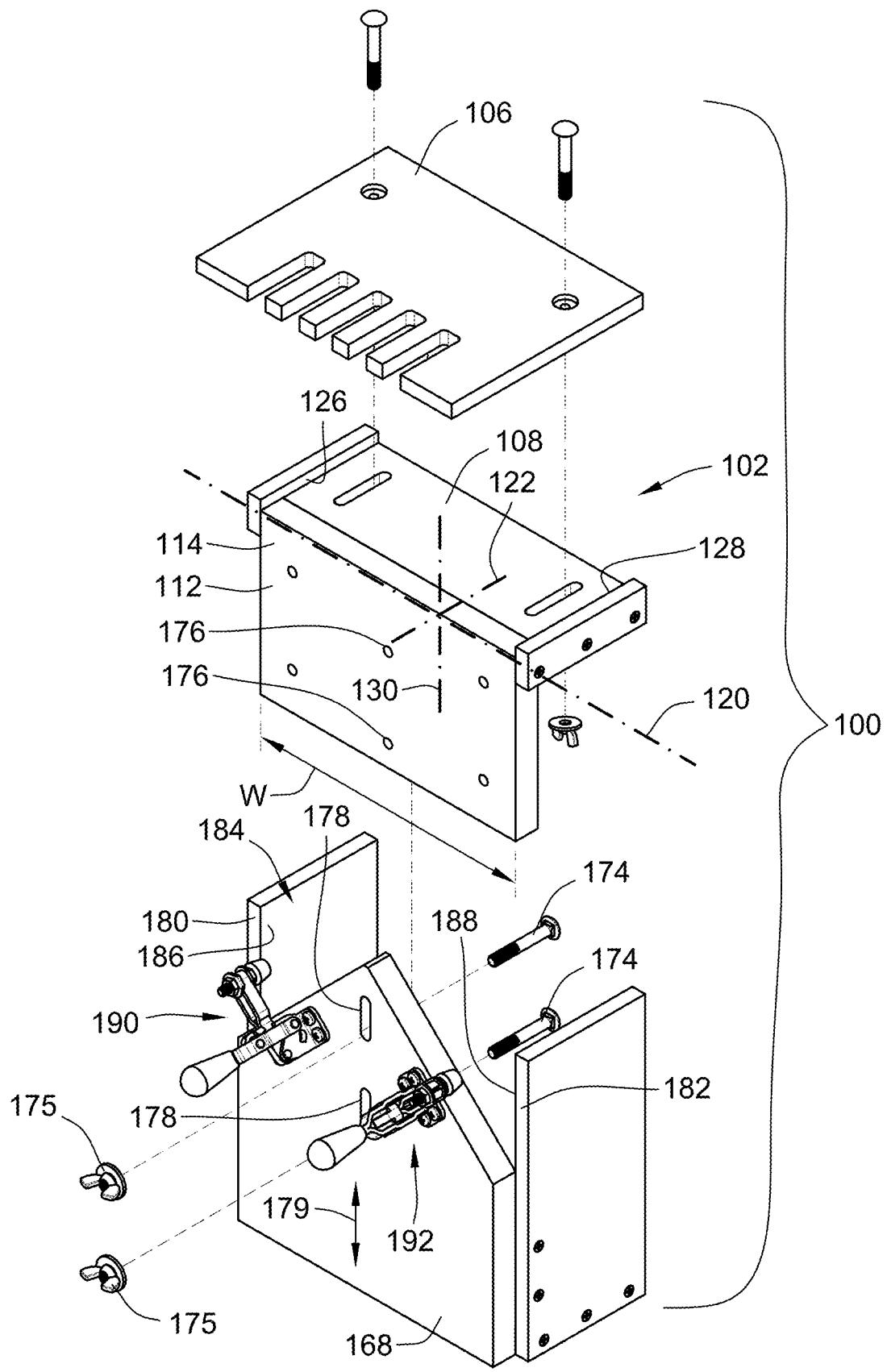
FIG. 8 is a partially exploded illustration of the workpiece joining jig of FIG. 5.

With reference to FIGS. 5-7, an alternative configuration of the workpiece joining jig 100 is illustrated. This configuration is useful in preparing connections for first and second workpieces 164, 166 that have mitered ends. In this configuration, a miter fence 168 is provided. The miter fence 168 allows the mitered ends to be properly positioned and oriented relative to the template 106.

The miter fence 168 defines first and second miter abutments in the form of first and second walls 170, 172. The first wall 170 defines a first miter abutment plane. This plane is defined by the exposed planar surface of the first wall 170. The first miter abutment plane extends orthogonally relative to the workpiece support plane and at a 45 degree angle α to the template support plane (e.g. top surface 110). The second wall 172 defines a second miter abutment plane. This plane is defined by the exposed planar surface of the second wall 172. The second miter abutment plane that extends orthogonally relative to the first miter abutment plane and orthogonally relative to the workpiece support plane and at a 45 degree angle β to the template support plane (e.g. top surface 110). These 45 degree angles α and β allow mitered ends of 45 degrees to be properly positioned adjacent the template 106.

In the illustrated embodiment, the first and second walls 170, 172 are positioned such that the corresponding first and second miter abutment planes intersect one another at a midpoint between first and second walls 126, 128 along the first axis 120.

The miter fence 168 is fixably attachable adjacent to the workpiece support 112. In the illustrated embodiment, the miter fence 168 is directly attached to the workpiece support 112 by a miter fence attachment in the form of bolts 174 and wing nuts 175. The bolts 174 that extend through holes 176 in the workpiece support 112 and slots 178 in the miter fence 168. In a first configuration of the miter fence attachment, e.g. when the nuts 175 are loose, the position of the miter fence 168 relative to the workpiece support 112 is adjustable (illustrated by arrow 179) parallel to the third axis 130 and the workpiece support plane as well as perpendicular to the template support plane and first and second axes 120, 122.

In a second configuration of the miter fence attachment, e.g. when the nuts 175 are tight, the miter fence 168 is in a fixed position relative to the workpiece support 112.

Other miter fence attachments are contemplated. For instance, the bolts could simply cantilever over the fence and provide sufficient pressure to hold the components together. Further, the slots 178 and holes 176 could be swapped. Further, as with all of the other nuts described, handles with cams could be provided on the ends of the bolts to provide sufficient force to secure the components together and prevent relative motion therebetween.

In this configuration, the workpiece side stops 146, 148 and corresponding attachment structures have been removed to allow for mounting of the miter fence 168.

In the illustrated embodiment, first and second workpiece support guides 180, 182 are attached to the miter fence 168. The first and second workpiece support guides 180, 182 are spaced a part parallel to the first axis 120 forming a gap 184 therebetween. When the workpiece support 112 is attached to the miter fence 168, the workpiece support 112 is positioned between and in abutment with inner surfaces 186, 188 of the first and second workpiece support guides 180, 182. Inner surfaces 186, 188 face towards one another along the first axis 120. The spacing between the inner surfaces 186, 188 is substantially equal to the width W of the workpiece support 112, which is also substantially equal to the spacing between first and second walls 126, 128 and the width of the template support 110.

Clamps 190, 192 are attached to the miter fence 168. The first clamp 190 is actuatable to provide a force orthogonal to the workpiece support plane between the template support plane and the first miter abutment plane. The first clamp 190 clamps first workpiece 164 against, at least in part, the workpiece support 112 (see e.g. FIG. 6). The second clamp 192 is actuatable to provide a force orthogonal to the workpiece support plane between the template support plane and the second miter abutment plane. The second clamp 192 clamps second workpiece 166 against, at least in part, the workpiece support 112 (see e.g. FIG. 6).

Figure 9:
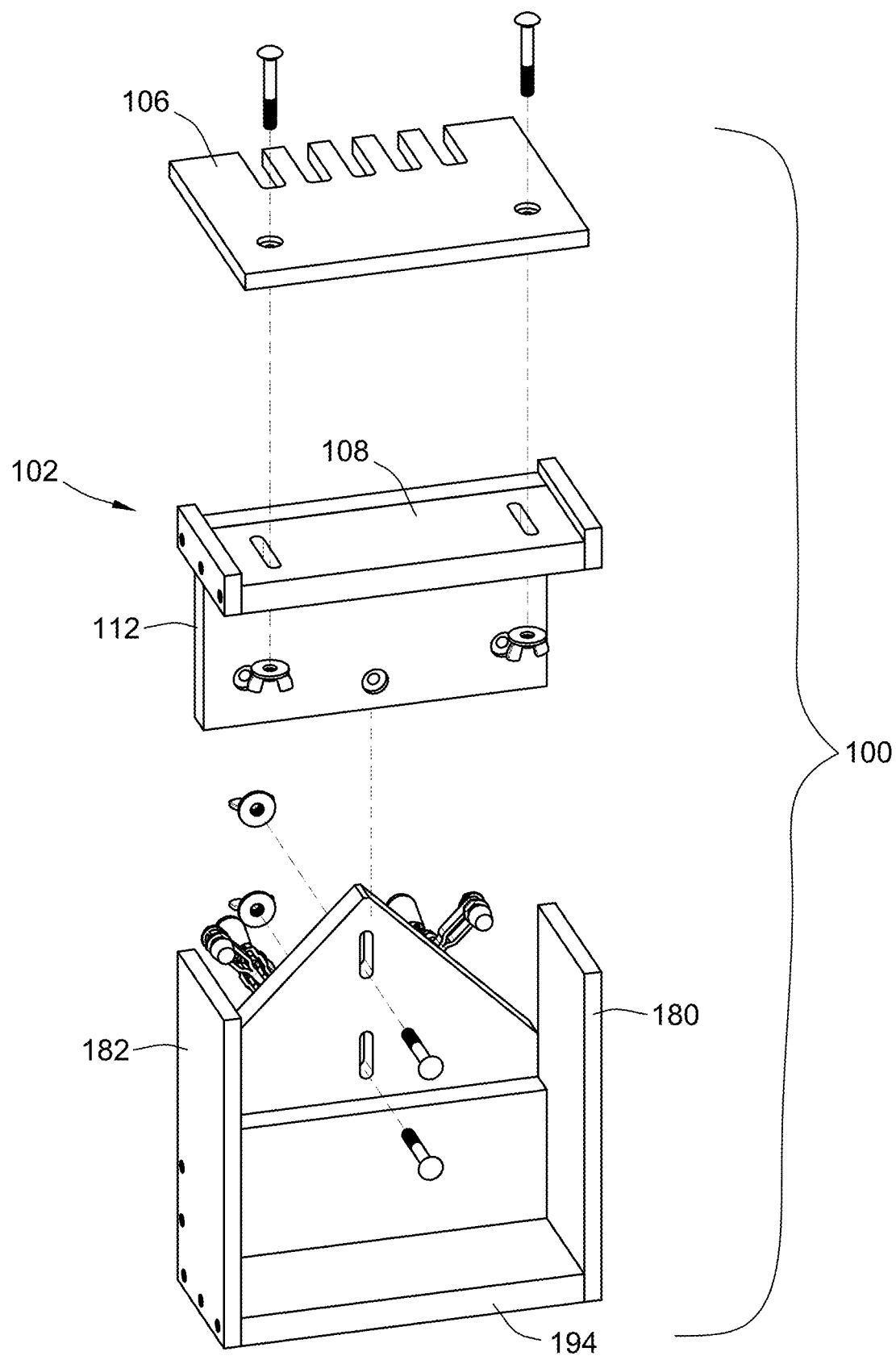
FIG. 9 is a rear view illustration of FIG. 8.

With reference to FIG. 9, the first and second workpiece support guides 182, 180 and miter fence 168 form a support base that is releasably attachable to the workpiece support 112 and template support 108. In this embodiment, a cross-member 194 extends between the first and second workpiece support guides 180, 182. A clamp, such as a bench clamp or C-clamp can clamp the support base to a table by engaging the cross-member 194.

In other embodiments, only the miter fence 168 need be provided and the workpiece support guides 180, 182 and cross-member 194 need not be provided.

Figure 10:
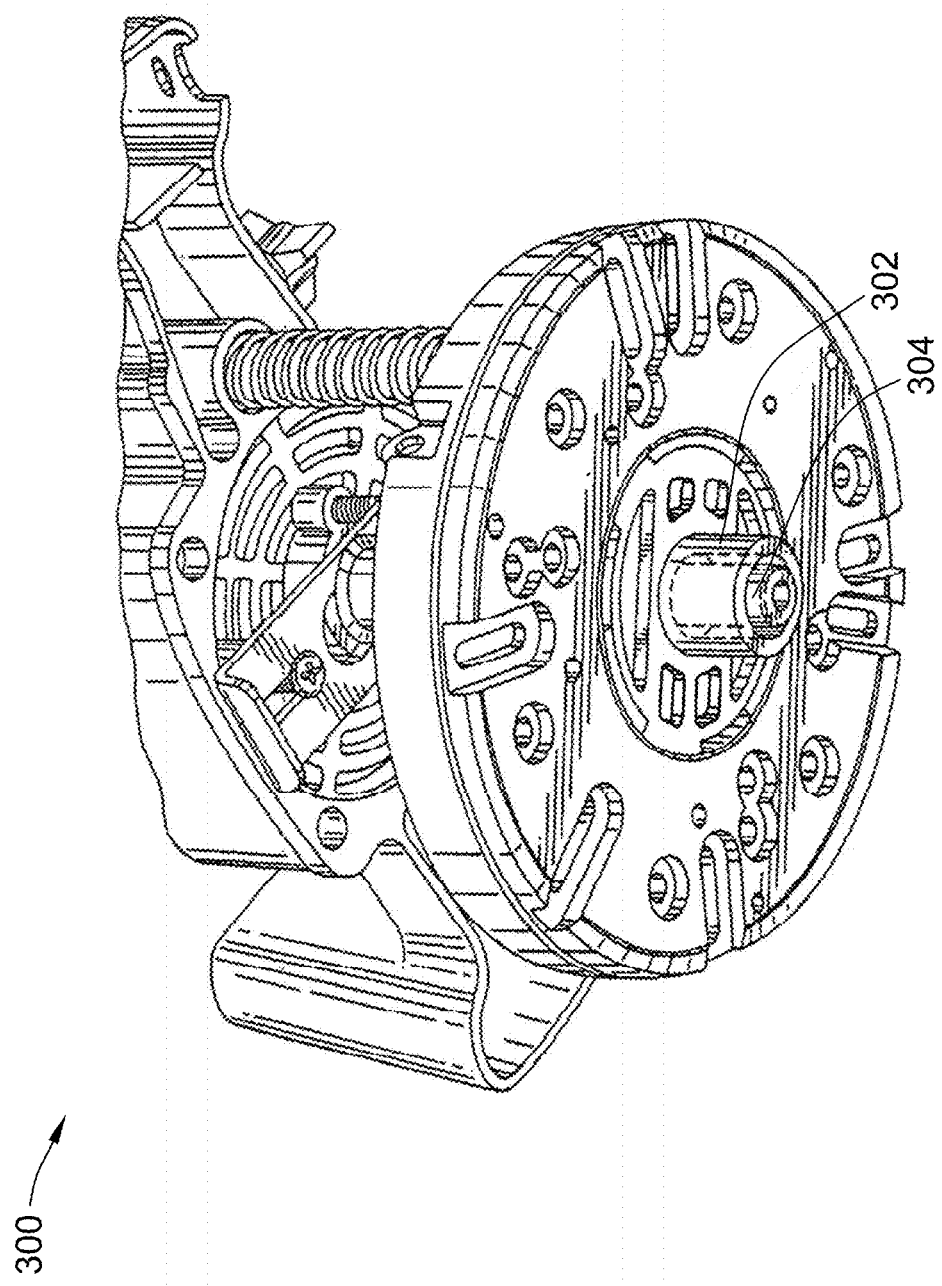
FIG. 10 is a perspective illustration of a router for use with the workpiece joining jig.

FIG. 10 illustrates a representative router 300 for use with the workpiece joining jig 100. The router 300 is in the form of a plunge router but other routers could be used. The router 300 includes a guide bushing 302 configured to radially abut a guide to guide the router during operation. The router 300 includes a chuck or collet 304 configured to attach a router bit (not shown) to the router 300 for rotational motion.

With reference to FIGS. 1 and 2, the first template 106 includes a plurality of first router guide regions in the form of elongated open ended slots 200. In this embodiment, the slots are evenly axially spaced apart along the first axis 120. These open ended slots 200 are generally U-shaped. While described as open ended, these slots 200 could be closed and still function appropriately. The open ended slots 200 are sized and configured to receive the guide bushing 302 of the router 300 to guide or limit the motion of the router 300 relative to the first template 106 in a predetermined manner.

The predetermined manner allows the router 300 and particularly an attached router bit to engage workpiece 104 mounted to the workpiece support 112 in a precise and desired manner. The router guide regions, e.g. open ended slots 200, are designed to allow the router 300, to move parallel to the second axis 122 and arrow 124. This could be used for forming dovetails or recesses for butterfly connections. This could also be used for routing box joints.

Figure 15:
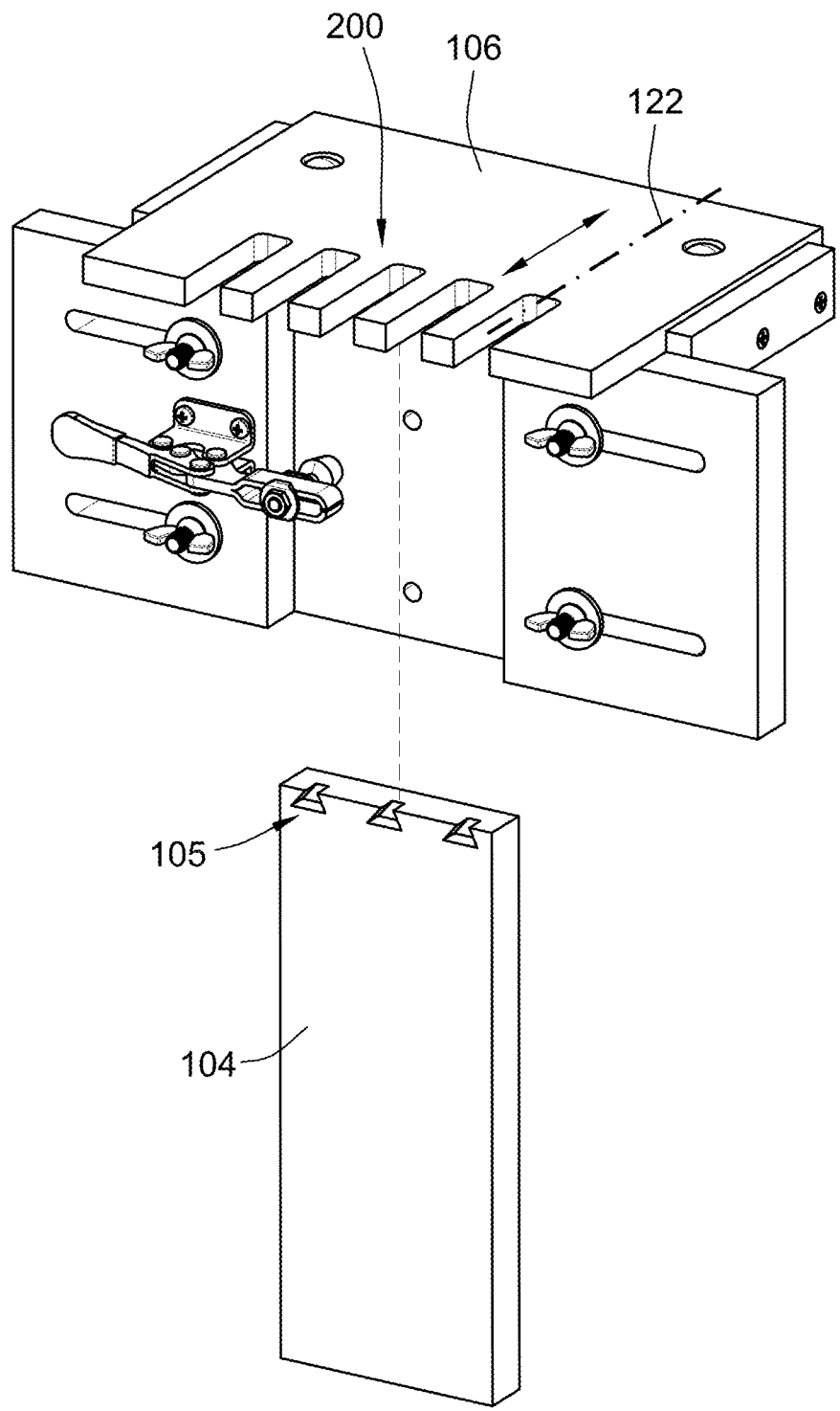
FIG. 15 is a perspective illustration of FIG. 1 illustrating a workpiece that has been routed for forming butterfly connections.

Instead of dovetails, this template could also be used for forming a recess that would receive a butterfly connector. For example, FIG. 15 includes first template 106 and a workpiece 104 that illustrates recesses 105 for forming butterfly connections. The router would be guided for linear motion along second axis 122 to form the recesses 105.

Figure 11:
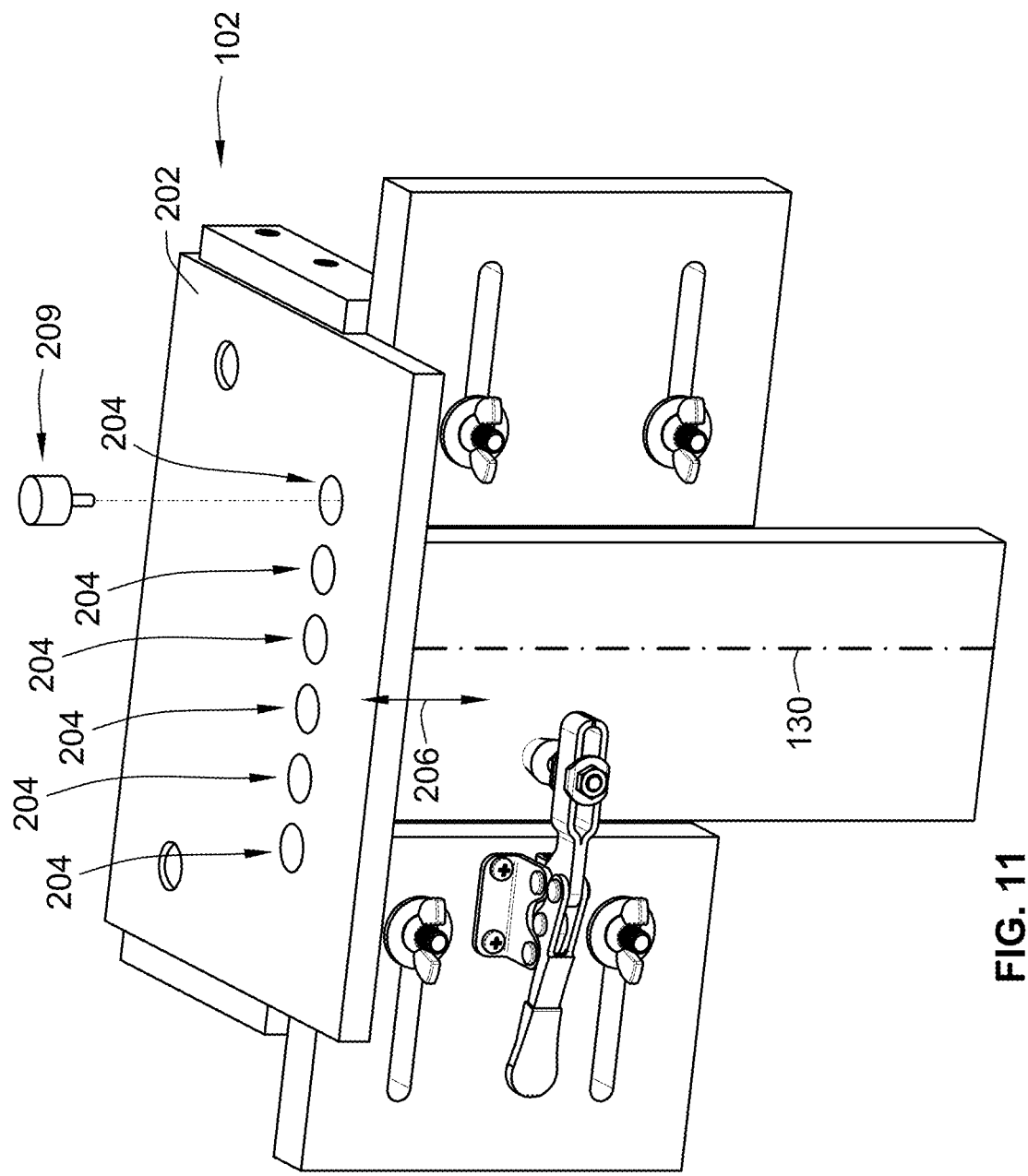
FIG. 11 is a perspective illustration of an alternative template for use with the workpiece joining jig.

However, use of other templates is contemplated. For example, a second template 202 is illustrated in FIG. 11. The second template 202, like the first template 104, is removably mountable to the template support 108 in abutment with the template guide. In this embodiment, the second template 202, like the first template 106, is to be positioned between first and second walls 126, 128. Again, the position of the template 202 may be adjustably fixed relative to the template holding jig 102 along the second axis 122 by template attachment 134.

Figure 16:
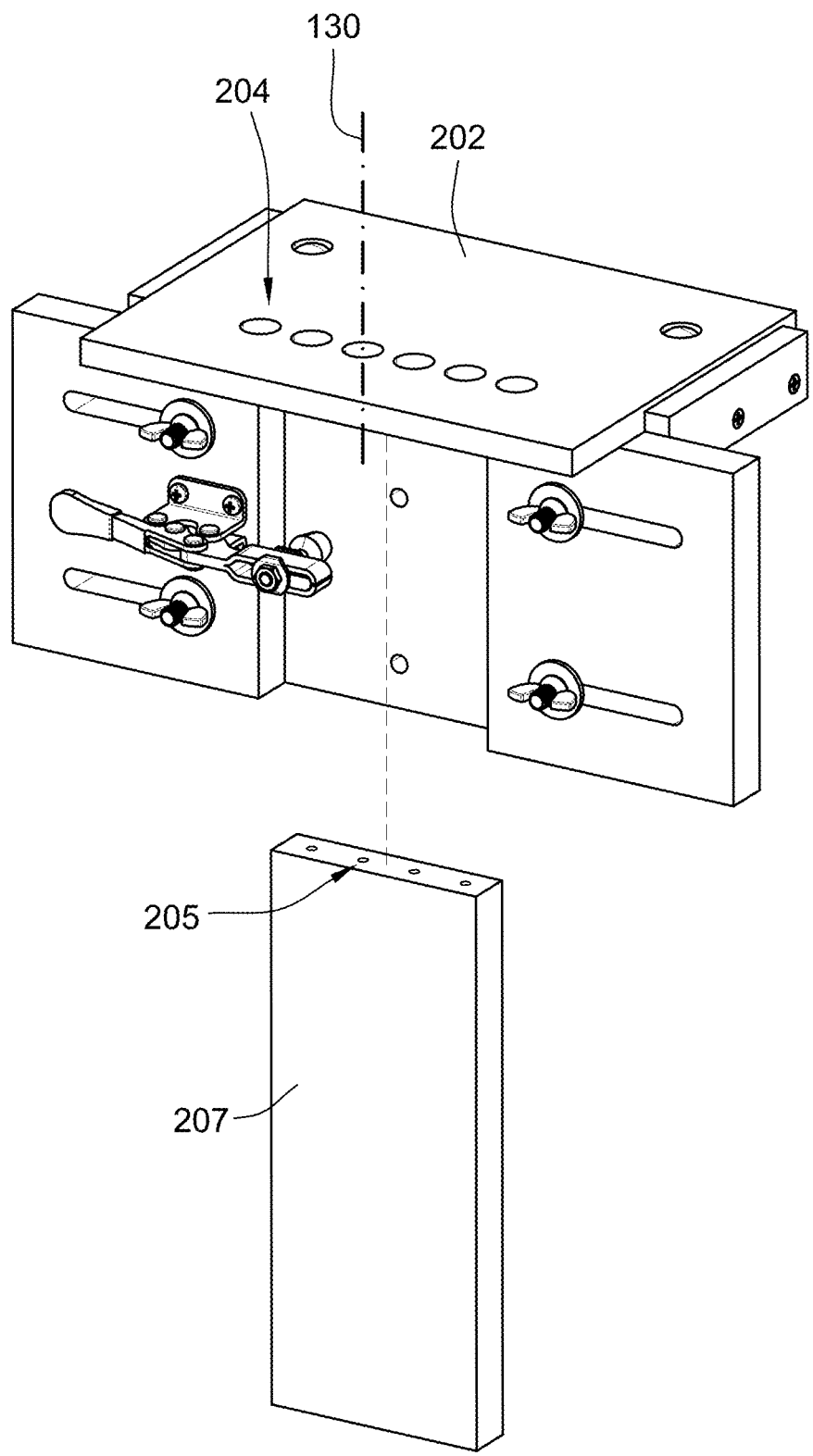
FIG. 16 is a perspective illustration of FIG. 11 illustrating a workpiece that has been routed for forming dowel connections.

The second template 202 has a plurality of second router guide regions in the form of through holes 204. The through holes 204 provide for a different predetermined range of motion for the route 300, and particularly the bit thereof. This allows the router 300 to engage a workpiece mounted to the workpiece support 112 in a different manner than the first template 106. In this embodiment, the through holes 204 allow the router bit to be linearly actuated parallel to third axis 130 but it cannot move in any other directions, e.g. parallel to the template support plane. This template allows bores 205 to be made into the workpiece, such as by using a plunging action parallel to the third axis 130 with the router 300. This is efficiently performed using a plunge router. This could be used for making joints that use dowels. For example, FIG. 16 includes second template 202 and a workpiece 207 that illustrates bores 205 for forming dowel connections. The router would be guided for linear motion along third axis 130 to form the bores 205.

Further, the second template 202 could be used to form rows of holes, such as for a peg board or shelving unit. Further, template locating pin 209 can be located in the last through hole 204 in the second template 202 and located in the last hole formed in the workpiece to align the template for forming more holes. This would allow for an unlimited number of holes to be provided in each row.

Figure 13:
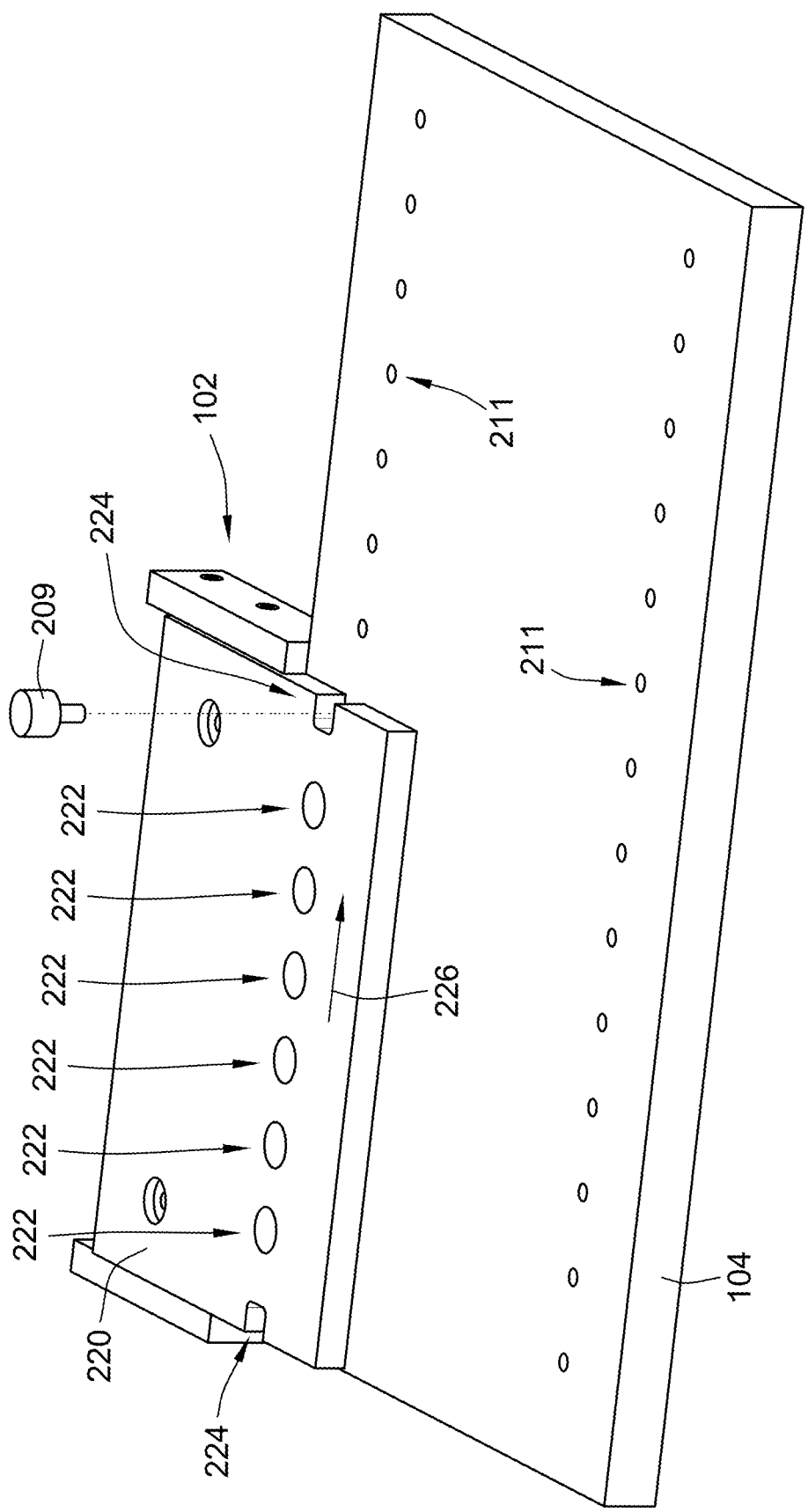
FIG. 13 is a perspective illustration of a further alternative template for use with the workpiece joining jig.
Figure 14:
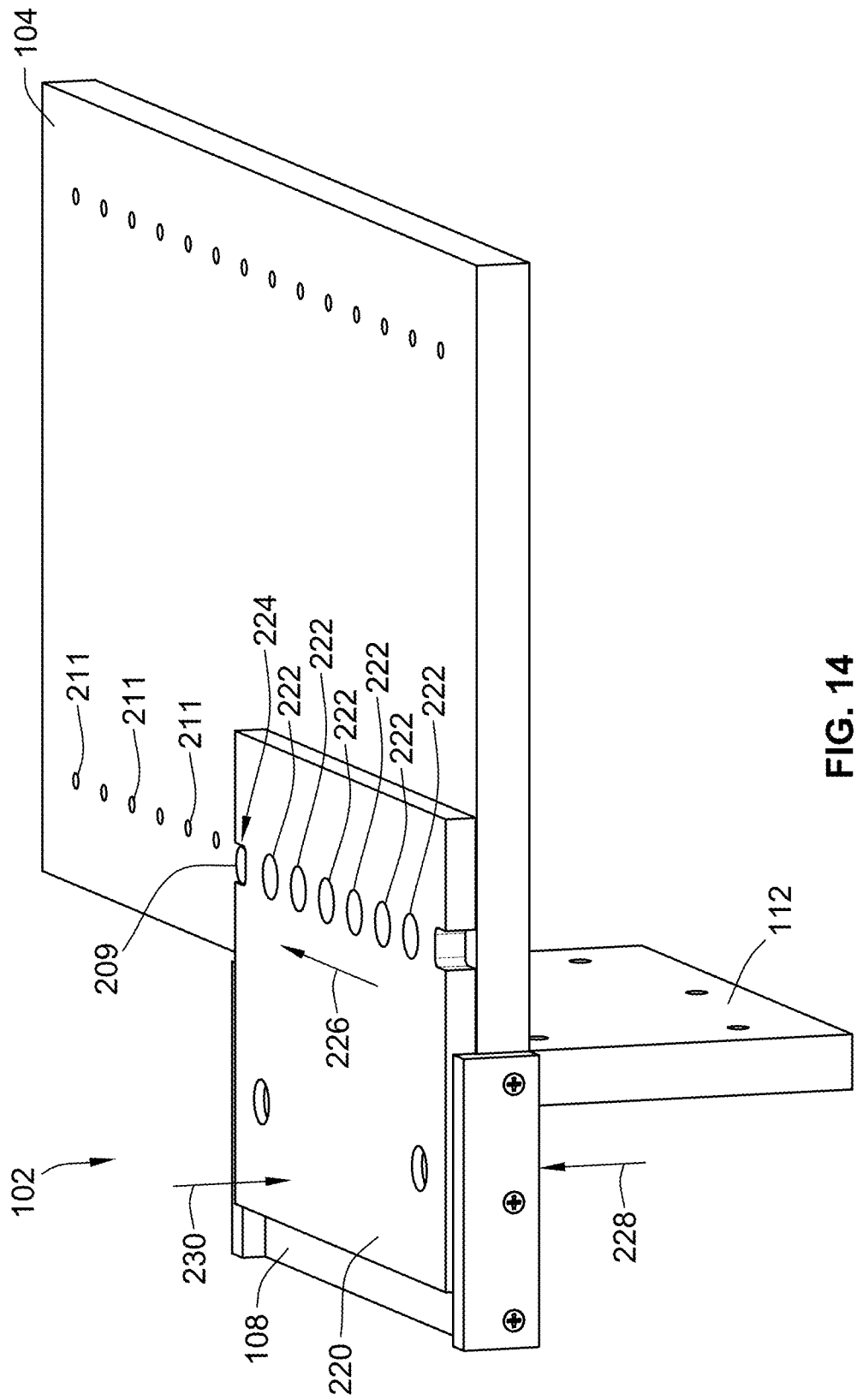
FIG. 14 is an alternative illustration of FIG. 13.

A fourth template 220, illustrated in FIGS. 13 and 14, similarly includes through holes 222 and is similar to the second template 202. However, the fourth template 220 includes open ended notches 224 at opposed sides thereof. The open ended notches 224 allow for easier engagement with locating pin 209. In this embodiment, the template holding jig 102 and particularly the workpiece support 112 (see FIG. 14) can simply be abutted against the appropriate side of the workpiece 104 and then slid axially against the pin 209 to properly axially align the fourth template 220 relative to the previously formed holes 211 in the workpiece 104 for formation of the next set of holes in the row. The axial alignment ensures proper axial spacing of the previously formed holes 211 and the new holes that are going to be formed after the jig has been moved axially relative to the workpiece 104.

In a preferred implementation, the template holding jig 102 is sized to be held by hand. This is illustrated schematically by arrows 229, 230 in FIG. 14. This allows for easy formation of such rows of holes. More particularly, in such an embodiment, the thickness of the second template 202 or fourth template 220 and the template support 108 is small enough to be gripped by a user's hand while leaving the other hand free to operate the router 300. Preferably, this combined thickness is less than 2 inches.

Figure 12:
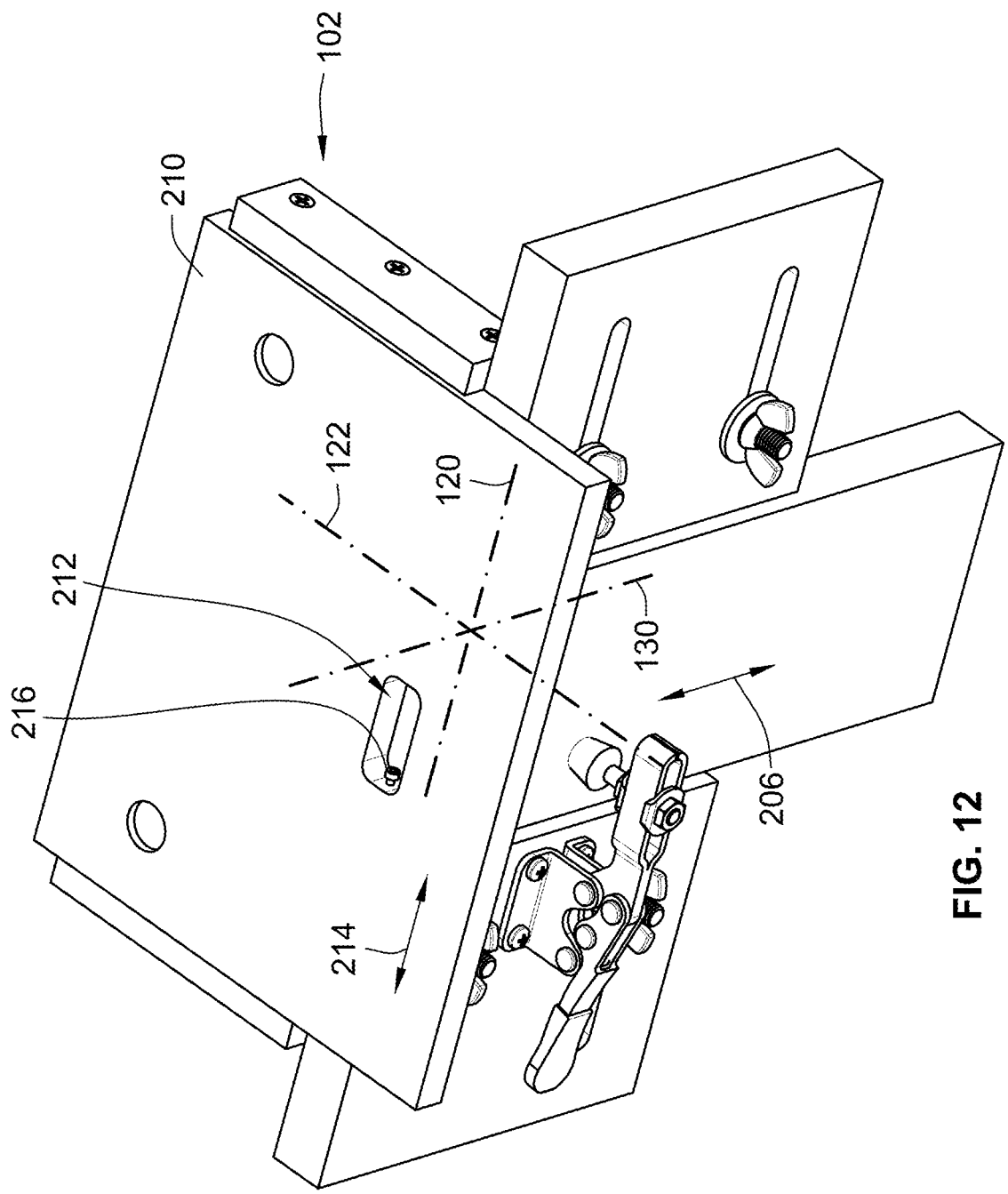
FIG. 12 is a perspective illustration of a further alternative template for use with the workpiece joining jig.
Figure 17:
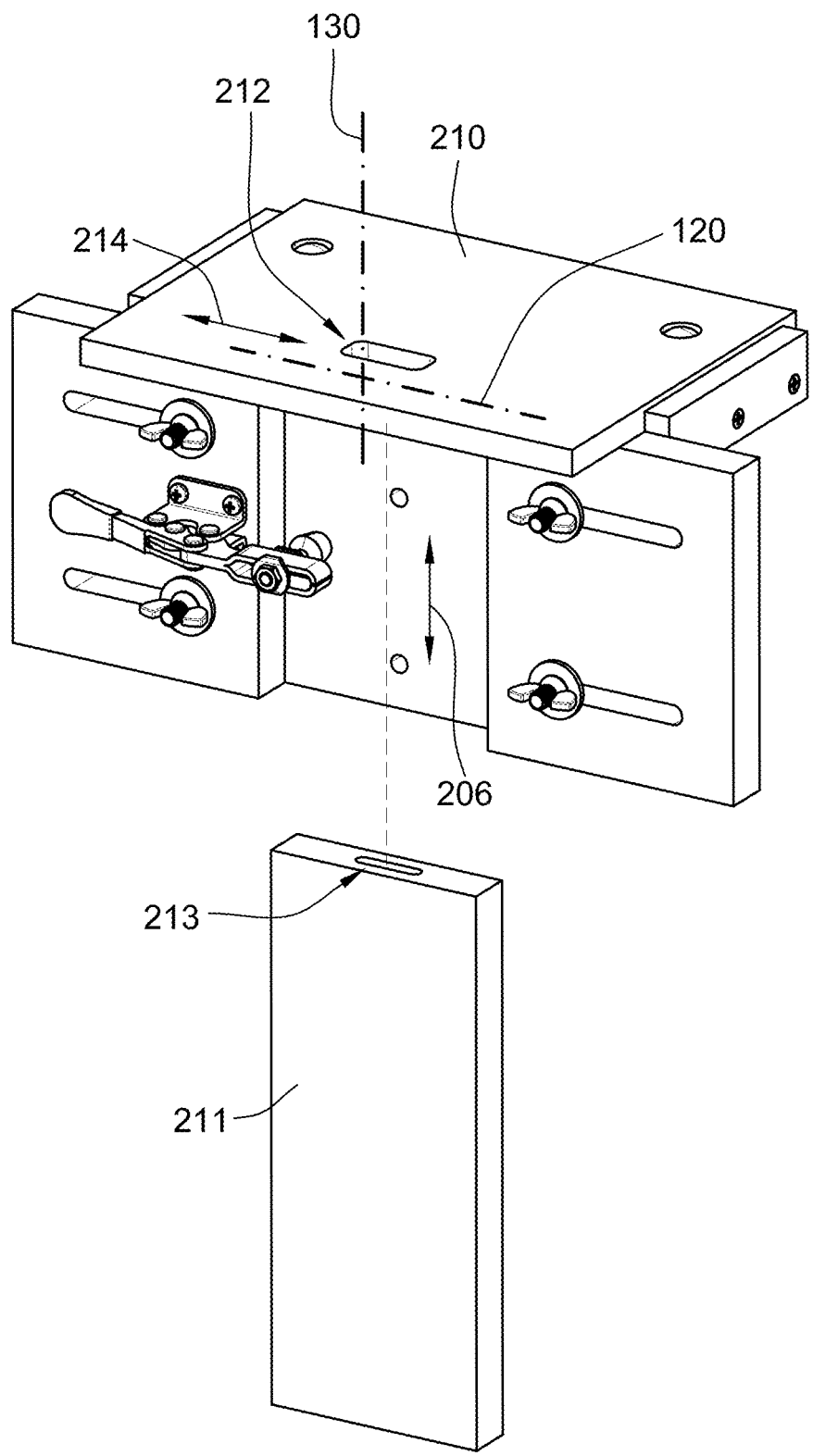
FIG. 17 is a perspective illustration of FIG. 12 illustrating a workpiece that has been routed for forming domino connections.

FIGS. 12 and 17 illustrate a third template 210. Third template 210 is similar to the first and second templates 106, 202 but with a third router guide region in the form of a fully closed elongated slot 212. The elongated slot 212 can be used to form elongated pockets 213 in workpiece 211 such as pockets for dominos or biscuits. The elongated slot 212 allows for predetermined motion both parallel to the third axis 130 and parallel to the first axis 120. Thus, again, a plunging motion, illustrated by arrow 206, is permitted parallel to third axis 130. However, to make the elongated pocket 213, the second degree of freedom illustrated by arrow 214 is also permitted. In this embodiment, the third template 210 is adjustable and includes a length adjuster in the form of an adjustment screw 216 to allow for selectively limiting the amount of motion by the router 300 parallel to the first axis 120. This allows for adjusting the amount of elongation provided for the elongated pocket.

Figure 18:
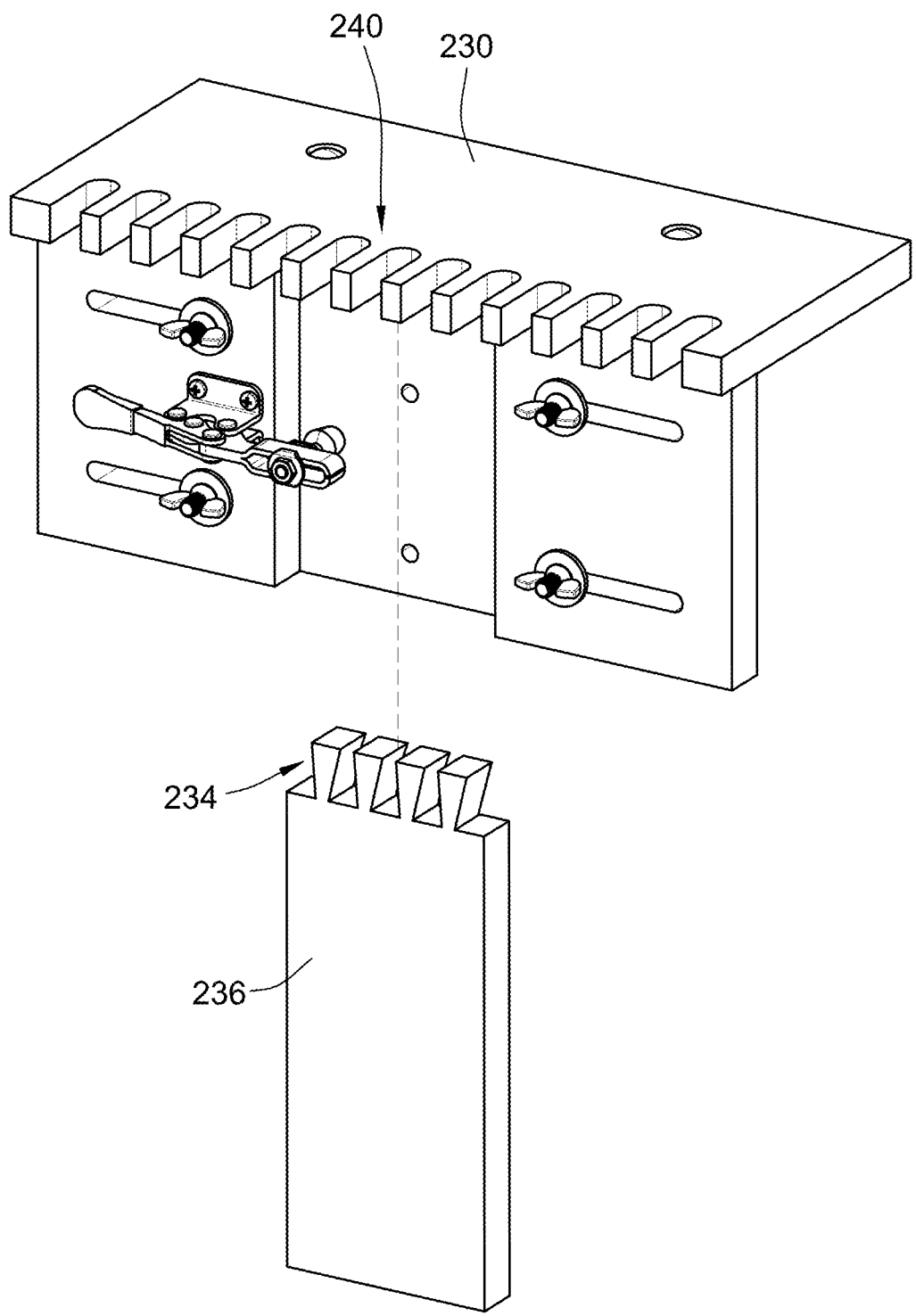
FIG. 18 is a perspective illustration of a further alternative template for use with the workpiece joining jig to form dovetail connections.
Figure 19:
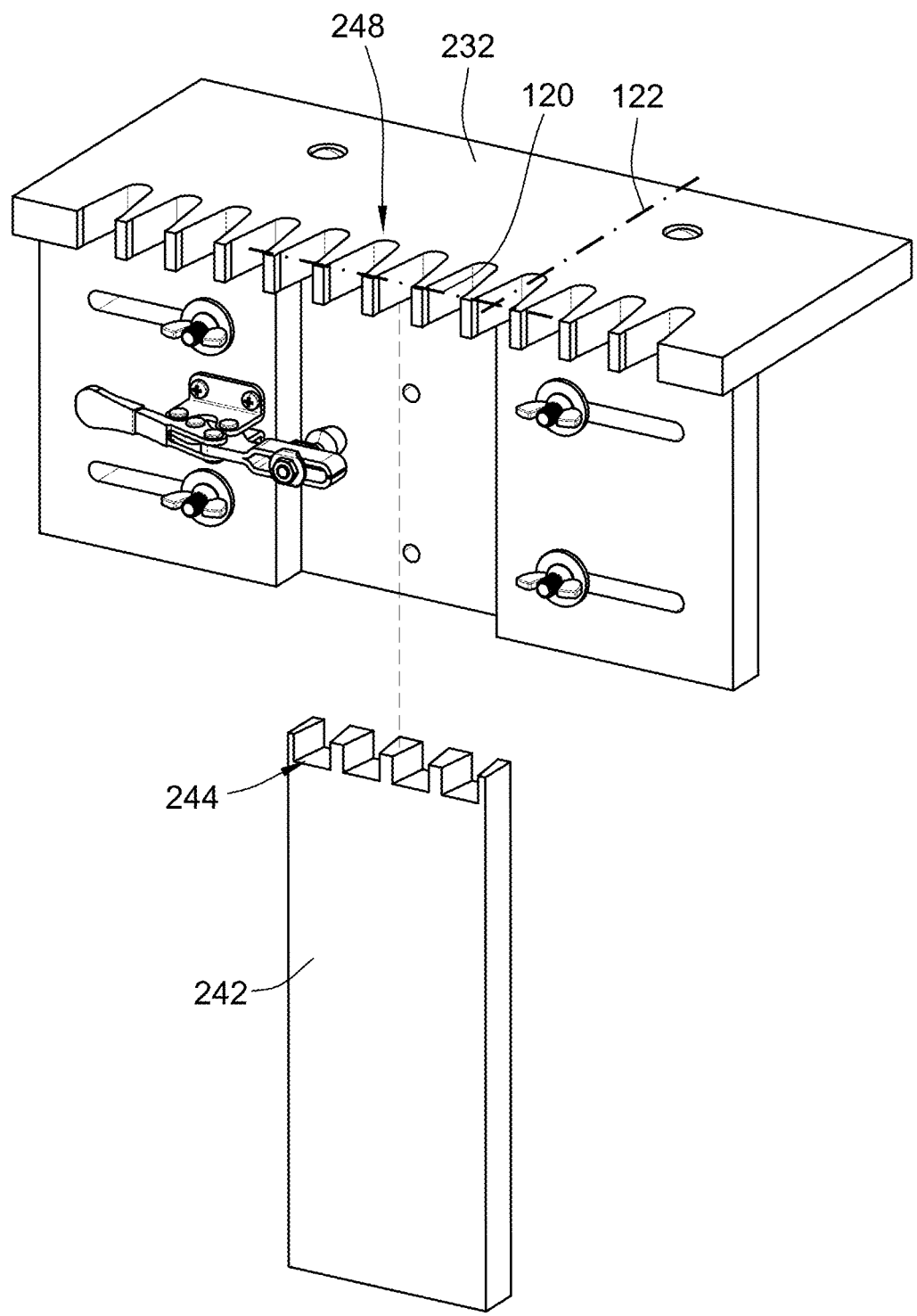
FIG. 19 is a perspective illustration of a further alternative template for use with the workpiece joining jig to form dovetail pins for cooperating with the workpiece formed using the template of FIG. 18.

FIGS. 18 and 19 illustrate fifth and sixth templates 230, 232. These two templates 230, 232 are used to form dovetail joints. The fifth template 230 is used to form the dovetails 234 in a first workpiece 236, e.g. to remove the material between adjacent dovetails 234 to form pin sockets. The fifth template 230 is substantially similar to first template 106 and includes a plurality of open ended elongated slots 240. These slots 240 guide motion of the router 300 just like elongated slots 200 discussed previously.

The sixth template 232 (FIG. 19) is used with a second workpiece 242. This template 232 allows for formation of dovetail pins 244, e.g. by removal of the material between adjacent dovetail pins to form dovetail sockets. The dovetail pins 244 are axially received into the dovetails 234 of the first workpiece 236. The sixth template 232 includes tapered open ended slots 248. The taper provided by the sidewalls defining the tapered open ended slots 248 allow for the tapered dovetail pins 244 to be formed.

Figure 20:
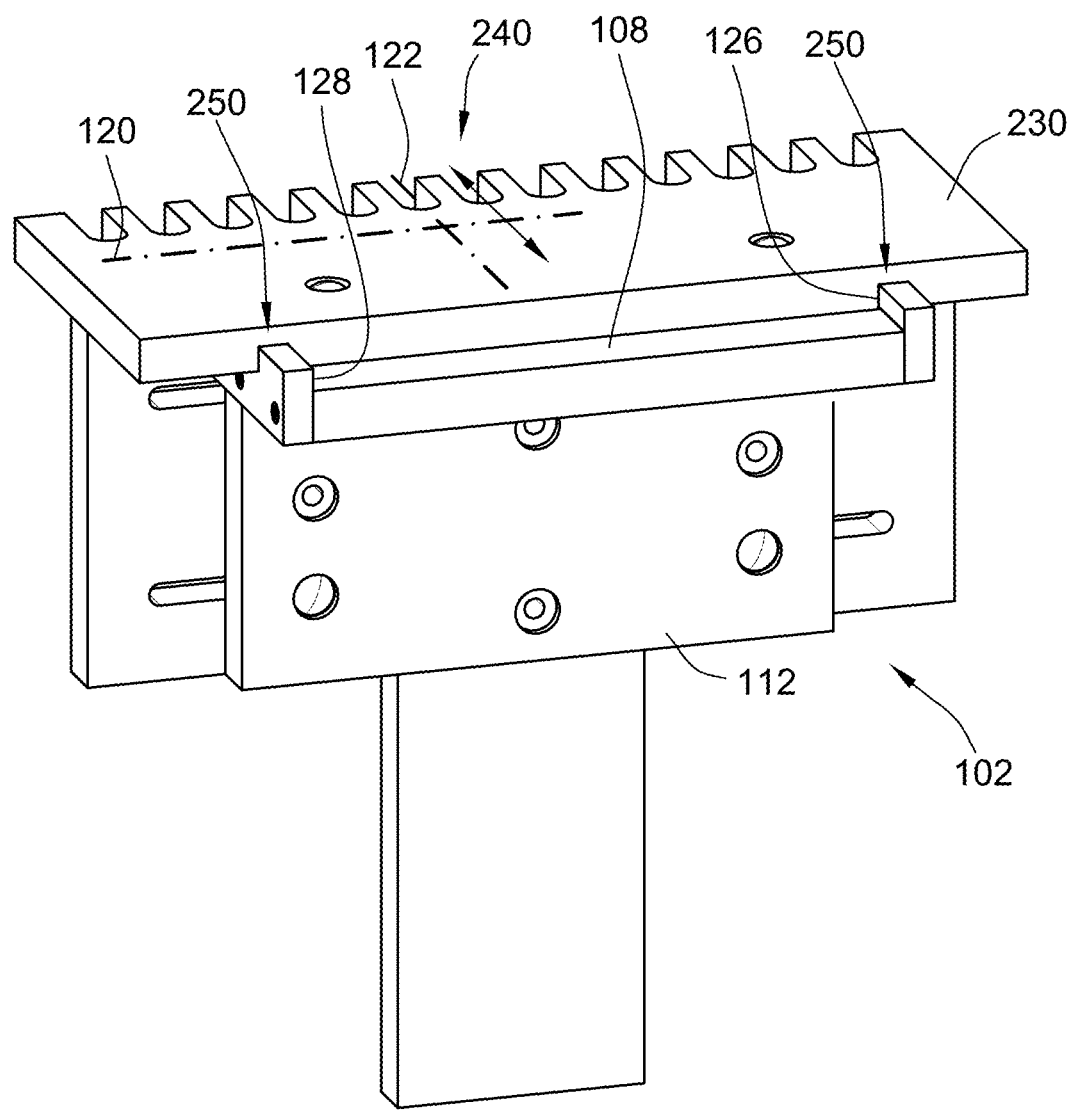
FIGS. 20 and 21 are rearview perspective illustrations of the templates of FIGS. 18 and 19.
Figure 21:
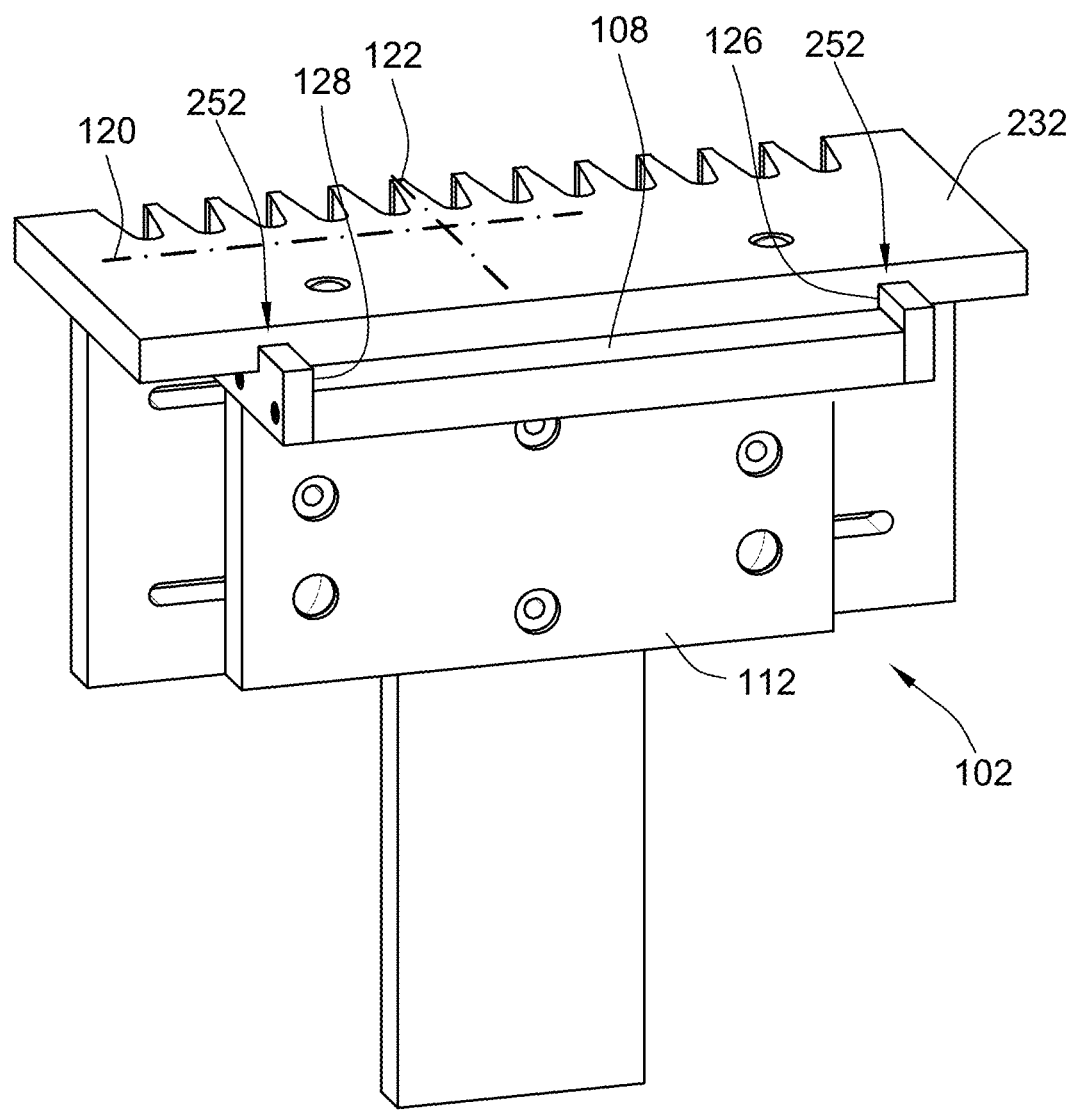

With reference to FIGS. 20 and 21, the fifth and sixth templates 230, 232 are wider than the template support 108. As such, the fifth and sixth templates 230, 232 have slots 250, 252 that receive the first and second walls 126,128. These slots 250, 252 will align the fifth and sixth templates 230 parallel to first axis 120 but still allow axial sliding motion parallel to second axis 122. Again, other configurations are contemplated such as a dovetail relationship.

Figure 22:
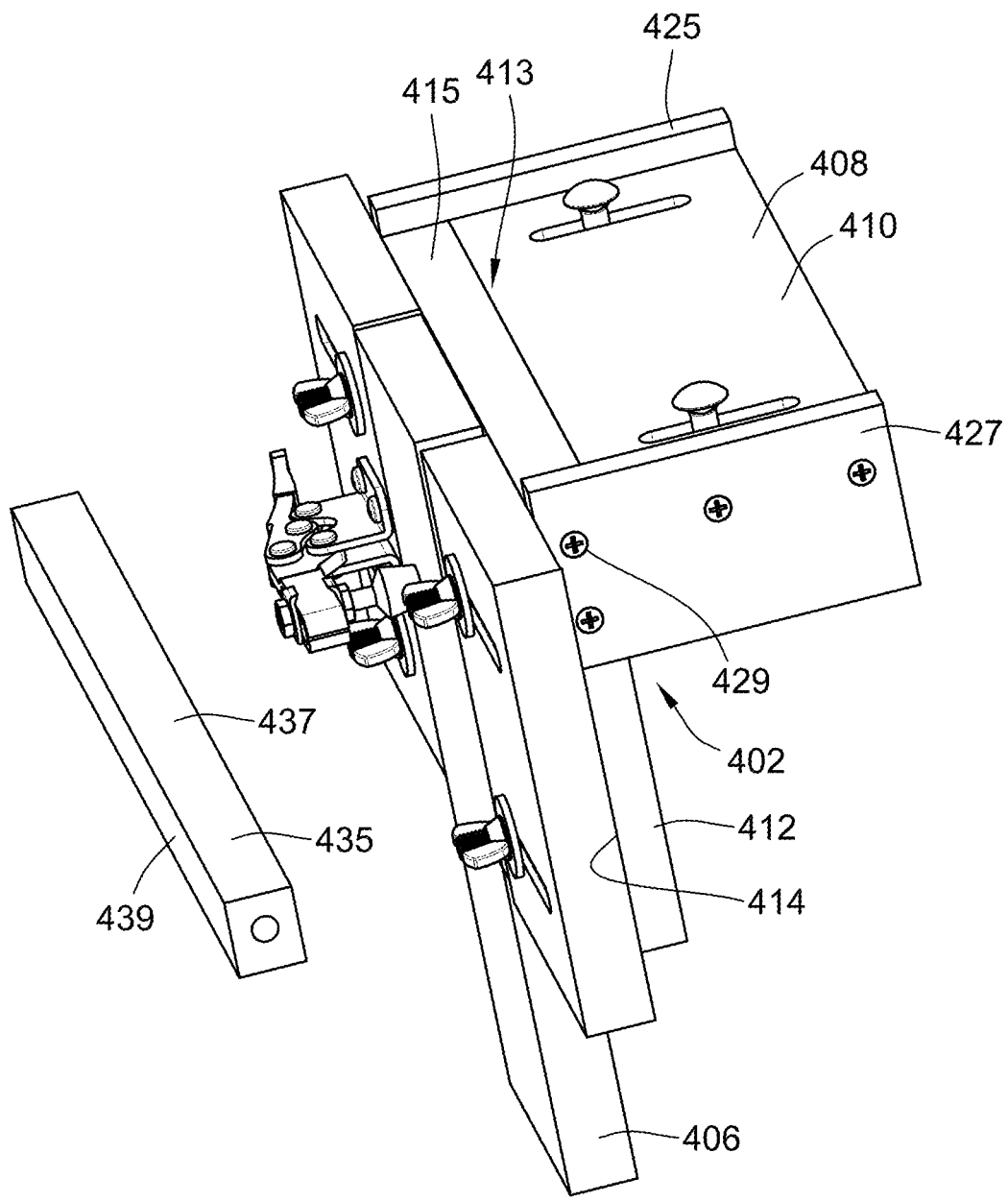
FIGS. 22-24 illustrate a configuration of a workpiece joining jig that incorporates a sacrificial support piece.

With reference to FIG. 22, an alternative configuration is provided. When forming some of the connections the router bit must pass entirely through the thickness of the workpiece. This is particularly true such as when forming dovetail joints or mortise and tenon joints. Workpiece joining jig 400 of FIG. 22 allows for such operation. Further, it is desirable to support the back side of the workpiece, e.g. the side that the router bit passes through second, so as to prevent tear outs of the portion of the workpiece that remains after forming the cut with the router bit. As such, it can be desirable to provide a sacrificial support piece that is pressed against the second side of the workpiece that the router bit extends into when forming the cut in the workpiece. Workpiece joining jig 400 provides one way of accommodating such a sacrificial support piece.

Workpiece joining jig 400 is similar to workpiece joining jig 100 and includes or can be modified to include all of the features and alternatives outlined above for workpiece joining jig 100. Each modification being a separate embodiment.

Workpiece joining jig 400 includes a template holding jig 402 used to support any of the templates outlined above. The template holding jig 402 includes a template support 408 that defines a template support plane 410 as well as a workpiece support 412 that defines a workpiece support plane 414. Again, like above, the template support plane 410 and workpiece support plane 414 are orthogonal to one another. However, unlike the prior template holding jig 102, the template support 408 and the workpiece support 412 are offset from one another to define a void 413 proximate the intersection of the template support plane 410 and the workpiece support plane 414 between ends of the template support 408 and the workpiece support 412 of the two components were extended. A sacrificial support piece 415 can be located within this void 413 when forming cuts that pass entirely through the thickness of the workpiece 406, e.g. through/into the workpiece support plane 414 of this embodiment.

Figure 23:
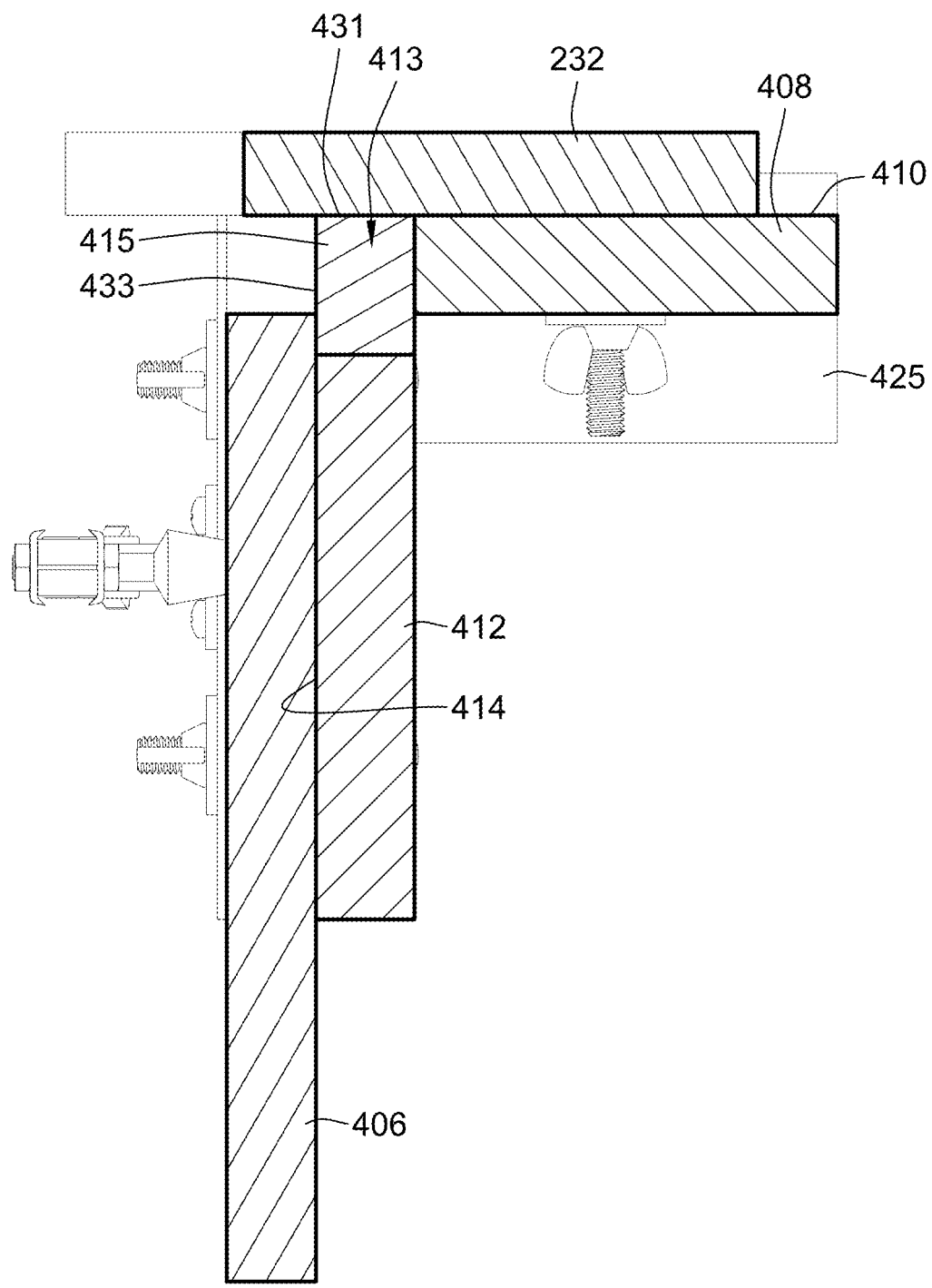
Figure 24:
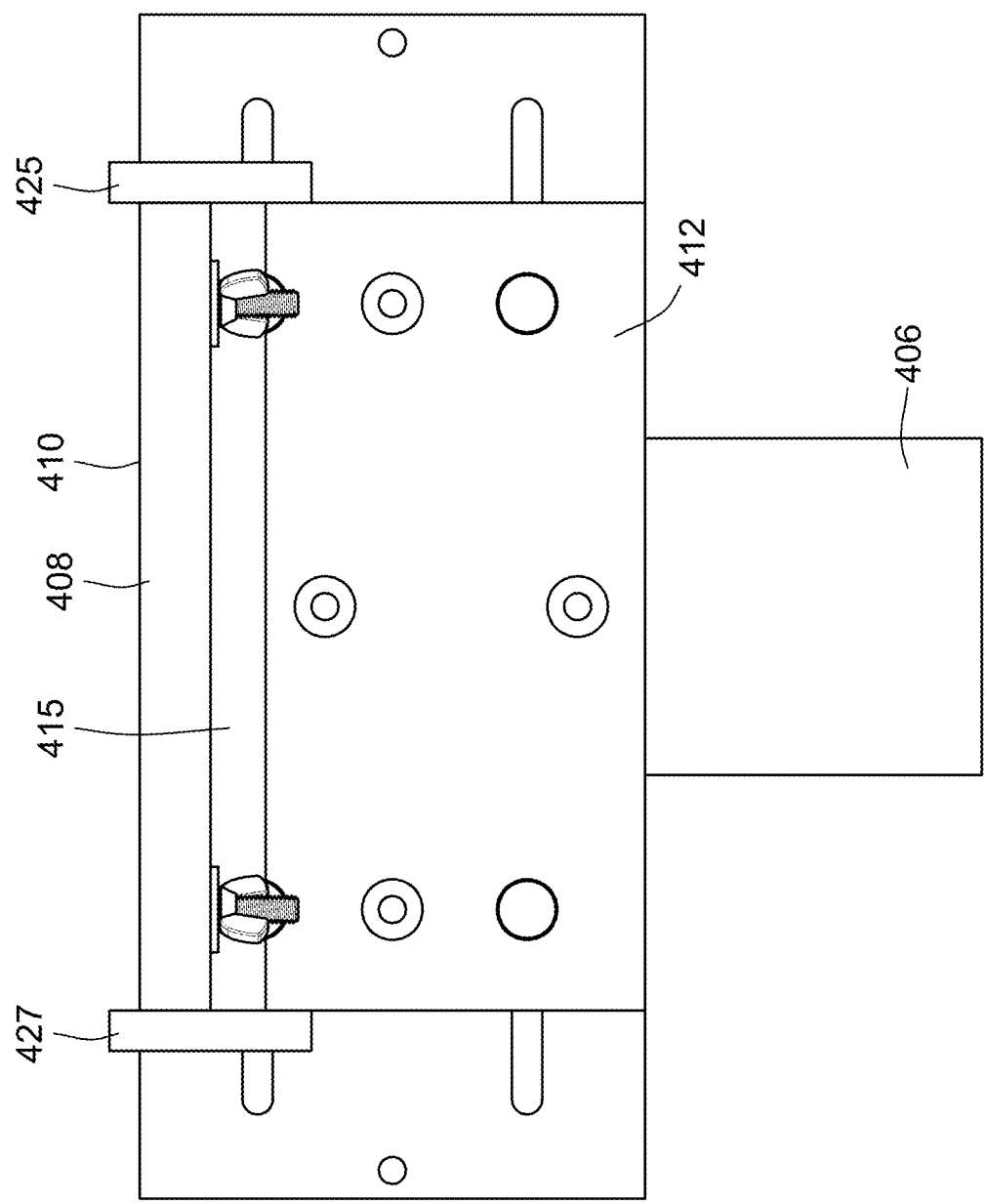

In this embodiment, the side plates 425, 427, which define the abutments for locating the templates, as described above, have been enlarged. As illustrated in FIG. 23, the template support 408 does not immediately overlap the workpiece support 412. As such, the enlarged side plates 425, 427 (only 425 shown in FIG. 23) are used to operably secure the workpiece support 412 to the templates support 408. The side plates 425, 427, templates support 408 and/or workpiece support 412 may include locating features to help maintain the proper orientation, e.g. orthogonal, of the workpiece support plane 414 and templates support plane 410. While illustrated as having the sacrificial support piece 415 located between side plates 425, 427, other configurations could have the side plates 425, 427 provide part of void 413 such that longer sacrificial support pieces could be mounted to the template holding jig 402, e.g. longer than the width of the template holding jig 402.

Further, a mechanism, illustrated in the form of screws 429 (FIG. 22), can be used to selectively secure the sacrificial support piece 415 relative to the template support 408 and the workpiece support 410. Preferably, the size and shape of the sacrificial support piece 415 is such that the two outer surfaces 431, 433 perfectly align with and would otherwise form part of the template support plane 410 and workpiece support plane 414. The sacrificial support piece 415 can be formed from, preferably, any material that properly supports the workpiece 406 from tear outs but that does not, preferably, damage the router bit. Further, the user himself could easily prepare replacement sacrificial support pieces 415 from scrap pieces of material.

Further, when the user is forming a cut that does not extend entirely through the thickness of the workpiece 406, a non-sacrificial support member 435 can be located in void 413. This non-sacrificial support member 435 can be secured using screws 429. Further, just like the sacrificial support piece 415, the size and shape of the non-sacrificial support piece 435 is such that the non-sacrificial support piece 435 fills void 413 and the two outer surfaces 437, 439 perfectly align with and would otherwise form part of the template support plane 410 and workpiece support plane 414. This non-sacrificial support piece 435 could be option in that there is no need to support the backside of the workpiece 406 in this instance to prevent tear out as the router bit will not penetrate that surface of the workpiece (e.g. the surface that rests against the workpiece support 412).

Again, this option of providing a way to support a sacrificial support piece is fully compatible with all options outlined above.

Figure 25:
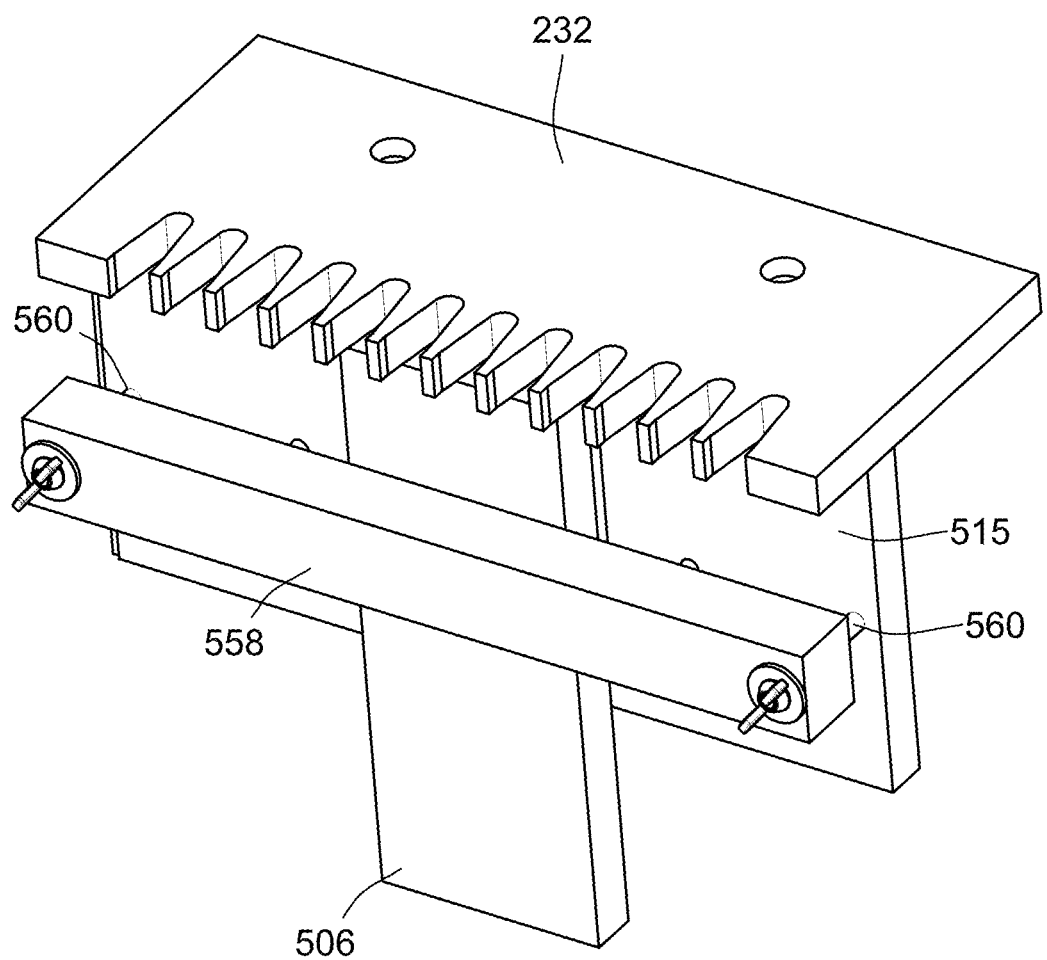
FIGS. 25-27 illustrate an alternative configuration of providing a sacrificial support piece that uses the workpiece joining jig of FIG. 1.
Figure 26:
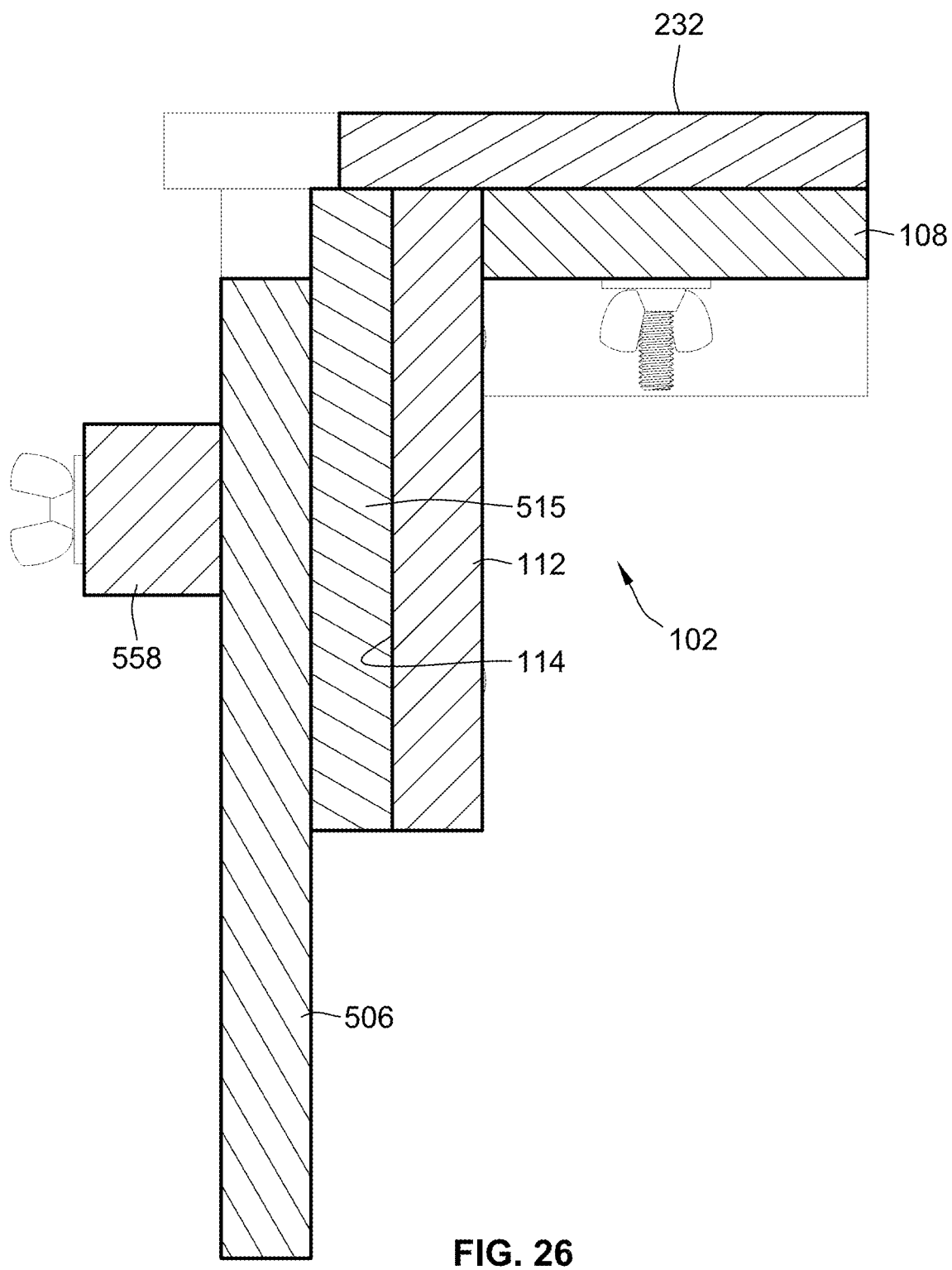
Figure 27:
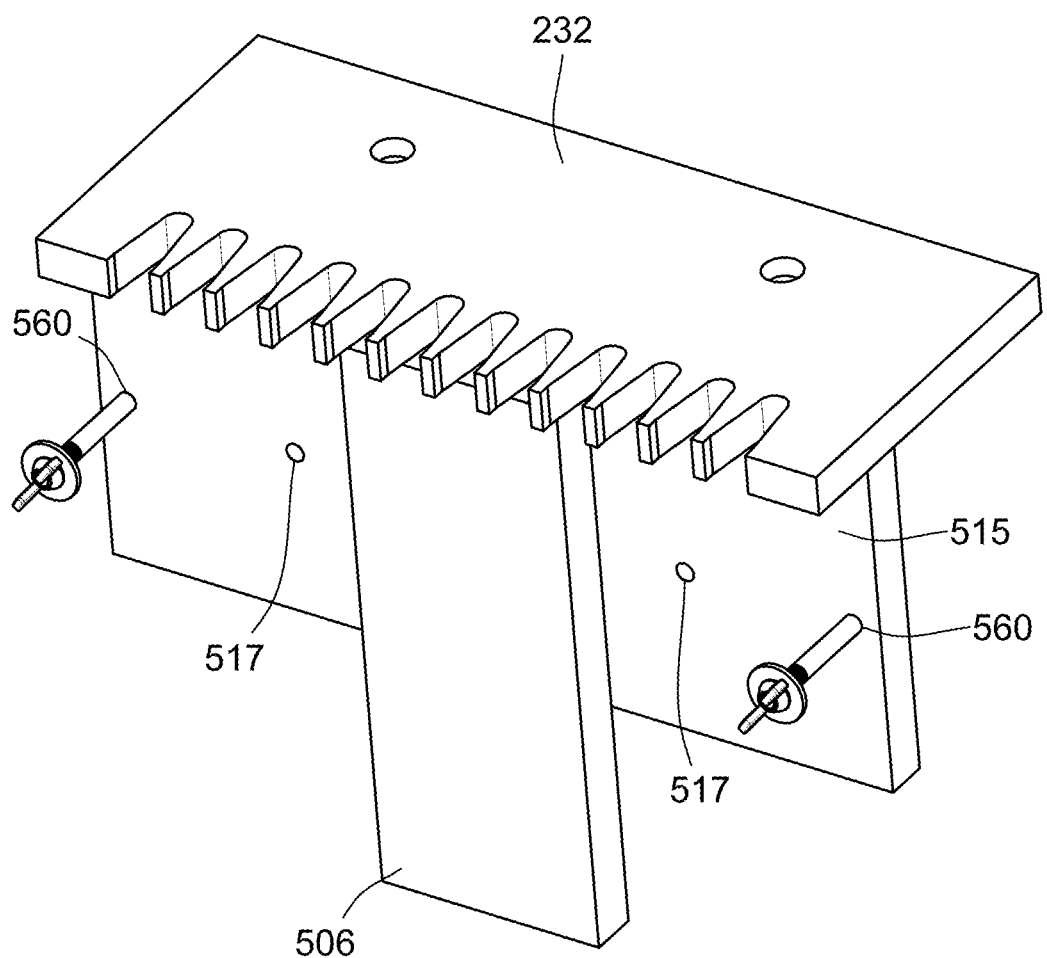

An alternative option for providing a sacrificial support piece is provided by the configuration illustrated in FIGS. 25-27. This configuration can be used with either templates support jig 102 or 402. It will be described with reference to template support jig 102.

In this configuration, the sacrificial support piece 515 is directly attached to and against the workpiece support plane 114 defined by the workpiece support 112 (see e.g. FIG. 26). This can be done using bolts 150, 151 (see e.g. FIG. 2) that pass through holes 517 (see FIG. 26) that pass through the sacrificial support piece 515 and corresponding holes 152, 153 formed in the workpiece support 112.

However, in this embodiment, the sacrificial support piece 515 prevents use of clamp 158 and side pieces 146, 148 (see e.g. FIG. 2). As such, this configuration includes a clamp member 558 that is operably connected to the sacrificial support pieces 515 for securing the workpiece 506 to the template support jig 102. In this embodiment, bolts 560 selectively secure the workpiece 506 to the sacrificial support piece 515. In this instance, the surface against which the workpiece 506 rests of the sacrificial support piece 515 could be considered to define a workpiece support plane.

While FIGS. 22-27 only relate to the use of template 232, other templates, such as template 230 could likewise be used, particularly for forming dovetail type joints where the router bit must pass entirely through the thickness of the workpiece.

Embodiments may be provided where only the template holding jig is provided. Alternatively, kits can be provided that include, for example, the template holding jig and a plurality of templates. Alternatively, kits could be provided that include the template holding jig and the miter fence. Further kits could include all of the various components discussed herein.

Figure 28:
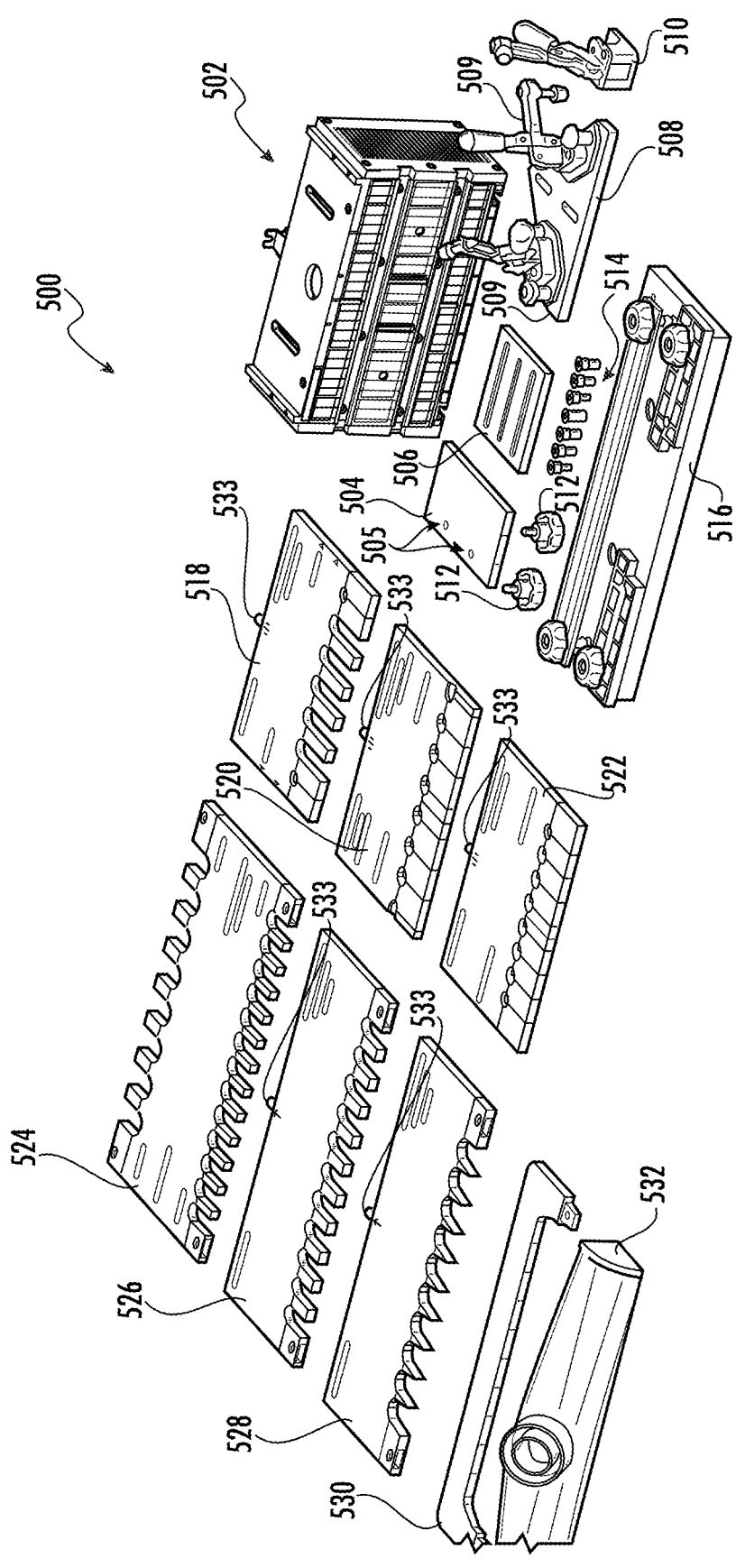
FIG. 28 illustrates a workpiece joining jig kit providing for various workpiece joining jig assemblies comprising further embodiments according to the teachings of the instant invention.

FIG. 28 illustrates a workpiece joining kit 500 including a further embodiment of a template holding jig 502 similar to the template holding jig 102 (FIG. 1) previously described but with further features such as, sidewall panels for clamping to a work bench or other device when opened, vacuum features for dust collection, slots and channels for a front workpiece support for mounting locating features and clamps, and micro adjustment for moving a template in directions towards and away from a workpiece that is to be routed.

The workpiece joining kit 500 includes, a template holding jig 502, a first workpiece stop 504, a second workpiece stop 506, a miter fence 508, first workpiece clamps 509, second workpiece clamp 510, template fasteners 512, a plurality of spacer pins 514, a clamping bar arrangement 516, a Hoffmann template 518, a micro-adjustment abutment pin template 520, a dowel template 522, a box joint template 524, a dove tail template 526, a dove tail pins template 528, a router support 530, and a dust collector 532. Templates 518, 520, 522, 526, 528 can include a micro-adjustment screw 533. Any one of the templates 518, 520, 522, 524, 526, and 528 can be removably fixed to provide for a first and a second state of the template 518, 520, 522, 524, 526, and 528 when attached to the template holding jig 502 as previously discussed with respect to first template 106 (FIG. 2) and the template holding jig 102 (FIG. 2) and as further discussed below.

Embodiments of the workpiece joining kit 500 can include, by way of non-limiting examples, all of the various components discussed above or any number of lesser components.

Figure 29:
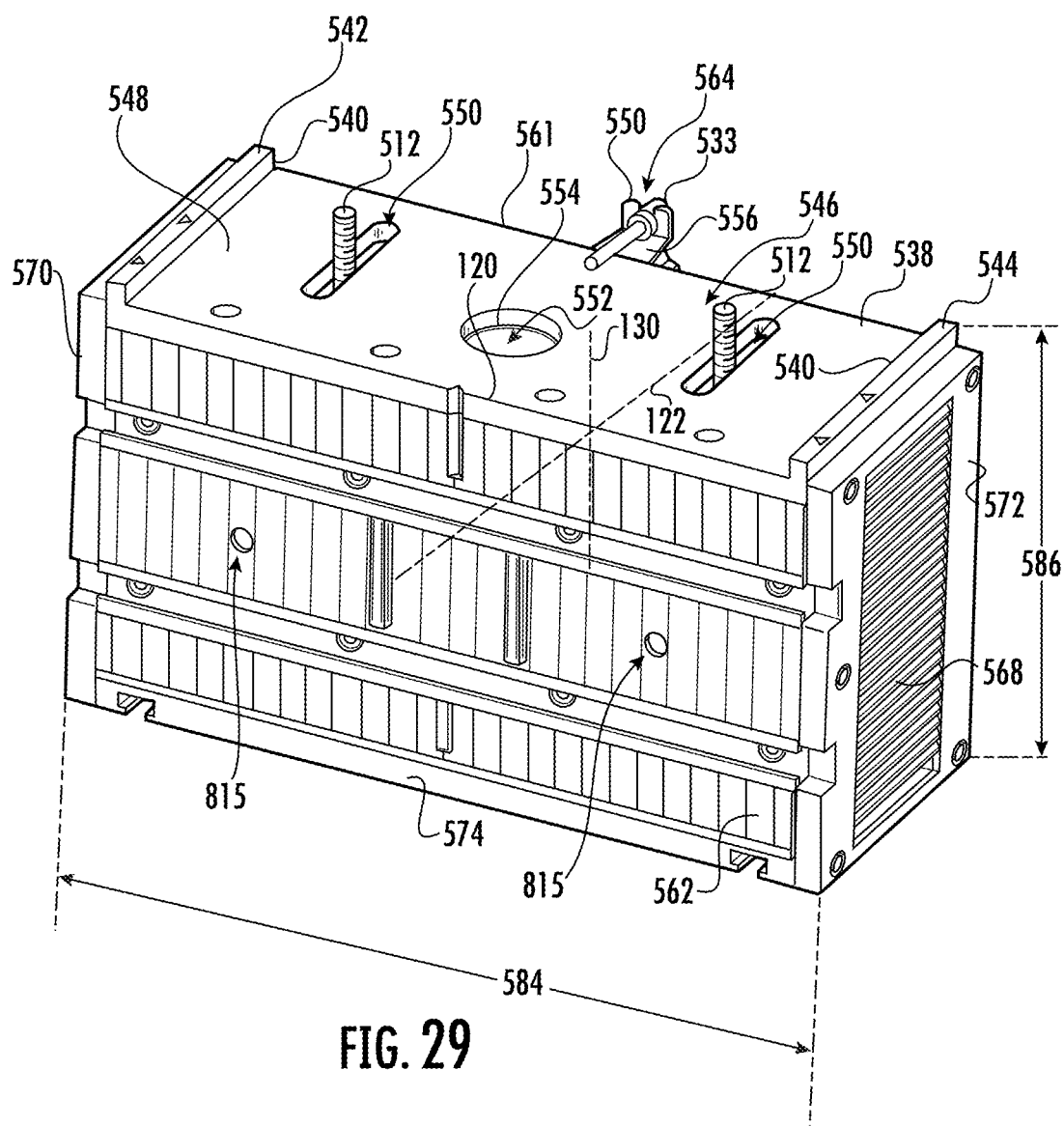
FIG. 29 is front right side isometric view of the template holding jig of FIG. 28 in a first state.

Turning to FIG. 29, a front right side view of the template holding jig 502 is illustrated. The template holding jig 502 generally includes a frame that is provided by a template support 538, a workpiece support 562, a pair of sidewalls 570, 572 (also referred to sidewall frames 570, 572), and a base 574.

The template support 538 is generally spaced apart from and parallel to base 574. The pair of sidewalls 570, 572 are spaced apart from one another and extend generally orthogonally to the base 574 and template support 538. The workpiece support 562 extends generally orthogonally relative to the template support 538, the base 574, and the pair of sidewalls 570, 572.

In this example, the pair of sidewalls 570, 572 and workpiece support 562 generally interconnect the template support 538 to the base 574.

The template support 538 may be considered a first side, also referred to as a top side, of the template jig 502.

The template holding jig 502 has a total width 584 measured between the outer extents of first sidewall frame 570 and the second sidewall frame 572. The template holding jig 502 has a total height 586 measured between the base 574 and the template support 538.

Template guide 540 laterally aligns templates 518, 520, 522, 524, 526, 528 (FIG. 28). The lateral alignment is provided as was described above with respect to template guide 116 (FIG. 2) and first wall 126 (FIG. 2) and second wall 128 (FIG. 2). Template guide 540 includes first wall 542 and second wall 544 defining a channel 546 therebetween with the bottom of the channel 546 defined by a top surface 548 of the template support 538.

A template attachment in the form of template fasteners 512 operably fixes the templates 518, 520, 522, 524, 526, 528 (FIG. 28) to the template holding jig 502 in order to route a workpiece. The template support 538 includes slots 550 that each receive one of the template fasteners 512 (FIG. 28). In this example, the templates, such as templates 518, 520, 522 (FIG. 28), have threaded blind holes located in a bottom surface of the templates 518, 520, 522 as will be discussed below. Here, the fasteners 512 may be loosened, but not removed, from the templates so as to secure the templates to the template support 538, but still allowing positioning of the templates parallel to the second axis 122.

Where one of templates 524, 526, 528, (FIG. 28) is selected in routing a workpiece, then as with respect to the fifth template 230 (FIG. 18) and the sixth template 232 (FIG. 28), the templates 524, 526, 528 (FIG. 28) are not entirely received in the channel 546. Instead, like the fifth and the sixth templates 230 (FIG. 18), 232 (FIG. 22), each of the templates 524, 526, 528 (FIG. 28) include a pair of template channels in the bottom surface of the templates 524, 526, 528. The template channels receive the first and second walls 542, 544 respectively to laterally align templates 524, 526, and 528 (FIG. 28) and provide movement of the templates 524, 526, 528 as was described above with respect the fifth and sixth templates 230, 232 (FIGS. 20 and 21). However, fasteners 512 may also be used to secure these templates to the template support 538.

Template support 538 (FIG. 28) includes a vacuum aperture 552 that extends completely through the template support 538, such that it extends through the top surface 548 of the template support 538 and a bottom surface 554.

Figure 30:
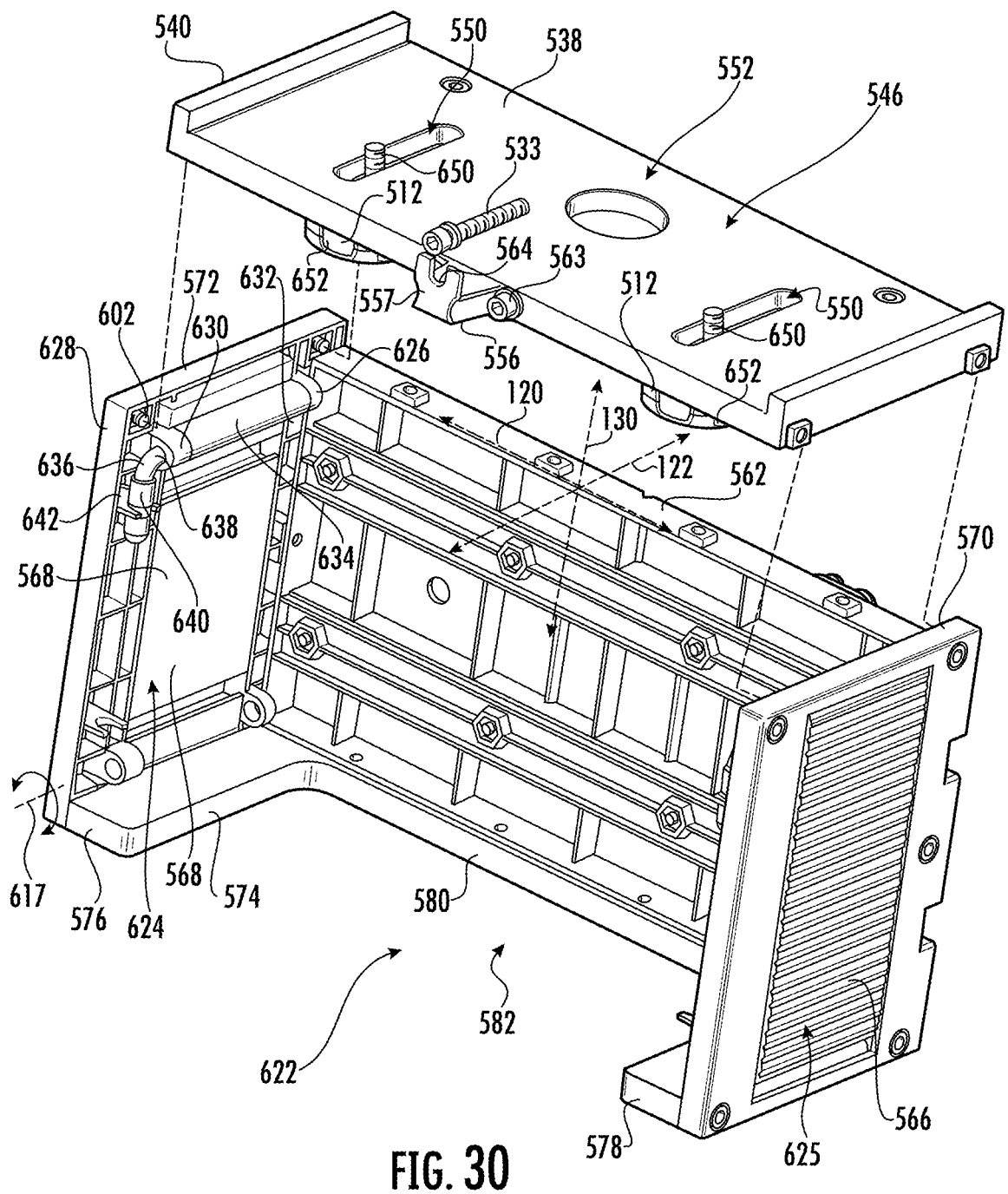
FIG. 30 illustrates a back partial assembly view of a template with the template holding jig of FIG. 28.

As illustrated in FIGS. 29 and 30, template support 538 may include a micro-adjustment abutment 556. In this example, the micro-adjustment abutment 556 extends from a back side 561 of the template support 538 in a direction away from a workpiece support 562 that is a front side, also referred to as a third side, of the template holding jig 502. The micro-adjustment abutment 556 includes an upstanding wall portion 557 that extends above the top surface 548 of the template support 538 that defines u-shaped receptacle 564 (FIG. 29) that receives micro-adjustment screw 533 of the template 518, 520, 522 (FIG. 28). The micro-adjustment screw 533 cooperates with the upstanding wall portion 557 to provide fine adjustment of the position of the associated template along axis 122.

The micro-adjustment abutment 556 may be integral with the template support 538, or may be, for example, welded or alternatively fastened using fasteners, for example screws 563, to attach to the back side 561 of the template support 538. Further, in other embodiments, the abutment 556 could simply be the upstanding wall portion 557 that extends vertically upward relative to the template support 538, and template support plane defined thereby.

Figure 31:
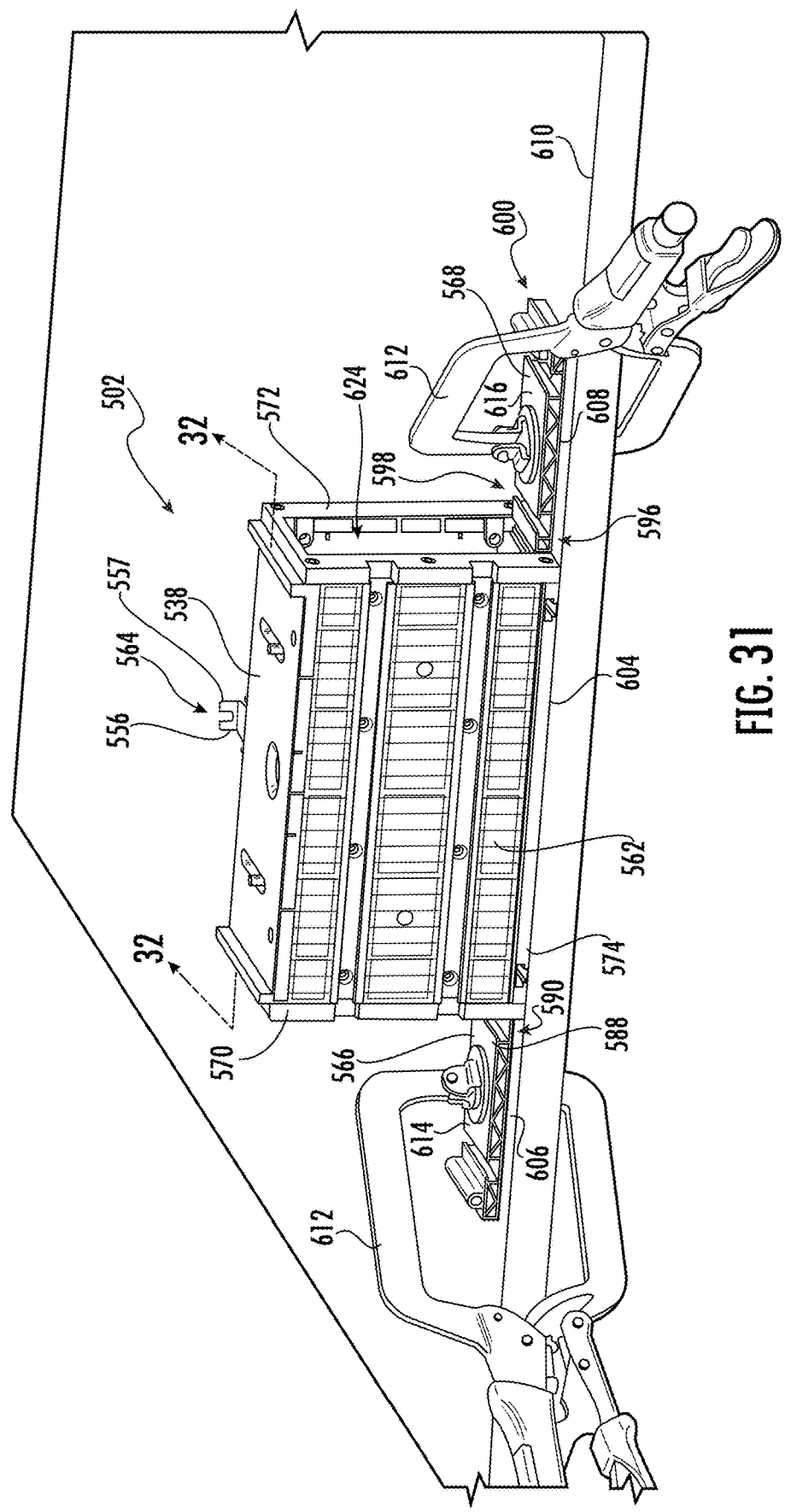
FIG. 31 is a front right side isometric view of the template holding jig of FIG. 28 in a second state.
Figure 32:
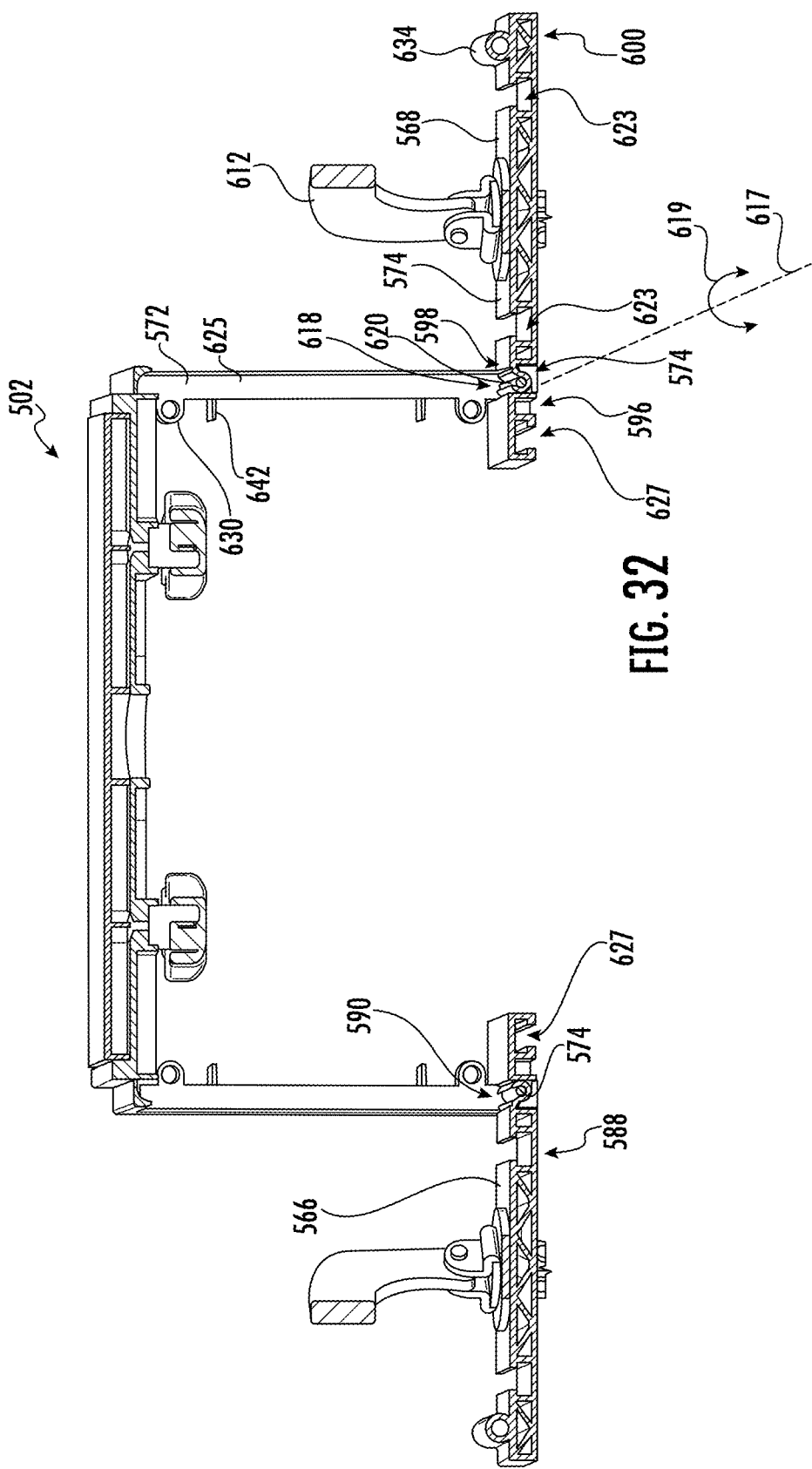
FIG. 32 is a vertical cross section of the template holding jig of FIG. 31.
Figure 33:
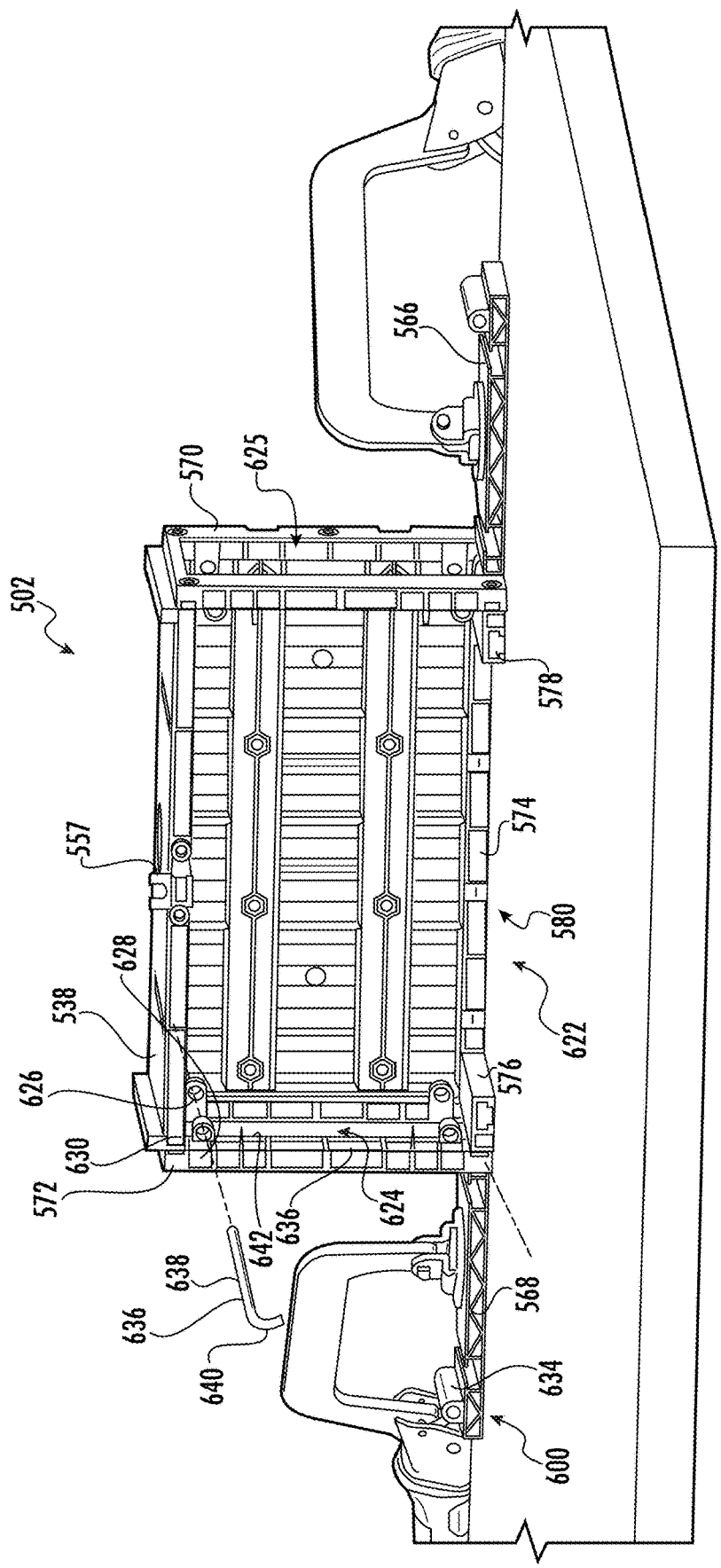
FIG. 33 a rear isometric view of the template holding jig of FIG. 31.

The template holding jig 502 includes side panels 566, 568 that may be used for clamping the template holding jig 502 to a worksurface, e.g. a work bench as illustrated in FIGS. 31-33. The side panels 566, 568 may be oriented in a first state referred to as a closed state, such as illustrated in FIGS. 29 and 30, when not in use. When the side panels 566, 568 are desired for clamping purposes, they may be transitioned, such as by a rotating motion in this example, to a second state referred to in an open state.

In the closed state, the first and second side panels 566, 568 are folded up such that they extend generally orthogonal to the base 574 and template support 538. In this state, a larger extent of each of the side panels 566, 568 is received in the adjacent sidewall 570, 572.

In particular, the first side panel 566 is located within the first sidewall frame 570 of the template holding jig 502 in the closed state. By "located within" it is meant that four sides of the first side panel 566 are surrounded by the first sidewall frame 570 such that the first sidewall panel 566 is framed by the first sidewall frame 570. The first sidewall frame 570 extends from a base 574 of the template holding jig 502 to the template support 538 that is the first side.

The second side panel 568 is located within a second sidewall frame 572 when the template holding jig 502 is in the closed state. The second sidewall frame 572 extends from the base 574 to the template support 538 that is the first side.

The base 574 has a first leg 576, a second leg 578, and a third leg 580 extending between the first leg 576 and the second leg 578. An opening 582 is defined between the first leg 576 and the second leg 578. Other embodiments may include a fourth leg (not illustrated) instead of the opening 582 or alternatively, the base 574 may be a solid rectangle in cross section (not illustrated).

Figure 36:
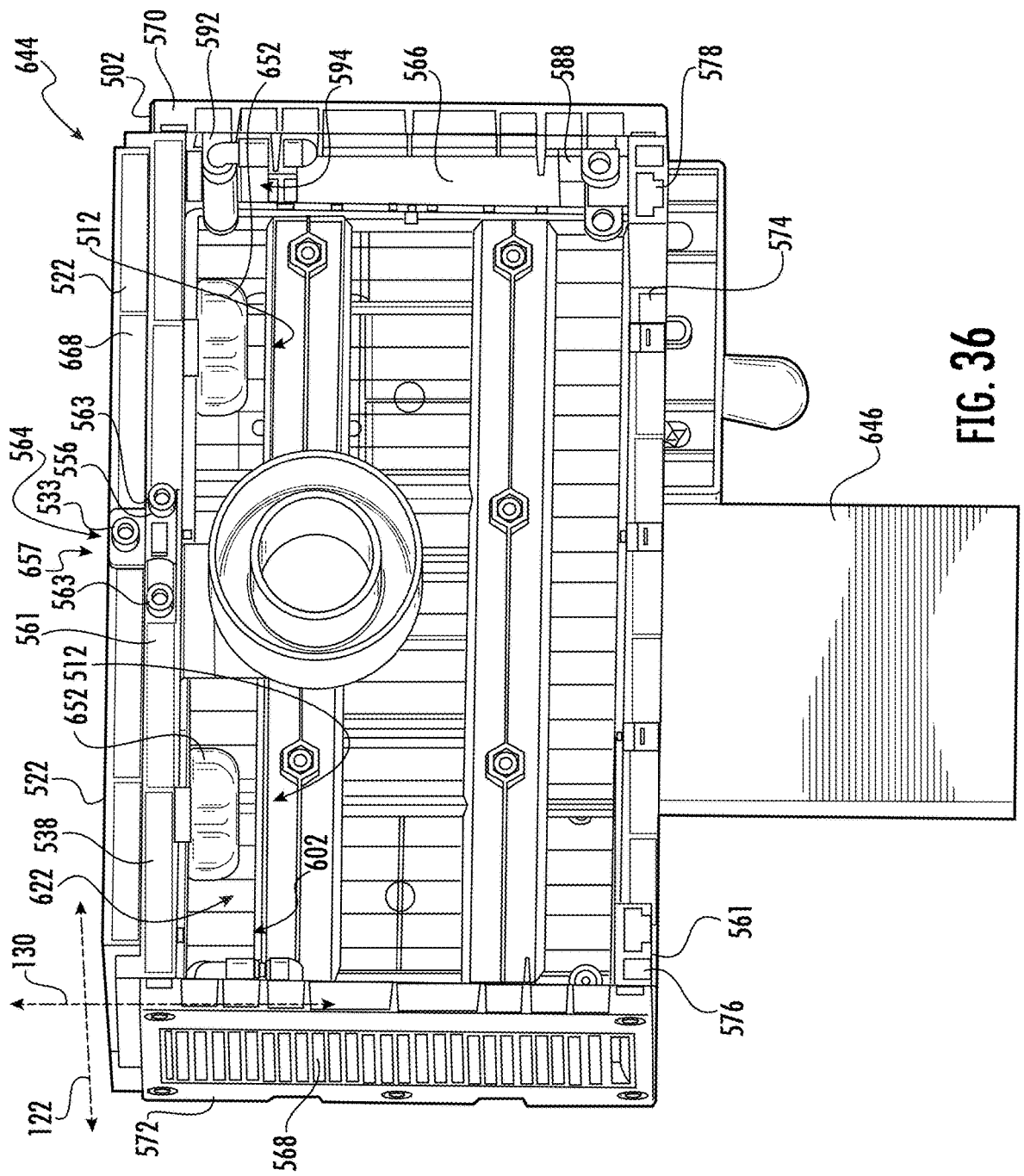
FIG. 36 is a rear view of the first workpiece joining jig assembly of FIG. 34.

FIGS. 31 through 33 illustrate the template holding jig 502 in a second state wherein the first side panel 566 and the second side panel 568 are open. With reference to FIG. 32, to permit the template holding jig 502 to transition to the second state, the first side panel 566 is pivotably connected to the base 574. The first side panel 566 is connected at a first end 588 by a first hinge arrangement 590. The first side panel 566, in the closed state (FIG. 30), is selectively connectable to first sidewall frame 570 at a second end 592 by a first closing arrangement 594, as illustrated in FIG. 36.

With reference to FIG. 32, the second side panel 568 is pivotably connected to the base 574 at a second end 596 of the second side panel 568 by a second hinge arrangement 598. The second side panel 568, in the closed state, is selectively connectable to the second sidewall frame 572 at a second end 600 of the second side panel 568 by a second closing arrangement 602 (FIG. 30).

FIG. 31 illustrates that in the open state, a bottom surface 604 of the template holding jig 502 provided by base 574 is coplanar with an outer face 606 of the first side panel 566 and an outer face 608 of the second side panel 568. In other words, the outer faces 606, 608 and the bottom surface 604 all lie flat against a plane when the first side panel 566 and the second side panel 568 are fully open. The plane may be defined by a planar surface 610 which, as illustrated in FIG. 31, may be a table top or workbench on which the template holding jig 502 sits. In the open state, clamps 612 may be used to removably fix the template holding jig 502 to the planar surface 610 as seen in FIG. 31 by clamping clamps 612 against back face 614 of the first side panel 566 and back face 616 of the second side panel 568.

The opening and closing of the second side panel 568 will be described. However, like structures permit the opening and closing of the first side panel 566 in the same way as the second side panel 568. More specifically, because the first and second hinge arrangements 590, 598 are structurally similar only the second hinge arrangement 598 will be described with the understanding that first hinge arrangement 590 includes corresponding structure and functions the same as the second hinge arrangement 598. So too, because the first and second closing arrangements 594, 602 (FIG. 38) correspond and function similarly, only the second closing arrangement 602 will be described with the understanding that the first closing arrangement 594 functions the same as the second closing arrangement 602.

Turning to FIG. 32, the second hinge arrangement 598 pivotably connects the second side panel 568 to the sidewall frame 572 of the template holding jig 502.

In this example, the second hinge arrangement 598 includes a u-shaped channel 618 at the end 596 of the second side panel 568. The second hinge arrangement 598 also includes a pin 620 which may be integral with or attached to the sidewall frame 572 of the template holding jig 502. In this example, the pin 620 extends between opposed portions of sidewall 572. The u-shaped channel 618 receives the pin 620 such that the side panel 568, via u-shaped channel 618, is free to pivot about the axis 617 defined by the pin 620 so that the second side panel 568 can be rotated between the open and closed positions.

Here, the side panel 568 is rotated into the closed position by simply lifting the end 600 to rotate the second side panel 568 in a first direction 619 about axis 617 to its closed position (FIG. 30).

So too, once the second closing arrangement 602 (FIG. 38) has been released, the second side panel 568 may be rotated in the opposite direction to first direction 619 to the open position as illustrated in FIG. 32.

FIGS. 30 and 33 illustrate a rear of the template holding jig 502. A back opening 622 is defined between the template support 538, the base 574, the first sidewall frame 570 and the second sidewall frame 572. The back opening 622 permits ease of access to the closing arrangement 602.

As illustrated in FIGS. 31 and 33, the sidewalls 570, 572 define sidewall apertures 624, 625. The sidewall apertures 624, 625 receive the side panels 566, 568 in the closed state of the template holding jig 502 as illustrated in FIG. 30.

With reference to FIGS. 30 and 33, closing arrangement 602 includes first eyelet 626 on a first side 628 of the second sidewall frame 572 and a second eyelet 630 on a second side 632 of the second sidewall frame 572 such that the first and second eyelets 626, 630 are located on opposite sides of the second sidewall aperture 624. Closing arrangement 602 also includes a hollow cylinder 634 at end 600 of the second side panel 568. The closing arrangement 602 also includes a pin 636 (also referred to as a closing pin). The pin 636 extends through the pair of eyelets 626, 630 and cylinder 634 to secure the second side panel 568 in the closed state.

In other examples, only a single eyelet 626, 630 need be provided. Further, an eyelet could simply be a hole provided in the frame.

The pin 636 may be L-shaped having a long arm 638 and a short arm 640.

With continued reference to FIGS. 30 and 33, the second side panel 568 is fixed in the closed position via the second closing arrangement 602 by inserting the long arm 638 of the L-shaped pin 636 through the second eyelet 630, the hollow cylinder 634 of the second side panel 568, and then through the first eyelet 626. The short arm 640 of the L-shaped pin 636 may be snap fit into a retainer 642 on the first side 632 of the second sidewall frame 572 to fix the second side panel 568 to the second sidewall frame 572. The snap fit engagement is provided by rotating the pin 636 about an axis defined by arm 638 once the pin 636 is fully inserted into the eyelets 626, 630 and cylinder 634.

It can be readily appreciated that other second closing arrangements 602 are contemplated, for example, utilizing a straight pin, or locking pin or eye and hook type arrangements by way of non-limiting examples. Further yet, a threaded pin could be used as well.

The back opening 622 of the template holding jig 502 facilitates ease of removal the L-shaped pin to 636 to open the second side panel 568 and thereby transition the template holding jig 502 from its first closed state to its open state with both side panels 566, 568 opened. The second side panel 568 is opened by rotating the short arm 640 to unseat it from the retainer 642. Thereafter, the L-shaped pin 636 is pulled out through the second eyelet 630, the hollow cylinder 634 and the first eyelet 626 which permits the second side panel 568 to pivot open as explained above.

As illustrated in FIG. 32, side panels 566, 568 include T-slots 623 that extend parallel to axis 122. These slots can receive the ends of clamps sized to extend therein. Thus, other clamps besides clamps 612 are contemplated for clamping the template holding jig 502. Base 574 can also include T-slots 627 for receiving an end of a clamp therein as well.

Turning now to FIGS. 34-40, clamping of a workpiece 646 will be described. In these FIGS., a first workpiece joining jig assembly 644 with its components and with a clamped workpiece 646 clamped thereto is illustrated. The first workpiece joining jig assembly 644 includes the template holding jig 502 and the dowel template 522. Discussion of the first workpiece joining jig assembly 644 will include reference to the same axes as previously discussed with respect to the workpiece joining jig 100 (FIG. 2) with first template 106 (FIG. 2), namely first axis 120, second axis 122, and third axis 130.

The seating and movement of the dowel template 522 on the template support 538 (FIG. 35) in directions 648 parallel to axis 122, e.g. towards and away from the workpiece 646, and the planar surface defined by the workpiece support 562 is similar to that described with respect to the workpiece joining jig 100 (FIG. 2) with first template 106 (FIG. 2)

except for the differences to be discussed. While the description of the first workpiece joining jig assembly 644 with a clamped workpiece 646 will be discussed with respect to the attachment and movement of dowel template 522, it should be understood that the attachment of the Hoffmann template 518 (FIG. 28) and micro-adjustment abutment pin template 520 (FIGS. 28 and 41) their movement on the template support 538 are similar to those of the dowel template 520 and therefore will not be further discussed.

Dowel template 522 of the template holding jig 502 is seated on a top surface 548 of the template support 538 and positioned along axis 122 as desired relative to the clamped workpiece 646. After the desired position of the dowel template 522 is obtained, the dowel template 522 is removably fixed on the template support 538 and is selectively positioned relative to the workpiece 646 with a pair of the template fasteners 512.

As illustrated in FIG. 30, the back opening 622 in the back side 561 of the template holding jig 502 provides access to insert a threaded portion 650 of each of the template fasteners 512 up through the slots 550 of the template support 538 from below the template support 538. The knob 652 of each fastener 512 provides an outer most head diameter that is greater than that of the minor axis of the slots 550 so as to prevent the knobs 652 from passing through the slots 550 and to provide better gripping for the user to turn the knob 652.

The threaded portion 650 of each template fastener 512 is received, at least partially, in a threaded blind hole 654 (see FIG. 38) in a bottom side 656 (FIG. 38) of the dowel template 522. The bottom side 656 of dowel template 522 may have a bottom surface 659 having ribbing, also referred to as protrusions extending therefrom that provide for a bearing surface 661 that defines a support plane that bears against the top surface 548 of the template support 538. While not illustrated, it can be readily appreciated that the bottom surface 659 may be the bearing surface 661 where the bottom side 656 has a continuous uniform thickness. However, by providing ribbing, weight and material can be limited.

Figure 38:
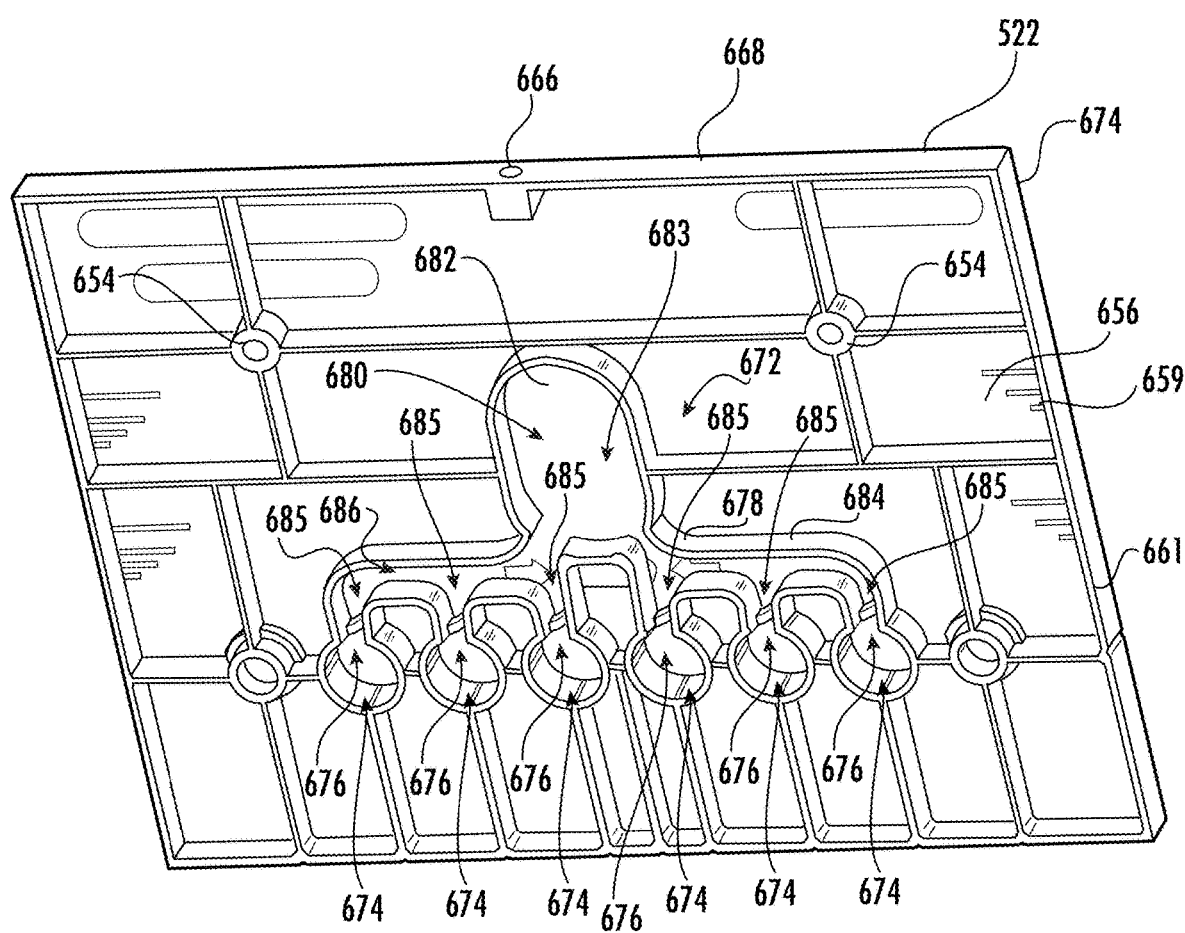
FIG. 38 is a bottom view of the dowel template of the first workpiece joining jig assembly of FIG. 34.

Still with respect to FIG. 38, the threaded blind holes 654 are spaced apart from each other to match the distance between the slots 550 through template support 538. Accordingly, it can be readily appreciated that by turning clockwise or counterclockwise the heads 652 (FIG. 36), the dowel template 522 may be removably fixed in placed such that it can be removed from the template holding jig 502 if desired. When the fasteners 512 are loosened but not removed from the dowel template 522, the dowel template 522 may be moved in directions parallel to the second axis 122 to selectively position the dowel template 522 where desired relative to the workpiece 646 before fixing it in place via the fasteners 512.

Figure 37:
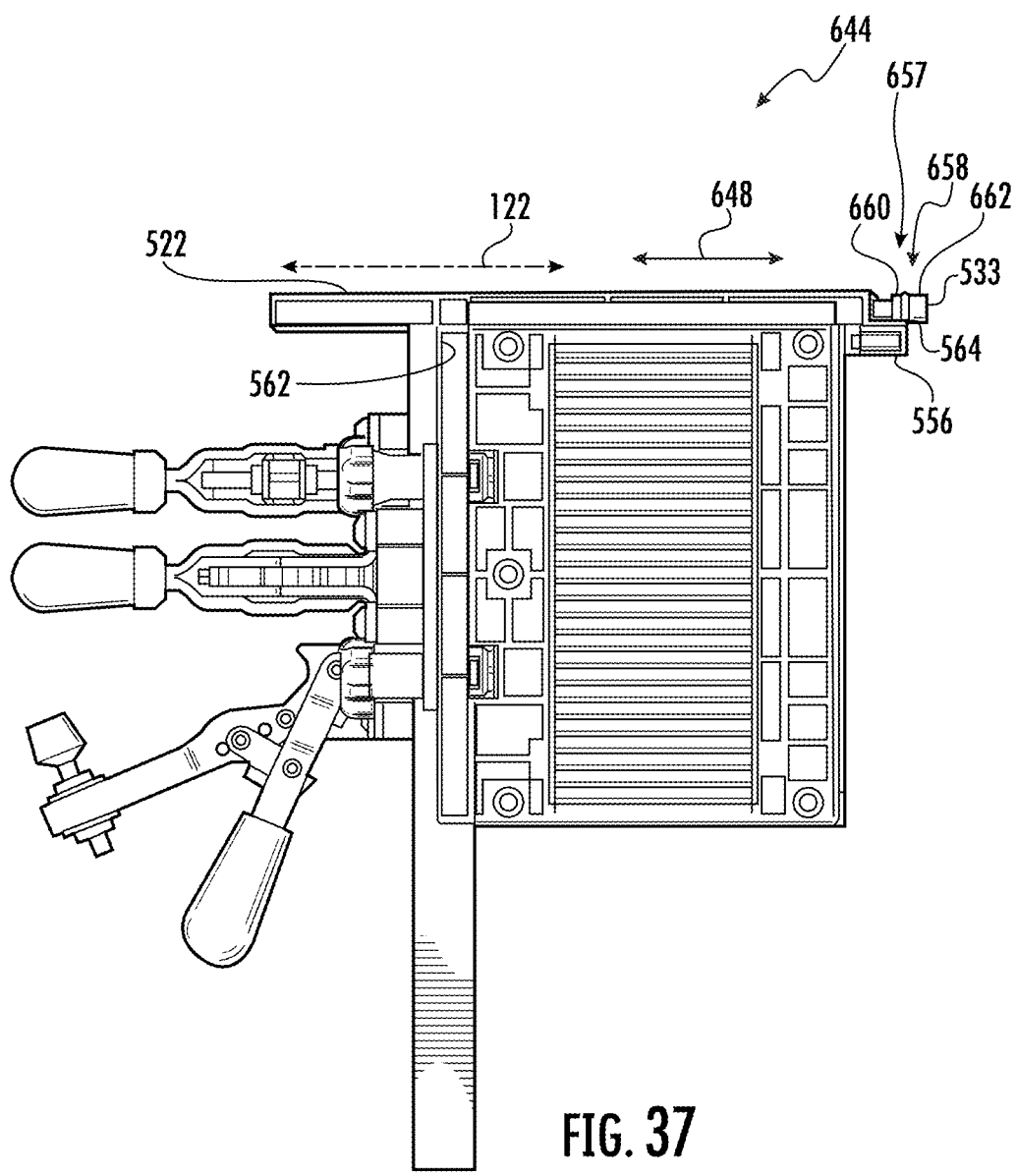
FIG. 37 is a side view of the first workpiece joining jig assembly of FIG. 34.

With reference to FIGS. 36 and 37, the first workpiece joining jig assembly 644 includes a micro-adjustment arrangement 657 that includes micro-adjustment screw 533 and micro-adjustment abutment 556, which includes upstanding wall portion 557 that defines the u-shaped receptacle 564. The micro-adjustment arrangement 657 provides for micro-adjustment of the position of dowel template 522 in directions 648 parallel to the top surface 548 and axis 122. By micro-adjustment it is meant that the dowel template 522 may be moved linearly parallel to axis 122, e.g. towards or away from the workpiece support 562 and the clamped workpiece 646 in the directions 648 via turning of the micro-adjustment screw 533 in a first rotational direction or a second rotational direction opposite the first rotational direction.

The micro-adjustment arrangement 657 joins the template support 538 via micro-adjustment abutment 556 attached thereto and the dowel template 522 via the micro-adjustment screw 533 seated on the micro-adjustment abutment 556 and received into a threaded blind hole 666 (see e.g. FIG. 38) in a back side 668 of the dowel template 522. The micro-adjustment arrangement 657 is therefore actuable to provide a force orthogonal to a workpiece support 562 plane and parallel to the second axis 122 to move the dowel template 522 in directions parallel to the second axis 122.

Figure 39:
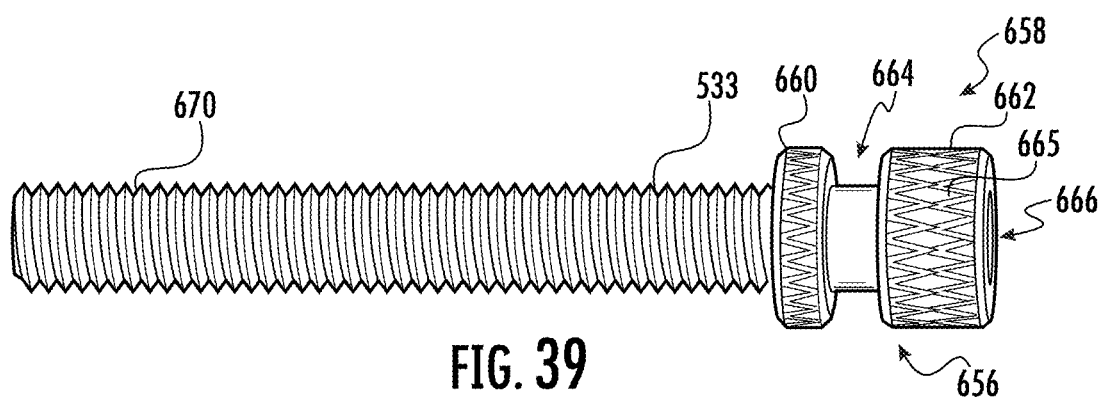
FIG. 39 is a front isometric view of a micro-adjustment screw of the first workpiece joining jig assembly of FIG. 34.

As best illustrated in FIG. 39, the micro-adjustment screw 533 has a grooved head 658 having a first portion 660 and a second portion 662 defining a groove 664 therebetween extending an entire circumferential distance around the micro-adjustment screw 533. One or both of the first portion 660 or the second portion 662 may be textured, for example, knurled to provide a gripping surface 665 to provide enough frictional area to facilitate ease of rotational by hand for turning of the micro-adjustment screw 533.

To facilitate ease of rotation, the second portion 662 may have an end portion 666 sized and shaped to receive a driving member (not illustrated). For example, the second end portion 662 may include a slot so as to receive a driving member that may be a flat head screw driver, Phillips head screw driver, or an Allen wrench, or box wrench to facilitate rotation of the micro-adjustment screw 533.

The circumferential groove 664 is received in the u-shaped receptacle 564 such that the first portion 660 is one side of the upstanding wall portion defining the u-shaped receptacle 564 and the second portion is on the other side of the upstanding wall portion defining the u-shaped receptacle 564 (FIG. 36). The direction of rotation of the micro-adjustment screw 533 determines the direction of movement/adjustment of the template 522. With the groove 664 receiving the upstanding wall, the micro-adjustment screw 533 remains in place relative to the template support 538 during rotation of the micro-adjustment screw 533 causing linear motion of the attached template 522.

By using the u-shaped channel 564 (FIG. 36), provided the template fasteners 512 are removed, the dowel template 522 while threadingly engaged with the micro-adjustment screw 533 is still free to be lifted, that is moved in directions parallel to the third axis 130 to remove the dowel template 522 from the template holding jig 502.

As previously discussed, the u-shaped receptacle 564 is attached or integral with the template support 538. For example, as illustrated in FIG. 36, the u-shaped receptacle 564 that is part of micro-adjustment abutment 556 is fastened to the back 561 of the template support 538. Therefore, the micro-adjustment screw 533 is able to rotate in the u-shaped receptacle 564 to thread a threaded end 670 into or out of the dowel template 522 such that the micro-adjustment screw 533 moves the dowel template 522 in directions 648 while the micro-adjustment screw 533 is threadingly connected to the dowel template 522.

Figure 40:
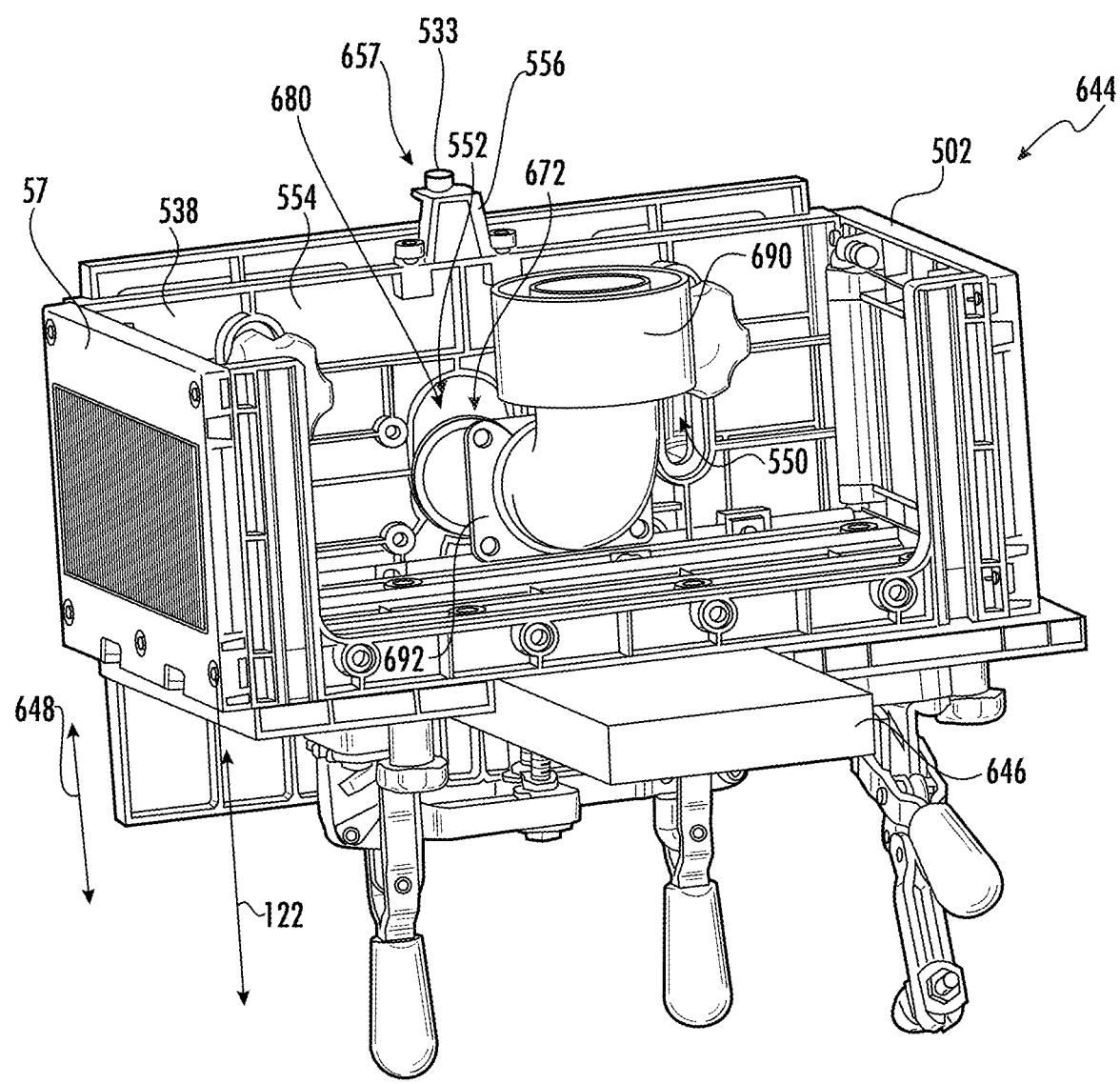
FIG. 40 is a bottom view of the first workpiece joining jig assembly of FIG. 36 with a coupling shown in a partial assembly view.

With respect to FIGS. 38 and 40, a dust collection system 672 (also referred to a as a vacuum arrangement) is illustrated with respect to dowel template 522 and template holding jig 502. The dowel template 522, includes a plurality of through holes 674 which function. The dust from the workpiece 646 (FIG. 34) that is being routed is collected in the dust collection system 672 for collection in a source of vacuum (not illustrated), for example by a whole shop vacuum system, a typical shop Vac® or other source of vacuum operably connected to the template holding jig 502.

The dust collection system 672 includes a collection region 680 defined by the dowel template 522, a plurality of flow passages 685, and a plurality of ports 676 in fluid communication with the collection region 680 by flow passages 685. The ports 676 are in direct fluid communication with the plurality of through holes 674 defined by dowel template 522. As such, when vacuum is provided to collection region 680 dust (e.g. waste material) generated in through holes 674 during routing is vacuum transported via the ports 676 and flow passages 685 to collection region 680 for collection.

The collection region 680, flow passages 685, ports 676 and, at least part of, the plurality of through holes 674 are surrounded by a continuous wall 678 of the dowel template 522.

In this example, the collection region 680 does not extend entirely through the thickness of the dowel template 522 but instead is closed off on one side 682 by the bottom surface 659 of the dowel template 520.

The outermost surface of continuous wall 678, which is a bottom most surface of template 522, interfaces with the top surface 548 (FIG. 35) of the template support 538 such that a dust flow cavity 683 is formed between the bottom surface 659 and the top surface 548 of the template support. As such, when a vacuum is operably provided to the collection region 680 by a source of vacuum, the vacuum can be provided between the collection region 680 and the through holes 674. In particular, a cavity 683 is formed by the continuous wall 678, the bottom surface 659 of the dowel template 522, and the top surface 548 of the template support 538.

As such, in this example, a portion of the cavity 683 is bounded by the dowel template and another portion is bounded by the template support 538.

When vacuum is applied to the dust collection system 672, dust from the workpiece 646 that has been routed is drawn from the plurality of through holes 674, through the ports 676, through passages 685, and then into a collection region 680.

The flow of dust from the workpiece 646 that is routed and is received in the plurality of through holes 674 is considered a fluid flow, the fluid being the air mixed with the dust.

Figure 35:
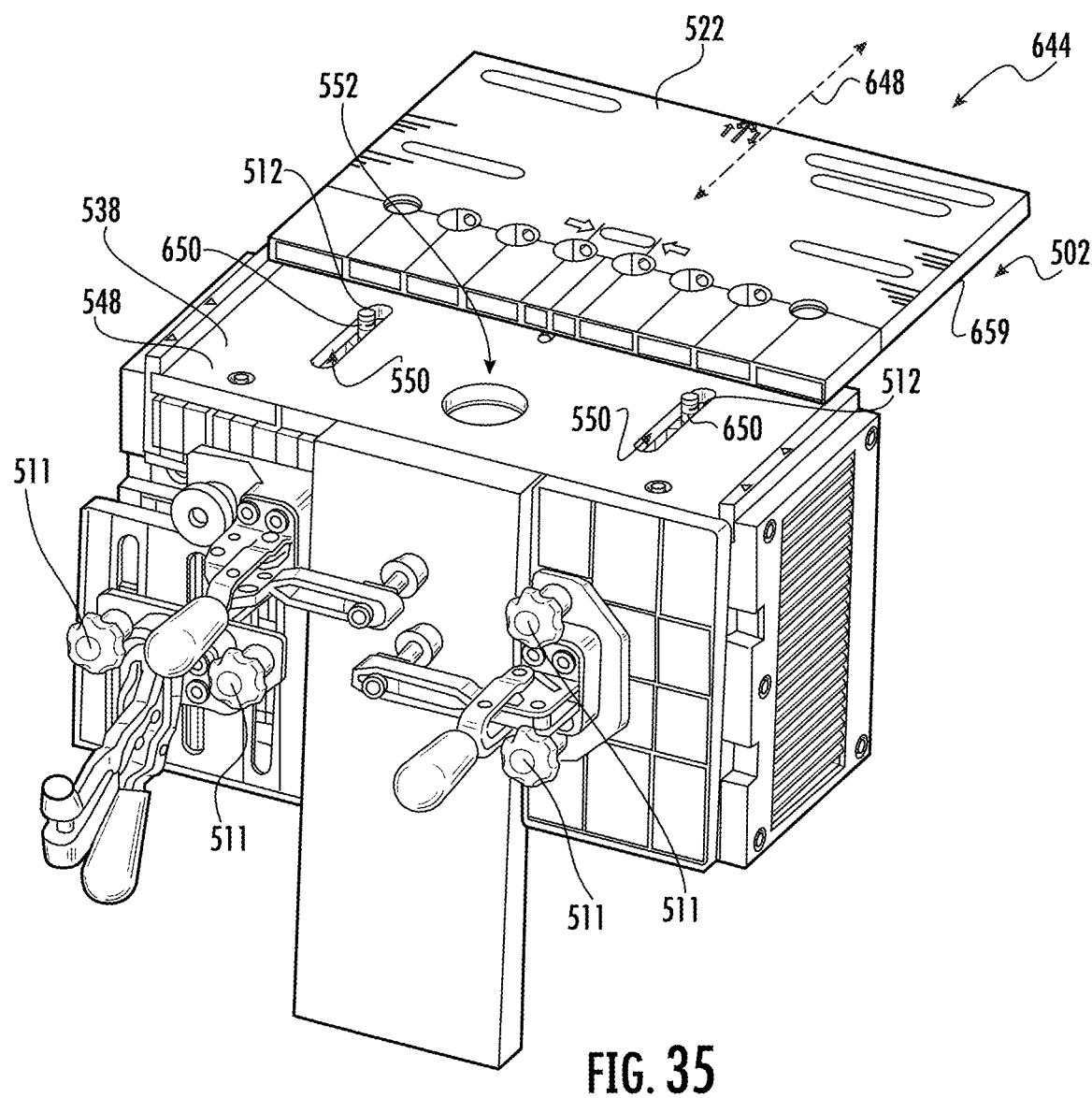
FIG. 35 is front right side view of the first workpiece joining jig assembly of FIG. 34 with a template partially removed for illustration.

As illustrated in FIGS. 35 and 40, the template support 538 includes a vacuum aperture 552, which is in fluid communication with collection region 680. A coupling 690 is coupled to the bottom 554 of the template support 538 and is in fluid communication with the vacuum aperture 552. The coupling 690 sealingly surrounds the vacuum aperture 552 to provide a fluid connection that is substantially air tight between the vacuum aperture 552 and the source of vacuum. The coupling 690 is configured to mate with a hose of the source of vacuum. This particular coupling 690 is configured to mate with different size hoses for different sources of vacuum.

Once the fluid flow with its dust exits coupling 690 to be received in the vacuum, for the purposes of this disclosure, the dust is considered to have exited the template holding jig 502 and the first workpiece joining jig assembly 644. The coupling 690 may have a mounting portion 692 that can be removably connected to the template support 538 via fasteners (not illustrated) or could be press fit thereto by way of non-limiting examples. Further, the coupling could be integrally formed with the template support 538.

Thus, it can now be readily appreciated that a vacuum can be created in the first workpiece joining jig assembly 644 such that a flow path is provided from the plurality of through holes 674 through an inlet of the cavity 683. The inlet of the cavity 683 is provided by the plurality of ports 676. The outlet of the cavity 683 is provided by the vacuum aperture 552. The flow path then extends from the vacuum aperture 552 through the coupling 690 that forms part of the vacuum arrangement 672. Thus, the flow path allows for dust from a workpiece 646 to pass through the plurality of through holes 674 (FIG. 38), through the plurality of ports 676 (FIG. 38), through the flow passages 685, through the collection region 680 (FIG. 38), through the vacuum aperture 552 (FIG. 40), through the coupling 690 (FIG. 40) and into a source of vacuum.

The collection region 680 is sized and shaped to permit adjustment of the dowel template 522 in directions 648 parallel to the second axis 122 as provided for by the slots 550 while still permitting the collection region 680 (FIG. 38) to cover at least a portion of vacuum aperture 552 (FIG. 40) of the template support 538 so as to maintain a sufficient vacuum and flow path in the dust collection system 672 (FIGS. 38 and 40) for the dust to flow from the workpiece 646 through the first workpiece joining jig assembly 644 into the source of vacuum.

The ports 676, flow passages 685, and collection region 680 may be considered a dust manifold.

Notably, in some implementations, the ports 676 and part of flow passages 685 may not be over the template support 538. Instead, the bottom portion of the cavity 683 defined by these portions may be closed by an adjacent surface portion of the workpiece 646, e.g. the surface being routed.

Figure 41:
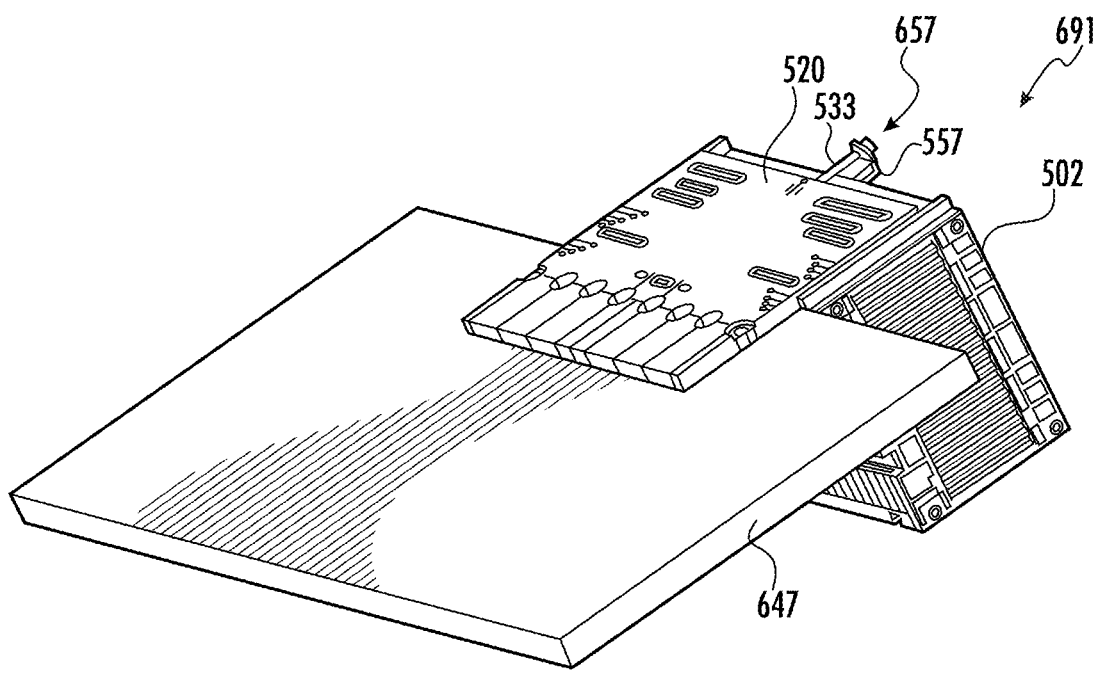
FIG. 41 is an isometric top right side view of a second workpiece joining jig assembly with a micro-adjustment abutment pin template and having a workpiece clamped thereto.

FIG. 41 illustrates a second workpiece joining jig assembly 691 with the template holding jig 502 attached to micro-adjustment abutment pin template 520. The micro-adjustment abutment pin template 520 is in position to support a router to route the workpiece 647. The micro-adjustment abutment pin template 520 includes a dust collection system substantially similar to the dust collection system 672 as described above with respect workpiece to dowel template 522 (FIGS. 38 and 40). It can be recognized that due to the offset of the through holes in this micro-adjustment abutment pin template 520 that, as noted above, part of the vacuum path may be bounded by the adjacent surface of workpiece 647.

Figure 42:
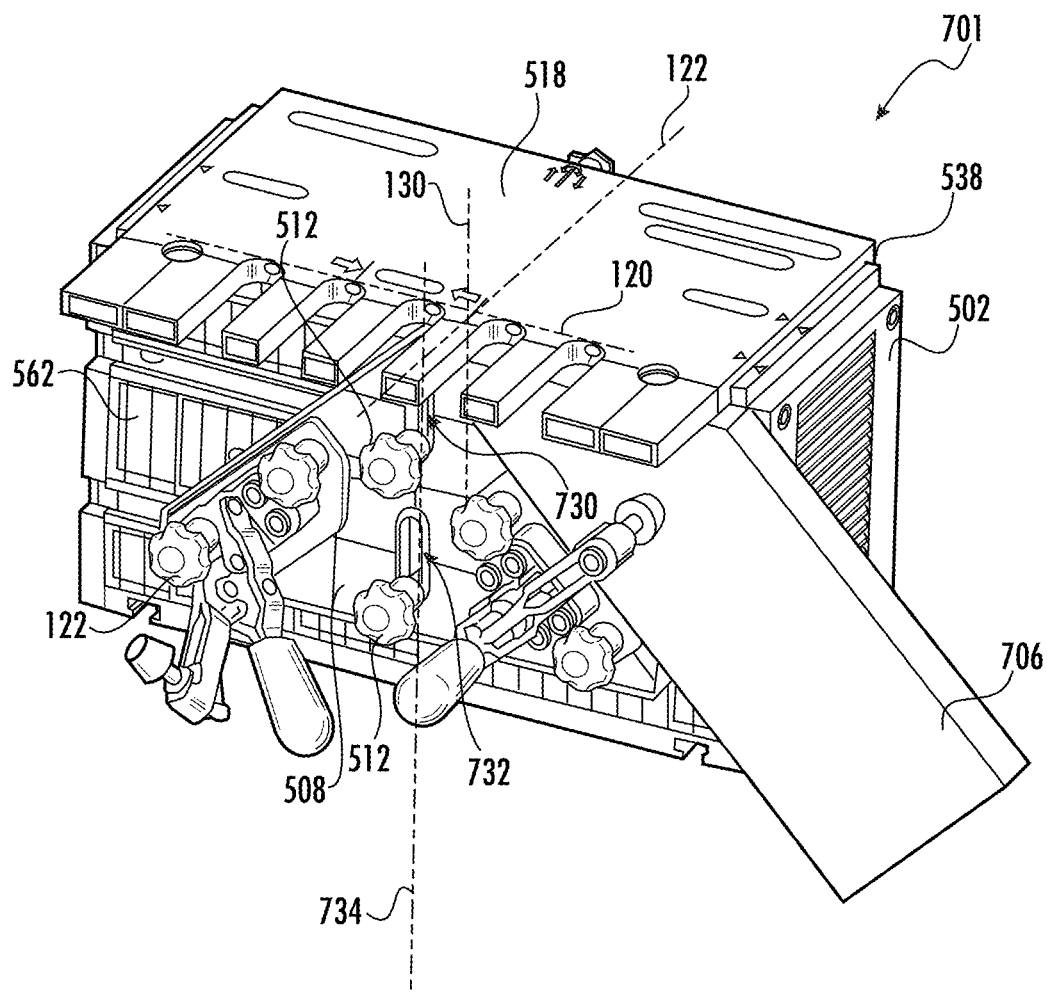
FIG. 42 is a font right side view of a third workpiece joining jig assembly with a Hoffmann template.
Figure 43:
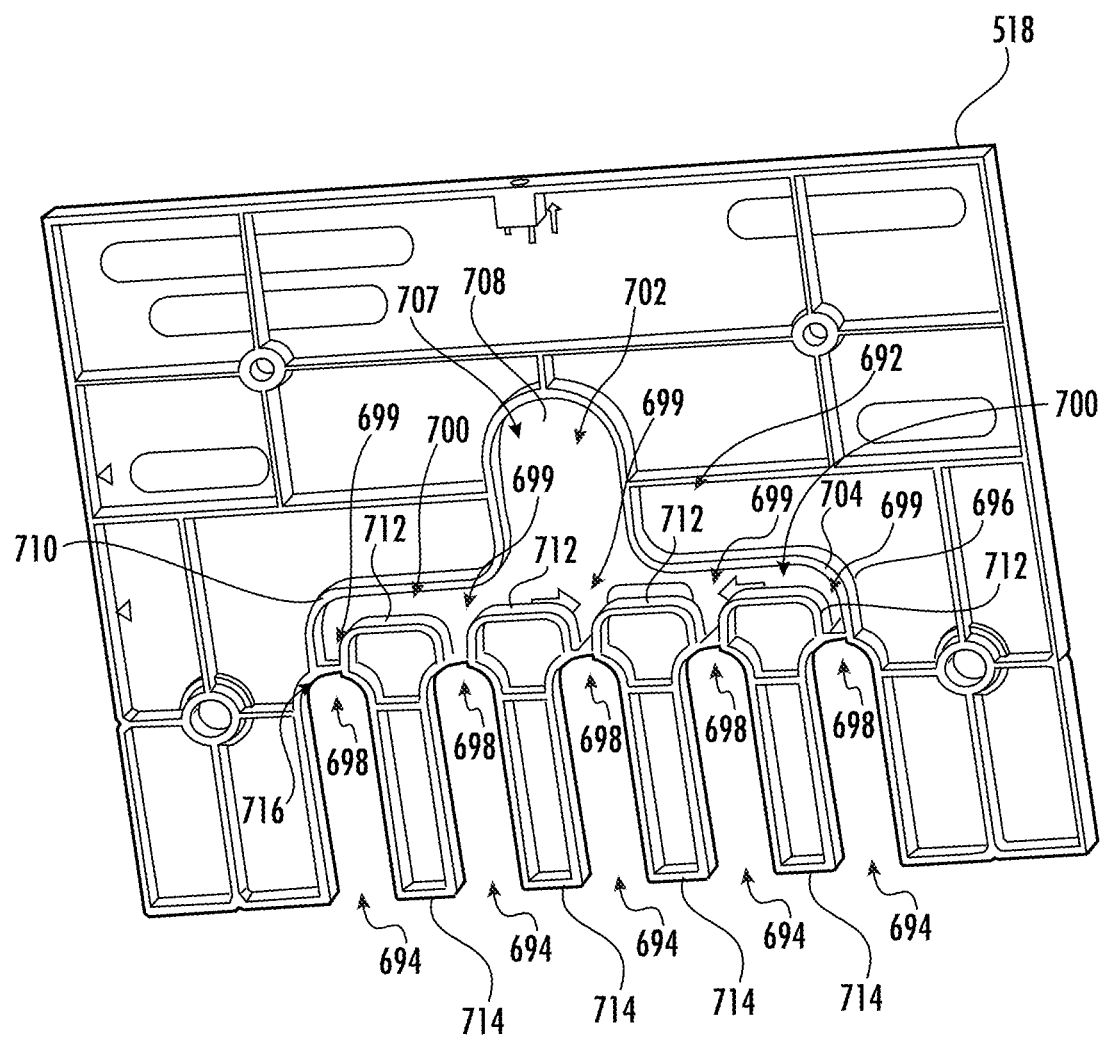
FIG. 43 is bottom view of the Hoffmann template of FIG. 42.

Turning to FIGS. 42 and 43, FIG. 43 illustrates a third workpiece joining jig assembly 701 with the Hoffmann template 518 attached to the template holding jig 502. A workpiece 706 is clamped thereto in a position to be routed. FIG. 43 shows a bottom view of the Hoffmann template 518. With respect to FIGS. 42 and 43, Hoffmann template 518 has a dust collection system 692 (also referred to as a vacuum arrangement) that is similar in structure and flow path to the dust collection system 672 (FIGS. 38 and 40) except for the differences described herein.

Hoffmann template 518 has a plurality of open ended slots 694 for guiding a router 300 (FIG. 10).

The dust collection system 692 includes a discontinuous wall 696 formed from a plurality of wall portions 710, 712. The wall portions 710, 712 define a plurality of ports 698, a plurality of flow passages 700, and a collection region 702. Again, the ports 698, flow passages 700 and collection region 702 may be considered a manifold.

The bottom surfaces 704 of the discontinuous wall portions 696 abut against the top surface 548 (FIG. 29) of the template support 538 (FIG. 29) when the Hoffmann template 518 is mounted such that a cavity 707 is created between the template support 538 and the Hoffmann template 518. The cavity 707 lies between the top surface 548 (FIG. 29) of the template support 538 and a bottom surface 708 of the Hoffmann template 518. Discontinuous first wall portion 710 defines a portion of an outer perimeter of the cavity 707. One or more of the second wall portions 712 and first wall portion 710 define ports 698.

Each one of the plurality of ports 698 is located at a first end 716 of the open ended slots 694. The plurality of ports 698 provide an inlet into the cavity 707.

The manifold 700 is defined by the first and second wall portions 710, 712. In particular, in this example, collection region 702 is defined between the first continuous portion 710 and several of the plurality second discontinuous wall portions 712.

When template 518 is mounted, the collection region 702 at least partially covers the vacuum aperture 552 (FIG. 29). As noted previously, the vacuum aperture 552 is in fluid communication with the coupling 692 (FIG. 40). Accordingly, when a source of vacuum is connected to the coupling 692 dust flows from the workpiece 706 that is being routed into the plurality of open ended slots 694, through the plurality of ports 698, through the manifold 700, through the collection region 702, through the vacuum aperture 552, through the coupling 692 and into the source of vacuum.

Figure 44:
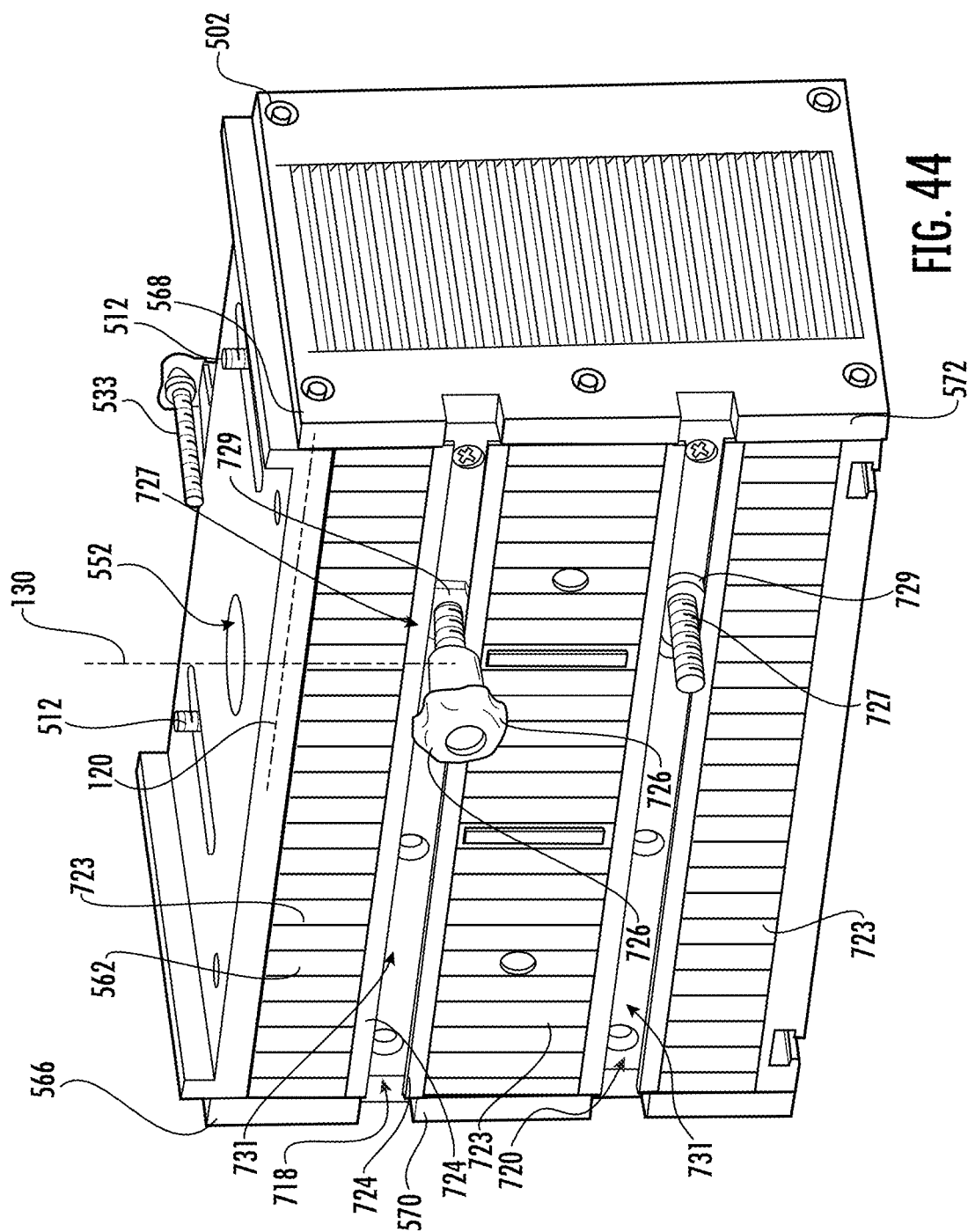
FIG. 44 is a front right side view of the template holding jig of the third workpiece joining jig assembly of FIG. 42.

FIG. 44 illustrates the template holding jig 502 without a workpiece or clamp attached thereto so as to illustrate the features of the work piece support 562 and fasteners 511. A complete fastener 511 is located in first channel 718 of the workpiece support 562. The fastener 511 includes a knob 726 connected to a threaded connector 727. The knob 726 is threaded to the threaded connector 727. The threaded connector 727 is attached to an enlarged head 729 located within channel 718. A second threaded connector 727 is located in a second channel 720 of the workpiece support 562.

The first and second channels 718, 720 are T-slots having a T-shape formed by C-shaped portions of the workpiece support 562. The threaded connector 727 is sized to extend through the mouth defined by the C-shaped portions. In this example, the C-shaped portions are inserts that are removably mounted to the rest of the workpiece support 562. In this example, the T-slots are elongated parallel to the first axis 120, and one another.

In this example, the first channel 718 extends from the first sidewall frame 570 to the second sidewall frame 572. The sidewall frames 570, 572 are notched so that the ends of the T-slots are open for receipt of the head 729 and threaded connector 727. In other examples, notches could be provided that allow receipt of the enlarged head 729 of the threaded connectors 727 for mounting the threaded connectors 727 to the workpiece support 562. The first channel 718 is spaced from the second channel 720 in a direction parallel to the third axis 130.

The workpiece support 562 also includes a plurality of face slots 721, each of which has a major axis extending in directions parallel to the third axis 130. The template fasteners can be received through the face slots 721 to secure or facilitate the clamping of an element to the workpiece support 562. A plurality of grooves 723 that are parallel and spaced apart from one another may also extend in directions parallel to the third axis 130 to facilitate alignment of any element to the face of the workpiece support 562.

The enlarge head 729 is sized to be received into the channels 718, 720. The enlarged head 729 is also sized such that it is axially longer than the width between channel walls 724 of the channels such that enlarged head 729 cannot rotate completely within the channels 718, 720, which allows for knob 726 to be tightened and loosened relative to the threaded portion of threaded connector 727. The enlarged head is sized such that it cannot pass through the mouth 731 of the channels 718, 720 workpiece. Thus, fastener 511 can clamp an element to the workpiece support 562.

To facilitate rotation of the knob 726, the knob 726 may include a gripping surface that is ergonomically sized to allow a user to easily grip the knob 726 to tighten or loosen the fastener 511. With this arrangement between the fasteners 511 and the workpiece support 562 any element, e.g. the first workpiece stop 504 (FIG. 34) is removable from the template support 502 such that various configurations of the clamping arrangements are possible by changing out the elements and or workpieces as desired.

Figure 34:
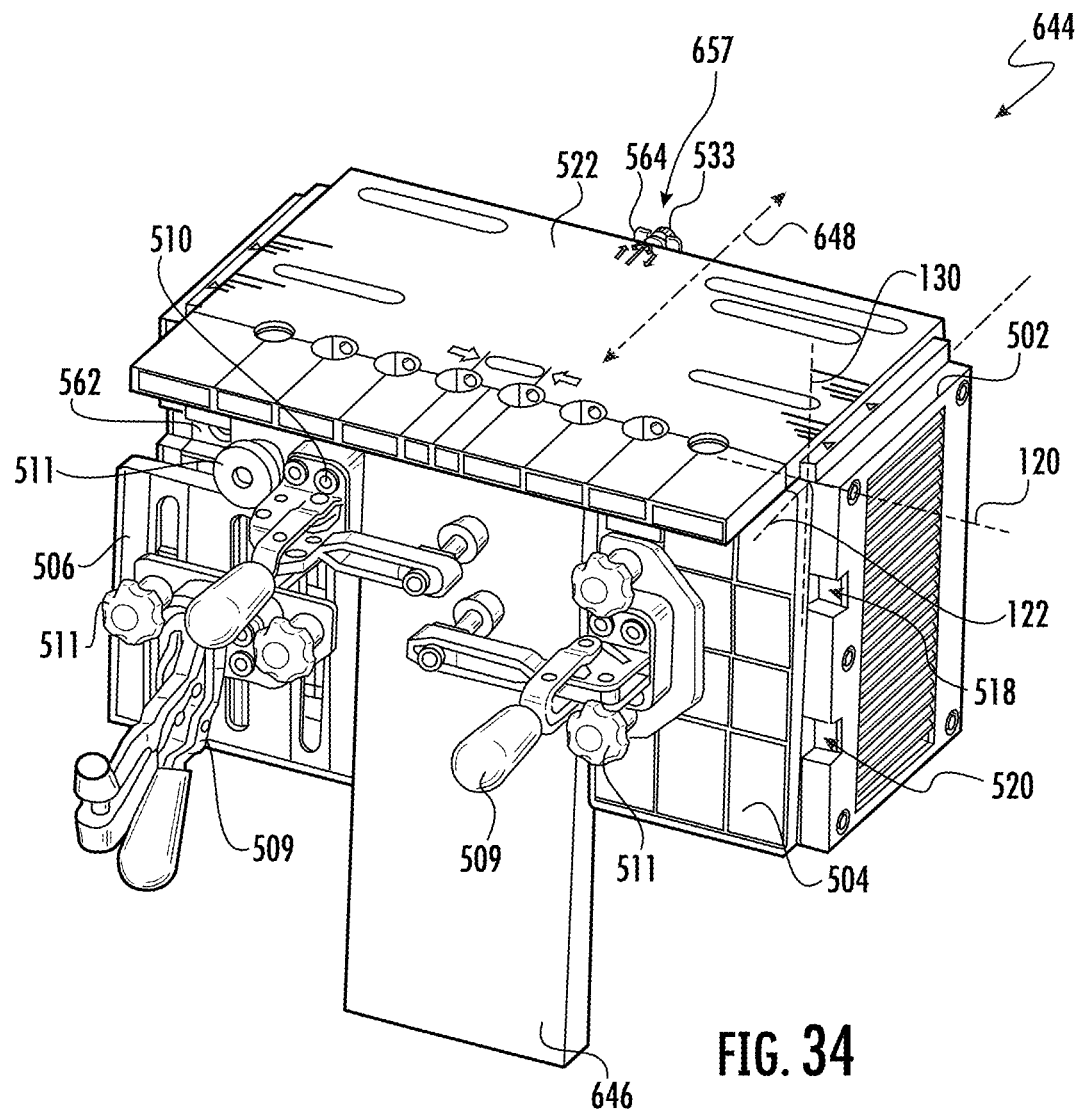
FIG. 34 is a front right side view a first workpiece joining jig assembly having a workpiece clamped thereto.
Figure 45:
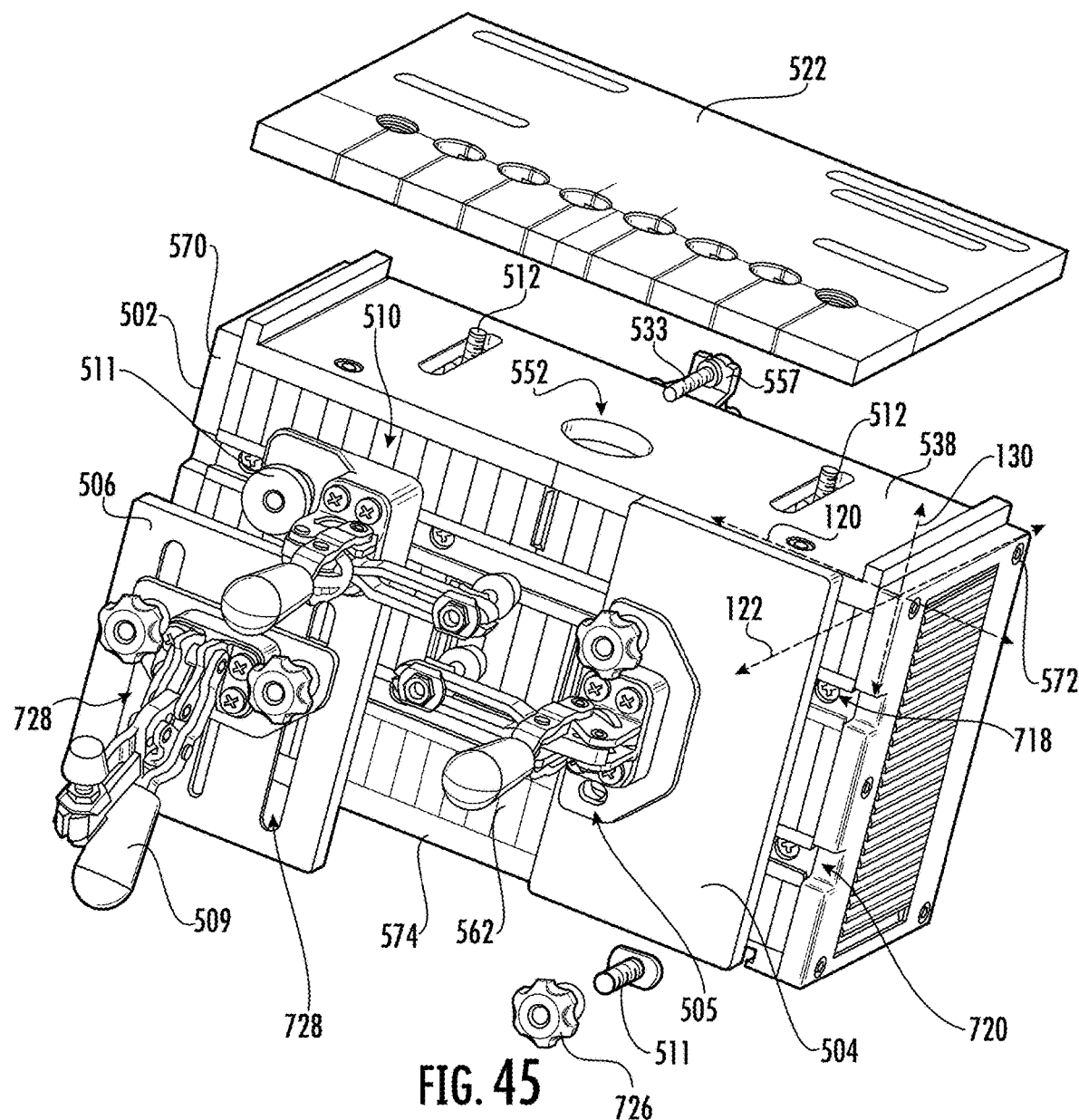
FIG. 45 is front right side view of the first workpiece joining jig assembly of FIG. 34 with the template partially removed and workpiece removed.

With reference to FIGS. 34 and 45, the clamping and alignment of the workpiece 646 to the template holding jig 502 will be explained. The second workpiece clamp 510 is attached to the workpiece support 562 with the fastener 511 which is anchored in the first channel 718 such that it can be tightened or loosened as needed to move the workpiece clamp 510 in directions parallel to the first axis 120 to position the workpiece 646 along axis 120 as desired relative to the template 522. Thus, in addition to clamping the workpiece 646, the second workpiece clamp 510 is designed to align the workpiece 646 as was described above with respect to stops 146, 148 (FIG. 1) except, when the second workpiece clamp 510 moves the fastener 511 moves with it while remaining within in the first channel 518 as just described. The second workpiece clamp 510 may also be attached via the fastener 511 anchored in the second channel 520. Additionally, it could be located on the opposite side of workpiece 646.

Workpiece stop 506 carries workpiece clamp 509. Workpiece stop 506 is similar to workpiece stops 146, 148 (FIG. 1) except for the differences described here. Workpiece stop 506 mounts to the workpiece support 562 with the fastener 511 to selectively fix the workpiece stop 506 to the workpiece support 562.

In this example, fasteners 511 also secure clamp 509 against the outer surface of the workpiece stop 506. In other embodiments, clamp 509 could be separately secured to workpiece stop 506.

The workpiece stop 506 includes a plurality of slots 728. In the orientation shown in FIGS. 36 and 47, the major axis of each one of the plurality of slots 728 is aligned perpendicular to the first channel 718 and the second channel 720, as well as to first axis 120. With this mounting configuration, the workpiece stop 506 is moveable in directions parallel to the first axis 120, e.g. by sliding fasteners 511 along channel 720 and parallel to the third axis 130 by sliding the workpiece stop 506 relative to fasteners 511, as desired, to best position and clamp the workpiece 646 relative to the dowel template 522. In this orientation, the workpiece could be located vertically above workpiece stop 506 along axis 130 rather than to the side as illustrated in FIG. 34.

As can be readily appreciated the second workpiece stop 506 may have a second orientation rotated 90 degrees (not illustrated) wherein the major axis of each one of the plurality of slots 728 is aligned to extend parallel to the first axis 120. In the second orientation, one fastener 511 may be anchored in the first channel 718 while another fastener 511 is anchored in the second channel 720. In the second orientation, while movement in directions parallel to the third axis 130 are not possible (absent removal of the knob of the fastener), movement of the second workpiece stop 506 in directions parallel to the first axis 120 is permitted.

The same movements just described with respect to the second orientation of the second workpiece stop 506 are available with respect to the first workpiece stop 504. First workpiece stop 504 has mounting holes 505 (FIG. 28) through which the fasteners 511 are inserted instead of the plurality of slots 728 to selectively fix the first workpiece stop 504 to the workpiece support 562. Workpiece stop 504 with first workpiece clamp 509 is similar to workpiece stops 146, 148 (FIG. 1) except for the differences described here. A fastener 511 is anchored in the first channel 718 while another one of the fastener 511 is anchored in the second channel 720. In this orientation while movement in directions parallel to the third axis 130 are not possible, movement in directions parallel to the first axis 120 is permitted.

As can be readily appreciated the first workpiece stop 504 may have a second orientation (not illustrated) wherein a pair of template fasteners 512 are anchored in either the channel 718 or the second channel 720 but not both. Therefore, in this orientation movement of the first workpiece stop 504 is not possible in directions parallel to the third axis 130 but movement of the first workpiece stop 504 is permitted in directions parallel to first axis 120.

Returning to FIG. 42, the clamping arrangement of the third workpiece joining jig assembly 701 utilizes the miter fence 508 with the first workpiece clamps 509. The miter fence is 508 is mounted to the workpiece support 562 similarly to what was described above with respect to first workpiece stop 504 and second workpiece stop 506 with fasteners 511. Miter fence 508 defines a first slot 730 and a second slot 732, each extending completely through the miter fence 508 so as to be able receive the fasteners 511 therethrough to selectively fix the miter fence 508 to the workpiece support 562.

As illustrated, the miter fence 508 is moveable in directions parallel to the third axis 130 as needed to position the miter fence 508 to place the workpiece 706 in the desired position relative to the Hoffmann template 518 or other appropriate template. The major axis of the first slot 730 is on the same axis 734 as the major axis of the second miter slot 732. Thus, each major axis extends parallel to the third axis 130 and the axis 734 extends parallel to the third axis. As previously described the fasteners 511 are easily removable such that the miter fence 508 may be removed and replaced with one or more workpiece stops or another miter fence.

Notably fasteners 511 may be operated in a loosened state where they secure the appropriate element to the workpiece support 562, but the element is permitted to be moved relative to the workpiece support 562 for properly locating the element.

Turning now to FIG. 46-49, a fourth workpiece joining jig assembly 736 including the dovetail template 526 removably fixed to template holding jig 502 is illustrated. As was described previously with respect to the fifth template 230 (FIG. 20) and the sixth template 232 (FIG. 21) which are used to form dovetails, dovetail template 526 is wider than the template support 538. Therefore, the dovetail template 526 defines a pair of slots 738 which function as described above with respect to slots 250 (FIG. 20) receiving the template guide 540.

The pair of slots 738 provide for the same movement, or lack thereof, on the template guide 540 relative to the first axis 120, the second axis 122, and the third axis 130, to best position the dovetail template 526 relative to the workpiece 646 as was previously describe with respect to the fifth template 230 (FIG. 18) and sixth template 232 (FIG. 19) except for the differences described here.

That is, the template holding jig 502 includes the micro-adjustment screw 533. The micro-adjustment screw 533 provides for the micro-adjustment of the dovetail template 526 in the directions parallel to the second axis 122 just as was previously described with respect to templates 518, 520, and 522 (FIG. 28).

Moreover, the template fasteners 512 received through the slots 550 (FIG. 29) of the template support 538 provide the selective positioning of the dovetail template 526. The selective positioning is via movement along directions parallel to the second axis 122. Removal of the dovetail template 526 is therefore the same as was previously described with respect to the template fasteners 512 and the slots 550 (FIG. 29) and templates 518, 520, and 522 (FIG. 28).

Figure 47:
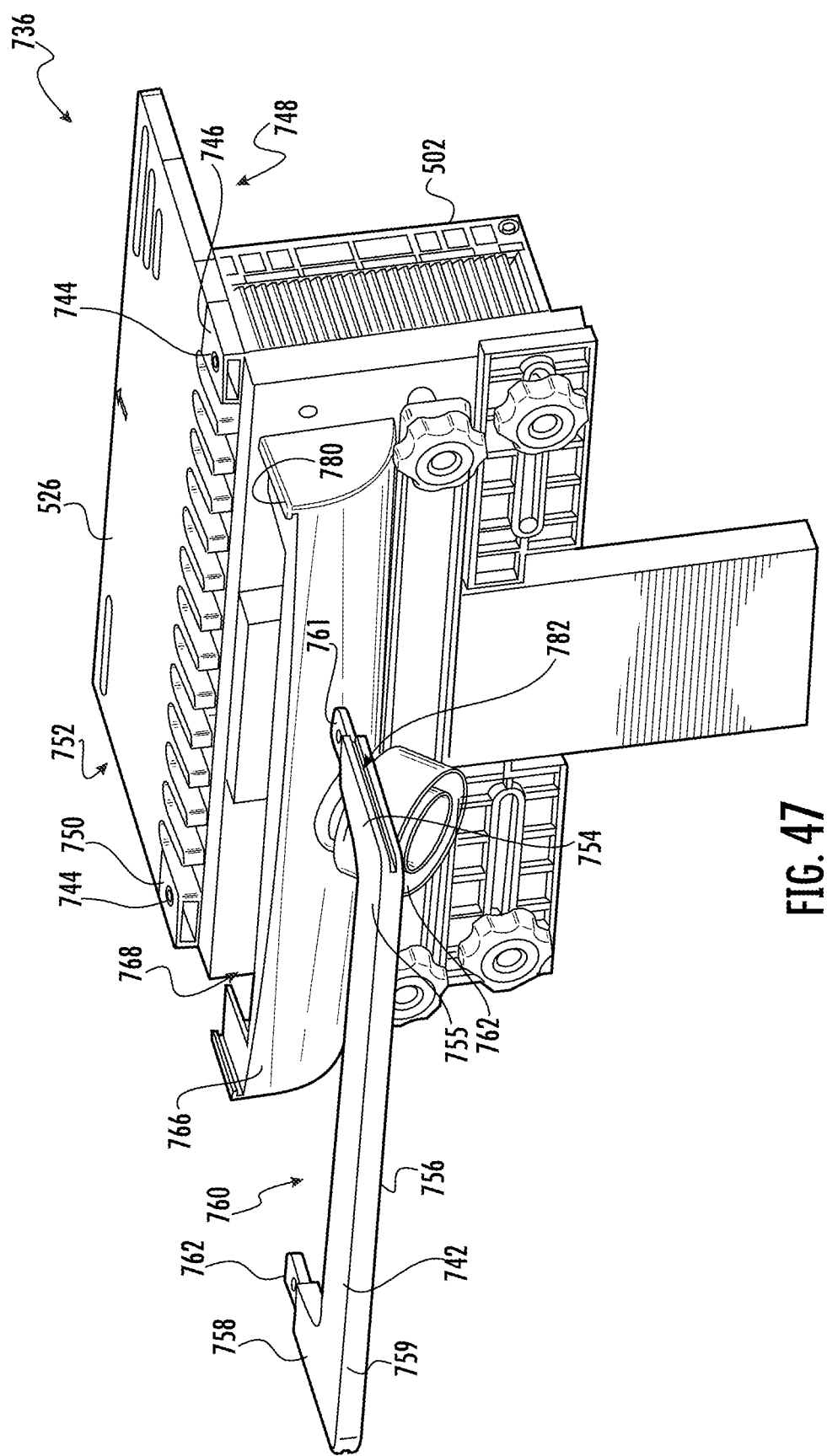
FIG. 47 is another front right side view of the fourth workpiece joining jig assembly of FIG. 46 with a router support partially removed for illustration.

With principle reference to FIG. 47, dovetail template 526 includes a router support 742 removably attached to the dovetail template 526 via screws 744. The dovetail template 526 has a first mounting area 746 at a first side 748 of the dovetail template 526 and the second mounting area 750 at a second side 752 of the dovetail template 526. The first and second mounting areas 746, 750 may be cavities defined by the dovetail template 526. The router support 742 has a first arm 754 extending from a first end 755 of a longitudinal member 756 of the router support 742 and a second arm 758 extending from a second end 759 of the longitudinal member 756.

With reference to FIG. 47, a gap 760 is defined by the longitudinal member 756 and the first arm 754 and the second arm 758. The first arm 754 has a tab 761 that mounts to the first mounting area 746 and the second arm has 758 has a tab 762 that mounts to the second mounting area 750. In the embodiment illustrated, the tab 761 is sized to be received in the cavity of the first mounting area 746 and the tab 762 is sized to be received in the cavity of the second mounting area 750. Each tab 761, 762 is then releasably fixed in the respective cavity with one of the screws 744.

Once the router support 742 is mounted to the dovetail template 526, the router support 742 moves with the dovetail template 526 in directions parallel to the second axis 122 to selectively position the dovetail template 526 relative to the workpiece support 562 for routing the workpiece 646. Once in the desired position, as previously described, the fasteners 512 (FIG. 48) selectively fix the dovetail template 526 to the template holding jig 502.

Figure 46:
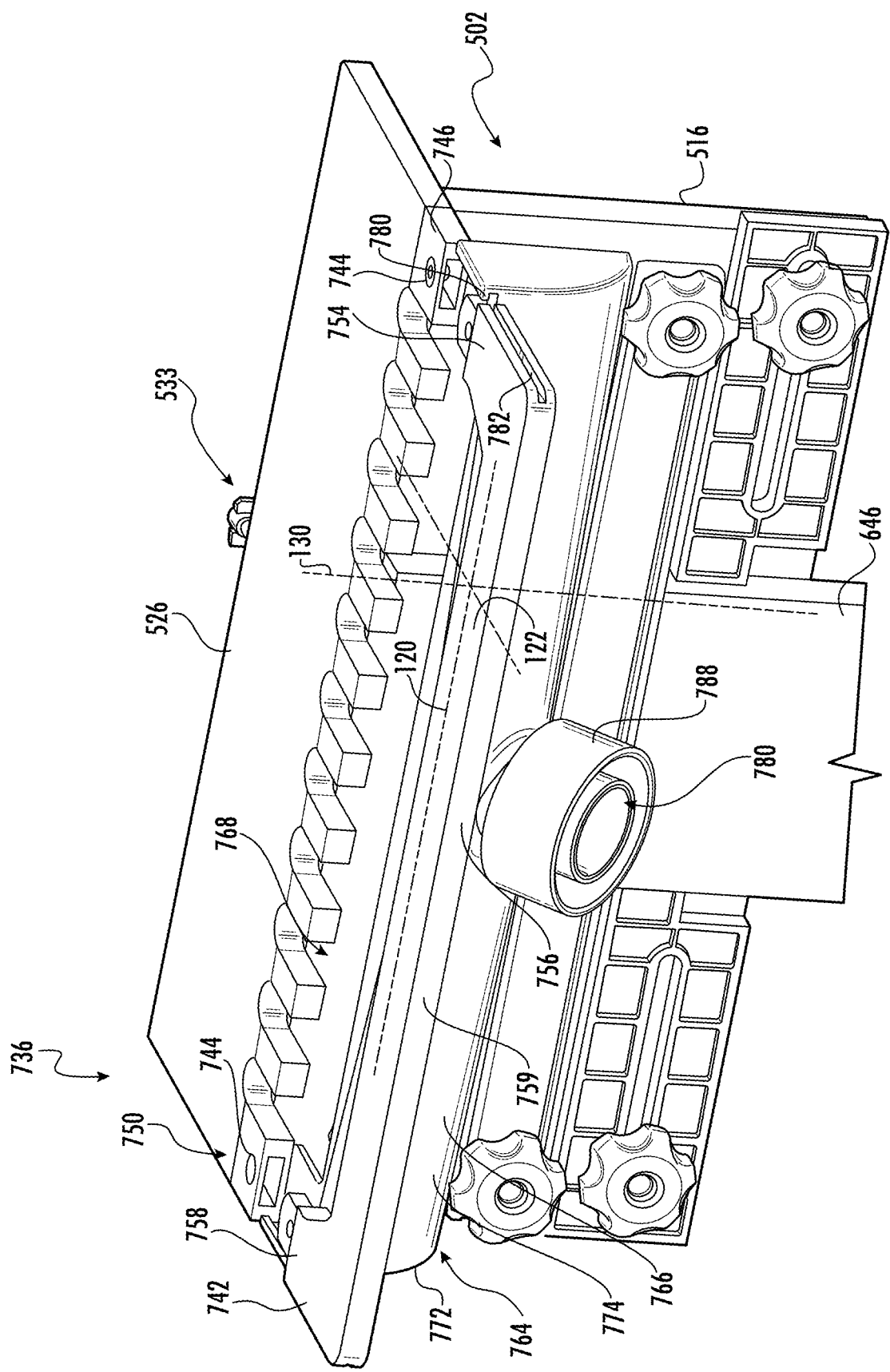
FIG. 46 is a front right side view of a fourth work piece joining jig assembly with a dovetail template and having a workpiece clamped thereto.

With reference to FIG. 46, the fourth workpiece joining jig assembly 736 includes a third dust collection system 764 also referred to as a vacuum arrangement. The vacuum arrangement 764 includes the router support 742 and a dust collector 766 located under a bottom surface of the router support 742 and generally on an opposite side of the template support plane as the template 526 for receiving a flow of dust from the workpiece 646 being routed.

Figure 49:
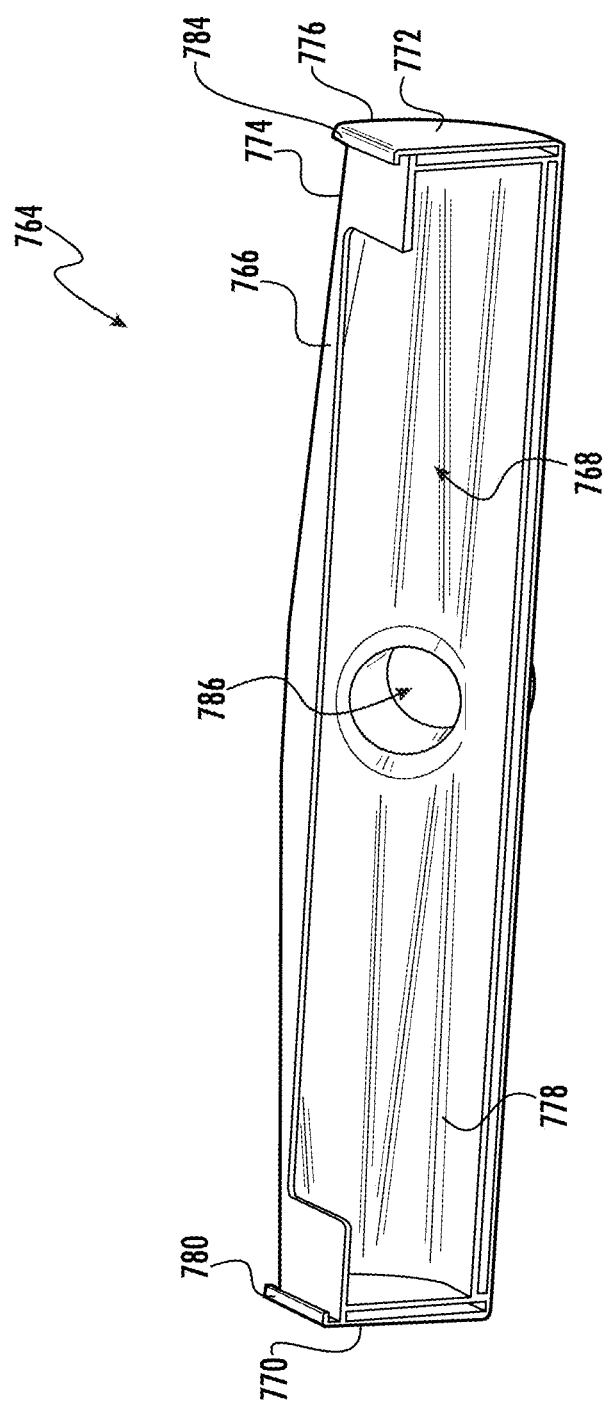
FIG. 49 is a top isometric view of a dust collector of the fourth workpiece joining jig assembly of FIG. 46.

Turning to FIG. 49, the dust collector 766 of the vacuum arrangement 764 includes a first side 770 and a second side 772 and a third longitudinal side 774 having an exterior convex face 776. The third longitudinal side 774 extends between the first side 770 and the second side 772. A collection trough is defined by an interior surface 778 of the first side 770, the second side 772, and the third longitudinal side 774. The first side 770 includes a first inward extending mounting flange 780 sized to be received a first channel 782 (FIGS. 46 and 47) defined in the first arm 754 (FIG. 47).

The second side 772 of the dust collector 766 includes a second inward extending mounting flange 784 sized to be received in a second channel (not illustrated) defined in the second arm 758 and which is similar to the first channel 782 (FIG. 47). The first and second mounting flanges 780, 784 extend from their respective sides of the dust collector 766 towards one another. The mounting flanges 780, 784 are mounted to upstanding wall portions such that the upstanding wall portions and the mounting flanges 78, 784 form mounting hook portions.

Figure 55:
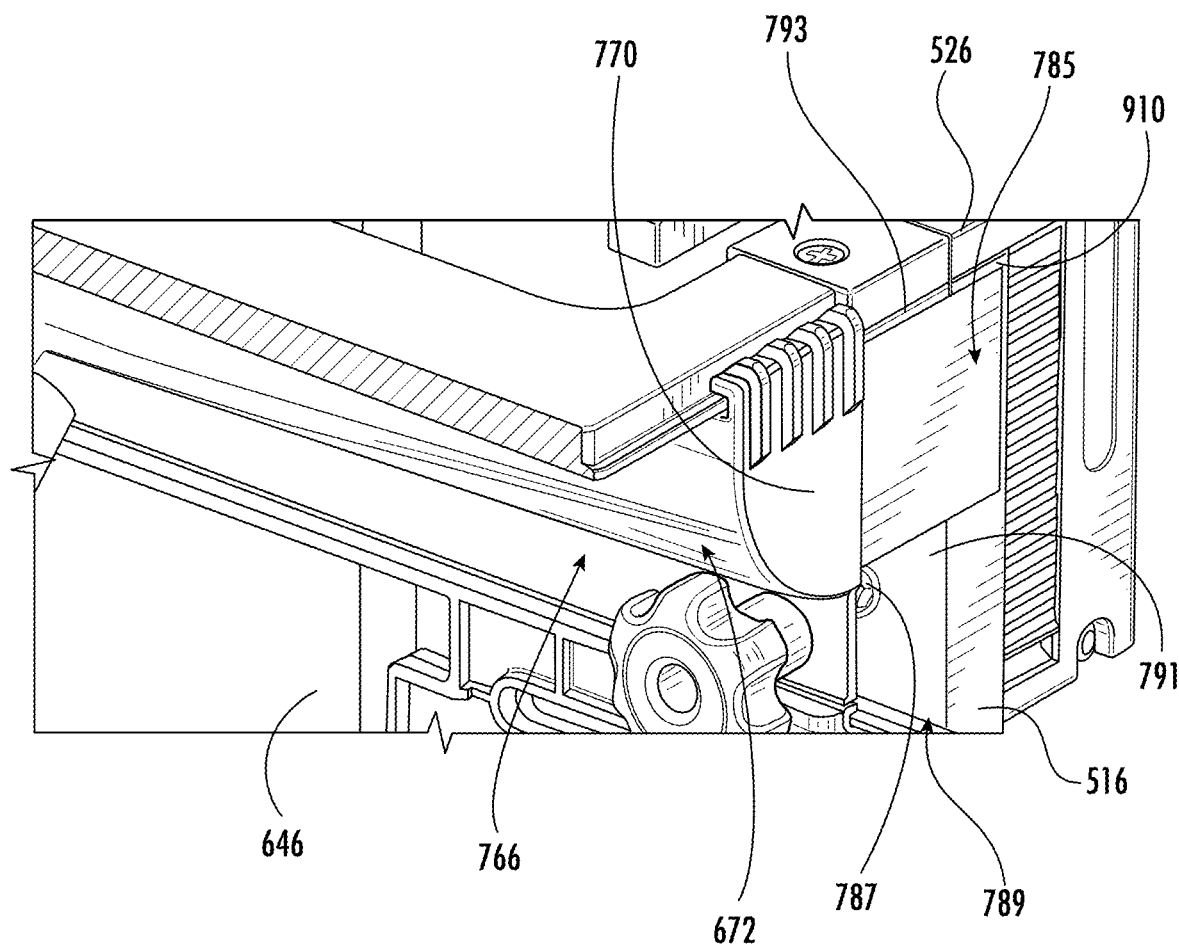
FIG. 55 is another view of a dust collector with side seal members in use with the clamping bar arrangement.

As seen in FIG. 55, a sealing member 785 may be provided at the outer periphery 787 of the dust collector 766. The sealing member 785 extends from the outer periphery 787 that faces the clamping bar arrangement 516. The outer periphery 787 is defined, at least in part by edges of the side 770 (FIG. 49) and the second side 772 (FIG. 49) that face the clamping bar arrangement 516. The sealing members 785 may be bristles that wrap around sides of the workpiece 646 or as seen here sides of the clamping arrangement 516.

The bristles 785 extend from the edges of the sides 770, 772 (FIG. 49) and span a gap 789 created between the workpiece 646 and the outer periphery 787 such that the bristles extend from the outer periphery 787 across the gap 789 to a side 791 of the clamping bar 516 that faces the dust collector 766. A top edge 793 of the bristles meets a bottom surface 910 of the template 526, to facilitate the creation of a vacuum and to collect the dust of the workpiece 646 while being routed. Indeed the bristles facilitate catching the dust and chips so they do not shoot at the user or end up on a floor.

An extraction port 786 (FIG. 49) is defined by and extends completely through the third side 774. A coupling 788 (FIG. 46) is either integral with the extraction port 786 or attached thereto, for example via fasteners or bonding.

The coupling 788 (FIG. 46) permits a vacuum machine (not illustrated), for example, by a typical shop Vac® or like source of vacuum to attach to the coupling 788 (FIG. 46) such that a vacuum can be created drawing dust from the workpiece 646 (FIG. 46) being routed into the extraction manifold 768 (FIG. 51) under the dovetail template 522 (FIG. 46). From the extraction manifold 768 the dust exits the dust collector 766 and passes through a coupling aperture 790 (FIG. 46) extending through the coupling 788 (FIG. 46) and then into the vacuum.

Figure 50:
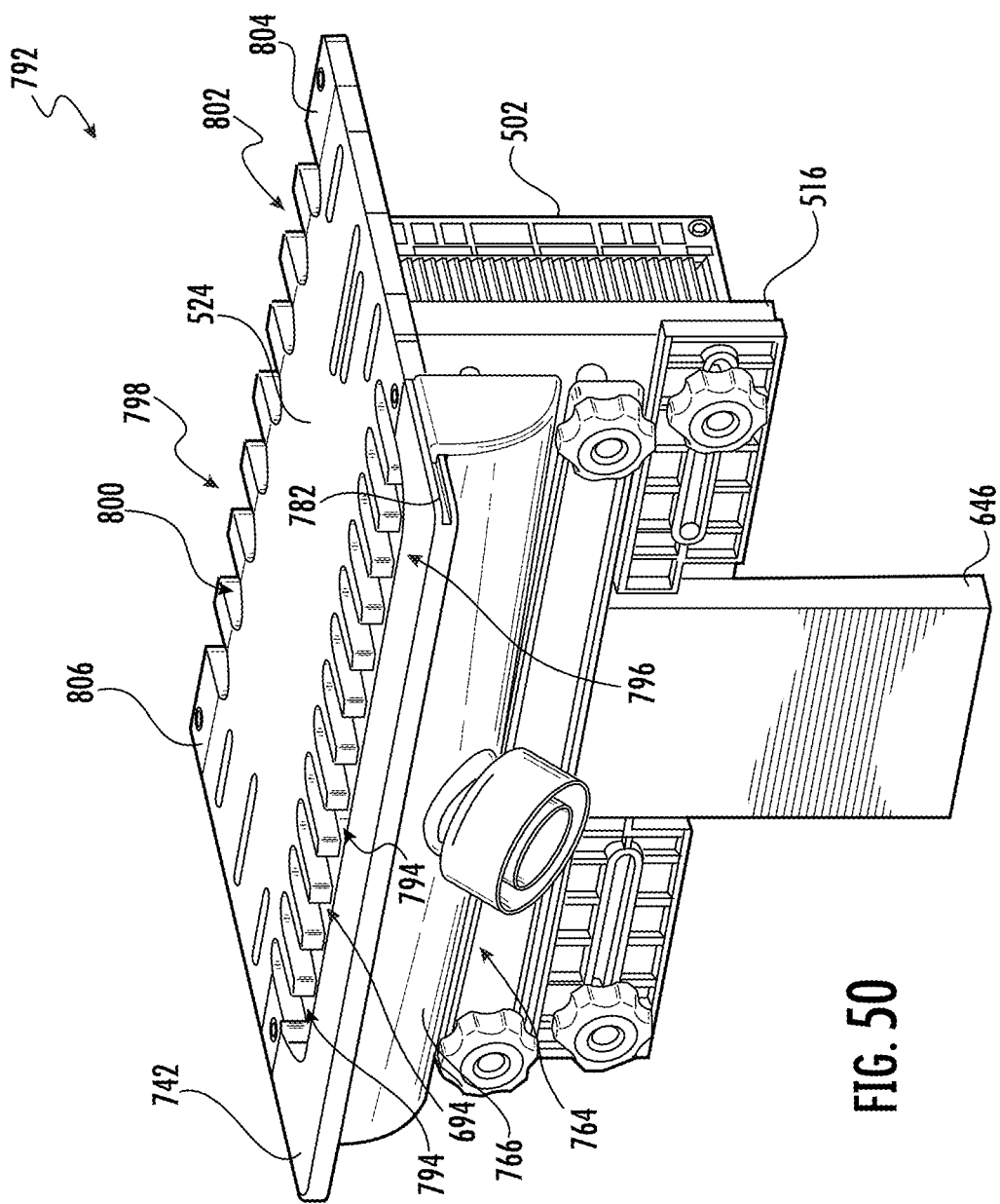
FIG. 50 is a front right side view of a fifth workpiece joining jig assembly with a box template and having a workpiece clamped thereto.

FIG. 50 illustrates a fifth workpiece joining jig assembly 792 with box joint template 524 removably fixed to the template holding jig 502 and which includes the third dust collection system 764 as was just described. Movement and the attachment of the box template 524 on template holding jig 502 as well as the flow of dust from the workpiece 646 is the same as that described with the fourth workpiece joining jig 736 (FIG. 46) described above except there is no micro-adjustment of the box template 524.

Box template 524 includes a plurality of open slots 694 across the first side 794, also referred to as the front side, and sized and spaced in a first arrangement 796. The router support 742 attaches to the box template 524 at the first mounting area 746 and the second mounting area 750 as previously described above with respect to the fourth workpiece joining jig assembly 736 (FIG. 46). The dust collector attaches to the box template 524 in the same way the dust collector 766 attached to the dovetail template 526 (FIG. 47) described above.

However, the box template 524 also includes a further plurality of open slots 798 across a back side 800. The further plurality of open slots 798 are sized and spaced in a second arrangement 802 different than the first arrangement 796. Also, the back side 800 includes a pair of spaced apart mounting areas 804, 806 which are sized and shaped and function the same as was described above with respect to first mounting area 746 (FIG. 47) and second mounting area 750 (FIG. 47). Accordingly, the box template 524 permits either the front side 794 or the back side 800 to be attached to the router support 742 depending on whether the first arrangement 796 or second arrangement 802 is desired for routing the workpiece 646.

Figure 51:
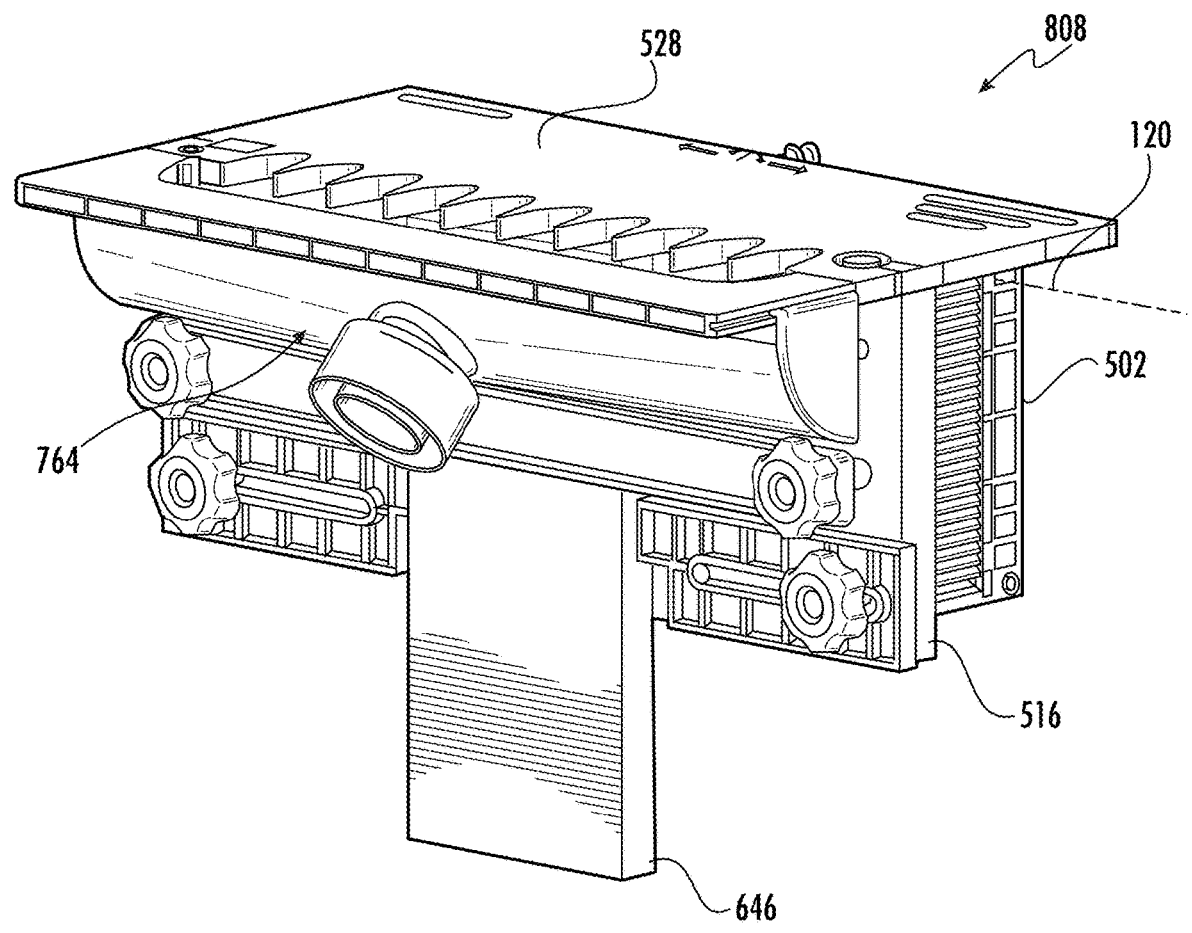
FIG. 51 is a front right side view of a sixth workpiece joining jig assembly with a dovetail pins template and having a workpiece attached thereto.

FIG. 51 illustrates a sixth workpiece joining jig assembly 808 which utilizes the dovetail pins template 528 removably fixed to the template holding jig 502. The sixth workpiece joining jig assembly 808 includes the third dust collection system 764. Accordingly, movement and the attachment of the dovetail pins template 528 as well as the flow of dust from the workpiece 646 is the same as that described with the fourth workpiece joining jig 736 (FIG. 46) described above.

The fourth workpiece joining jig assembly 736 (FIG. 46), the fifth workpiece joining jig assembly 792 (FIG. 50) and the sixth workpiece joining jig assembly 808 (FIG. 51) each include the clamping bar arrangement 516 (FIGS. 46, 50, 51) for routing a workpiece 646 when the templates 524, 526, and 528 (FIGS. 46, 50, 51) are attached to the template holding jig 502 (FIGS. 46, 50, 51). While clamping arrangement 516 will be described with respect to the sixth workpiece joining jig assembly 808 (FIG. 52) it should be understood to be applicable to the fourth workpiece joining jig assembly 736 (FIG. 46), and the fifth workpiece joining jig assembly 792 (FIG. 50)

Figure 48:
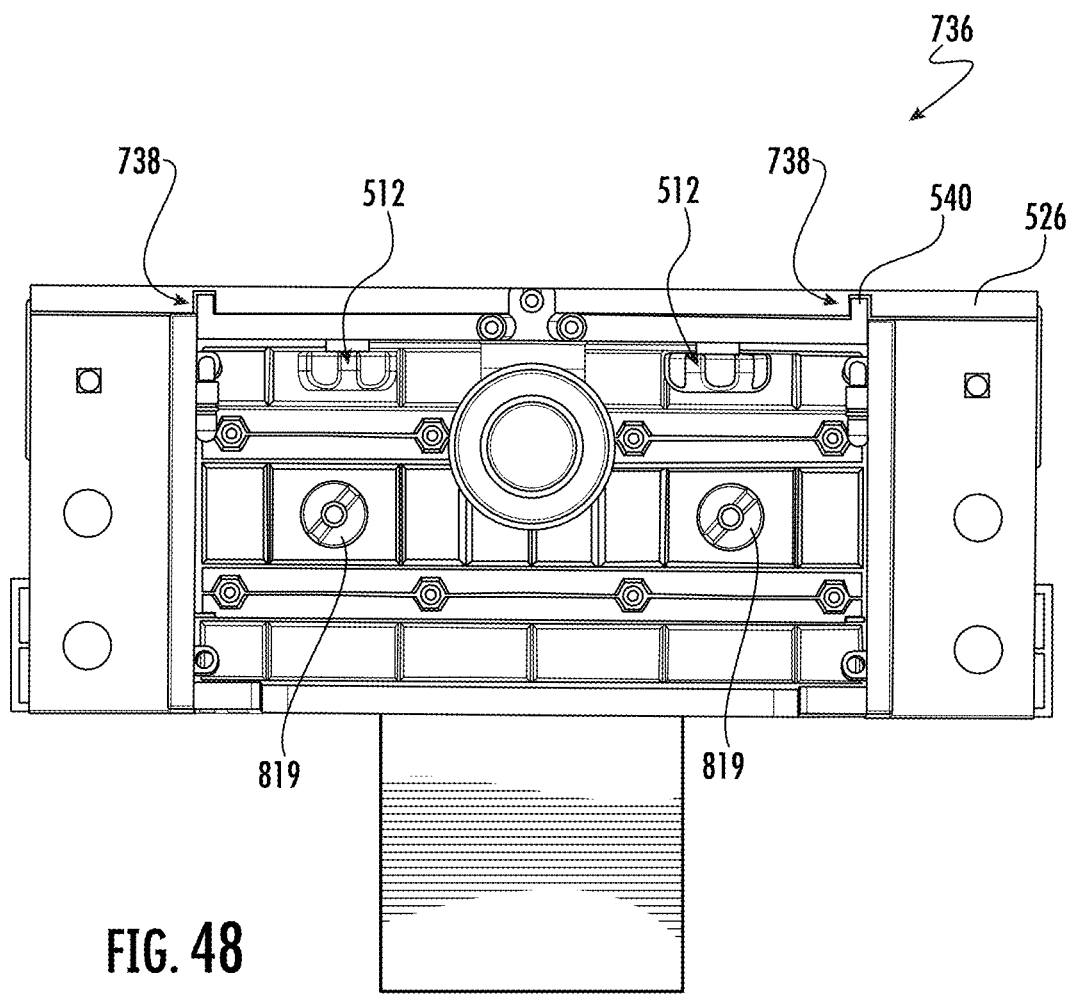
FIG. 48 is a rear view of the fourth workpiece joining jig assembly of FIG. 46.
Figure 52:
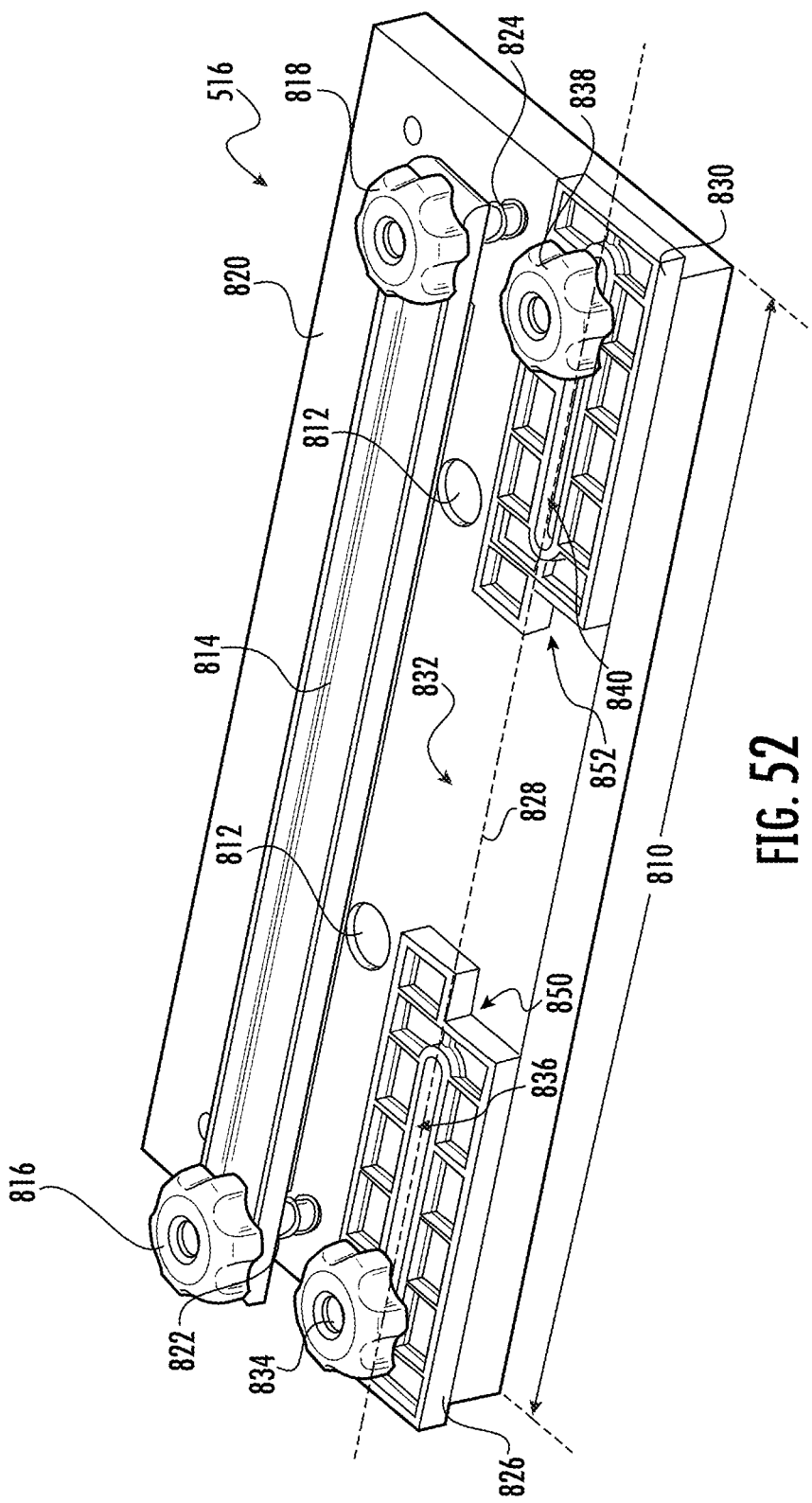
FIG. 52 is a front right side view of a clamping bar arrangement of the sixth workpiece joining jig assembly.
Figure 53:
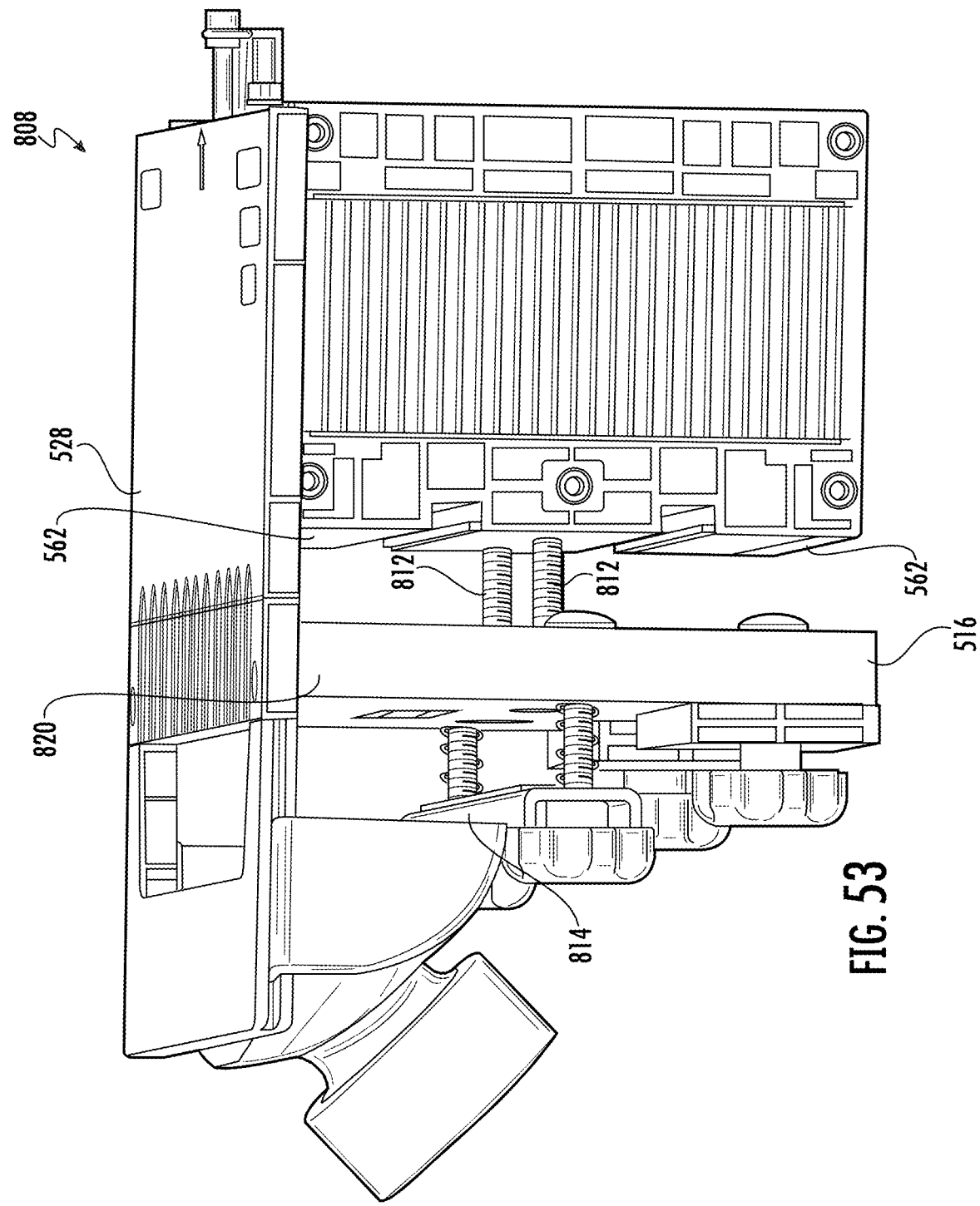
FIG. 53 is a side partial assembly view of the sixth workpiece joining jig assembly of FIG. 51.

With reference to FIGS. 52 and 53, clamping bar arrangement 516 is shown alone in FIG. 52 while FIG. 53 illustrates a partial assembly view to the sixth workpiece joining jig assembly 808. Clamping bar arrangement 516 has a total width 810 that is greater than the total width 584 (FIG. 29) of the template holding jig 502. Clamping bar arrangement 516 is removably fixed to the workpiece support 562 with fasteners 812 that are inserted through holes 815 in a base 820 of the clamping bar arrangement 516 and through holes 815 (FIG. 29) of the workpiece support 562 where they may be secured with nuts 819 (FIG. 48). Accordingly, with this arrangement, it can be readily appreciated that the clamping bar arrangement 516 is removably fixed to the workpiece support 562 such that it can be removed to permit the template holding jig 502 to be used with other templates or clamps and/or workpieces for routing.

Clamping bar arrangement 516 includes a clamping bar 814 having a width slightly less than the width 810 of the clamping bar arrangement 516. A longitudinal axis of the clamping bar extends in directions parallel to the width 810. The clamping bar 814 is attached via fasteners 816, 818 to a base 820 of the clamping bar arrangement 516. Springs 822, 824 surround a threaded portion of respective fastener 816, 818 such that the springs 822, 824 are located between the clamping bar 814 and the base 820 to provide a biasing force in a direction toward the clamping bar 814 and away from the workpiece support 562 so as to create a gap between the clamping bar 814 and the base 820 and thereby permit the workpiece 646 to be inserted and clamped between the clamping bar 814 and the base 820 for a desired routing position relative to the dovetail pins template 528.

A first workpiece stop 826 is removably fixed to the base 820 with a fastener 834. A second workpiece stop 830 is removably fixed to the base 820 with another fastener 838. The first workpiece stop 830 is axially aligned along a longitudinal axis 828 of the base 820 with the second workpiece stop 830. The first workpiece stop 826 and the second workpiece stop 830 are spaced apart from one another along the longitudinal axis 828 to define a gap 832 therebetween. The gap 832 permits the workpiece 646 (FIG. 53) to be inserted therein and aligned to provide for the desired routing position of the workpiece 646 (FIG. 51).

The fastener 834 is received in a first slot 836 defined by the first workpiece stop 826 to selectively position the first workpiece stop 826. The other fastener 838 is received in a second slot 840 defined by the second workpiece stop 830 to selectively position the second workpiece stop 830. The major axis of the first slot 836 and the major axis of the second slot 840 extend along the same axis 828 and thus are axially aligned. The first workpiece stop 826 and the second workpiece stop 830 are each independently moveable relative to one another in directions parallel to the first axis 120.

The ends 850, 852 of the workpiece stops 826, 830 are stepped.

Figure 54:
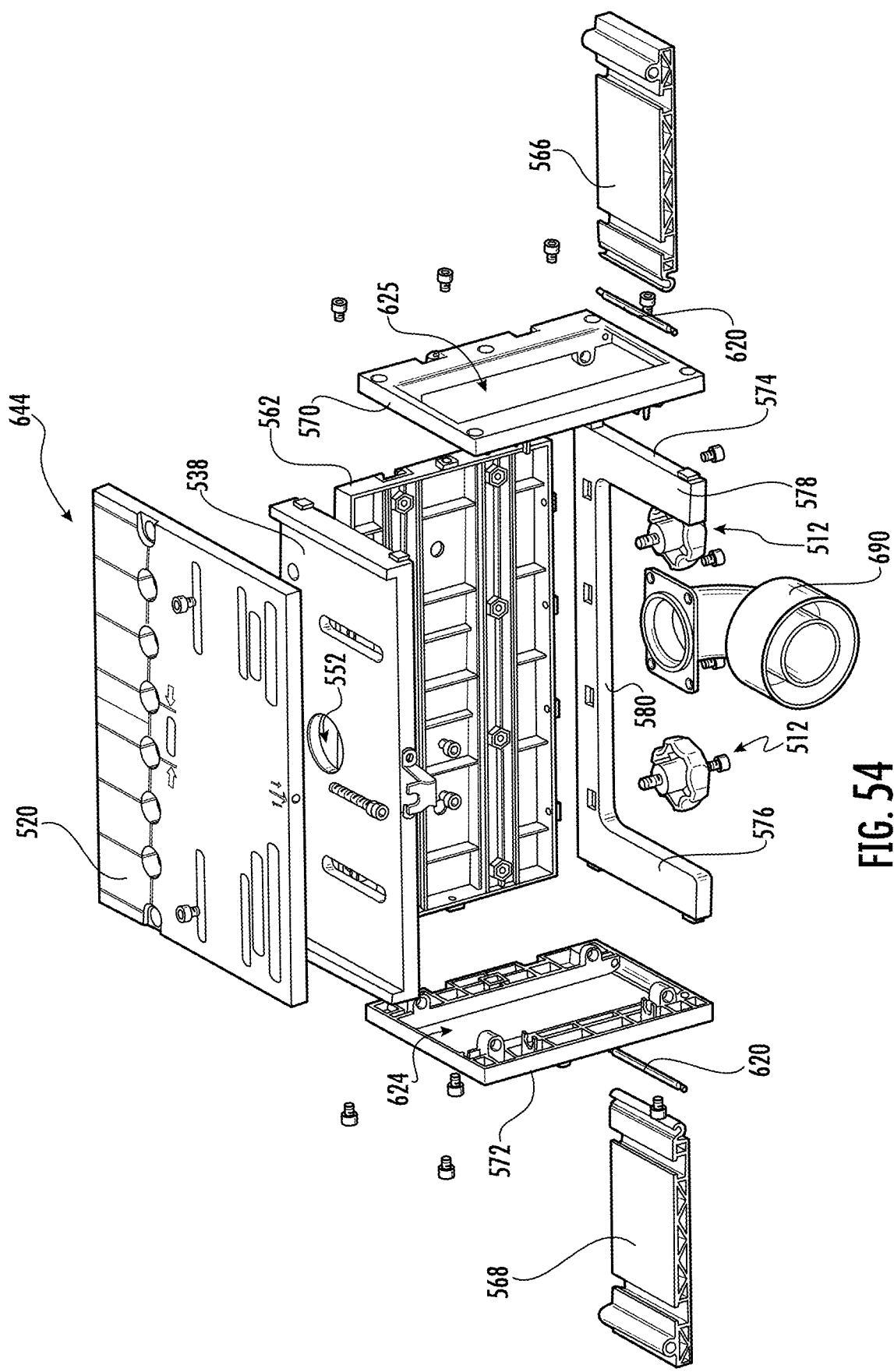
FIG. 54 is a back assembly view of the first workpiece joining jig assembly of FIG. 34 without clamps or workpiece.

FIG. 54 illustrates a back assembly view of the first work piece joining jig assembly 644 with micro-adjustment pin template 520 removably attached to template support 538 with template fasteners 512. Template holding jig 502 is shown in assembly view including base 574 with first leg 576, second leg 578 and third leg 580. Template holding jig 502 includes template support 538, workpiece support 562, and opposed sidewalls 570, 572. Opposed sidewalls 570, 572, define sidewall apertures 624, 625 respectively and opposed side panels 566, 568. Opposed side walls 570, 572 are pivotably attached to sidewalls 570, 572 via pins 620. Coupling 690 receives the flow of dust from vacuum aperture 552 defined by template support 538.

Figure 56:
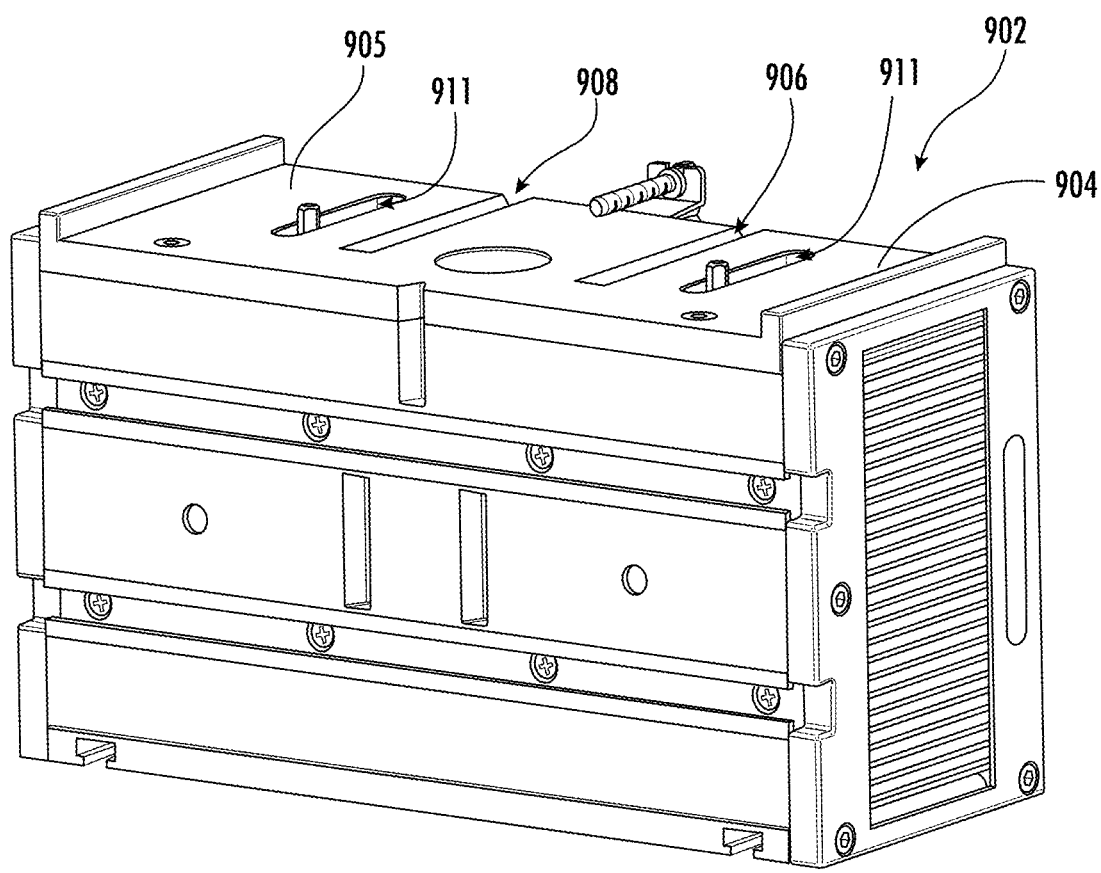
FIG. 56 illustrates another embodiment of template holding jig.

Turning now to FIG. 56, another embodiment of a template holding jig 902 is illustrated. The template holding jig 902 with template support 904 is similar to that which was described above with respect to template holding jig 502 (FIG. 34) and template support 538 (FIG. 34) except for the differences described below.

Template support 904 includes a top surface 905 having a groove 906 and a groove 908 in the top surface 905 of the template support 904. The grooves 906, 908 are spaced apart from one another and are parallel to one another. The grooves 906, 908 are also parallel to and spaced apart from slots 909, 911.

Figure 57:
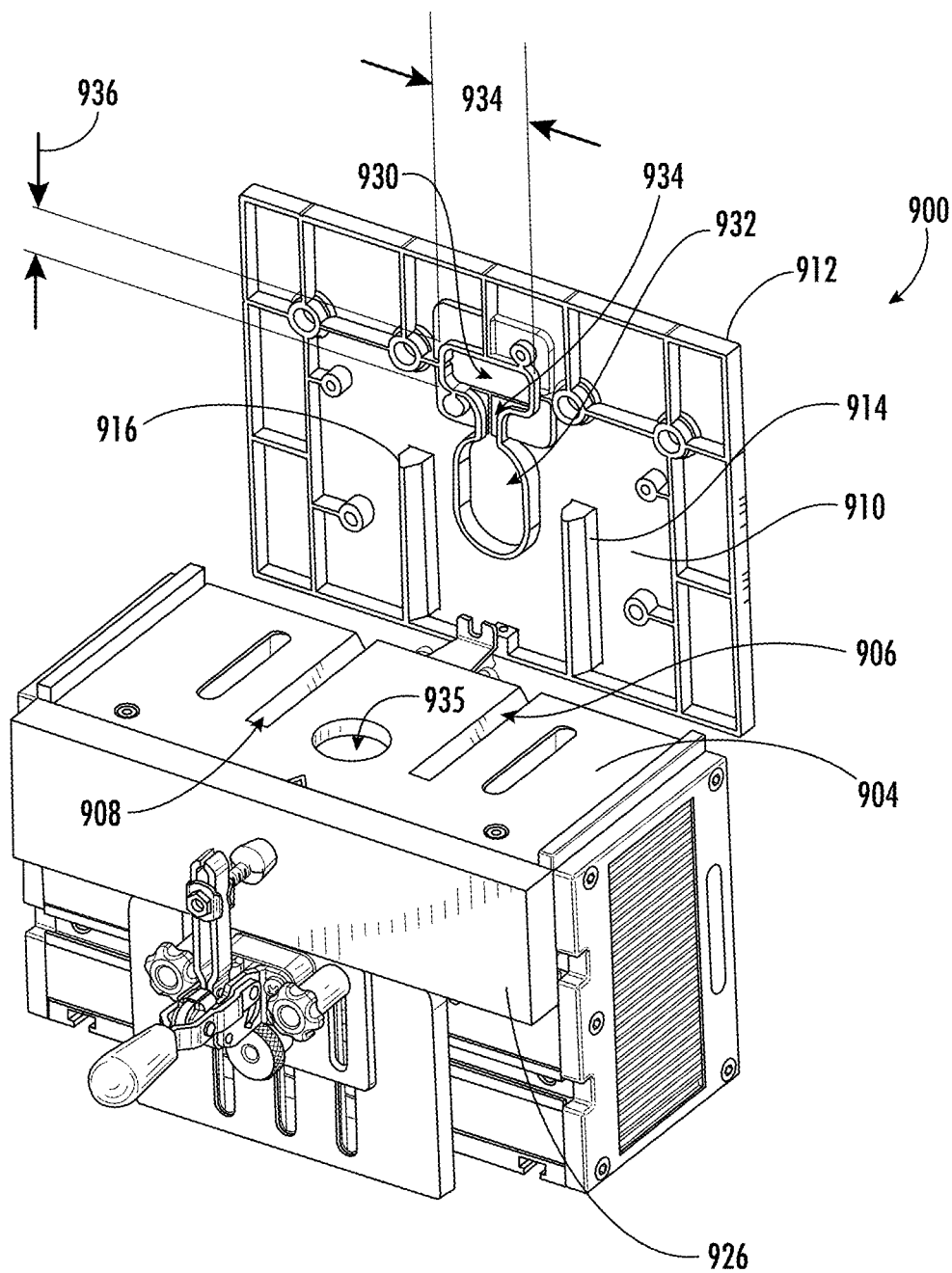
FIG. 57 illustrates a partial assembly view of a seventh workpiece joining jig.
Figure 58:
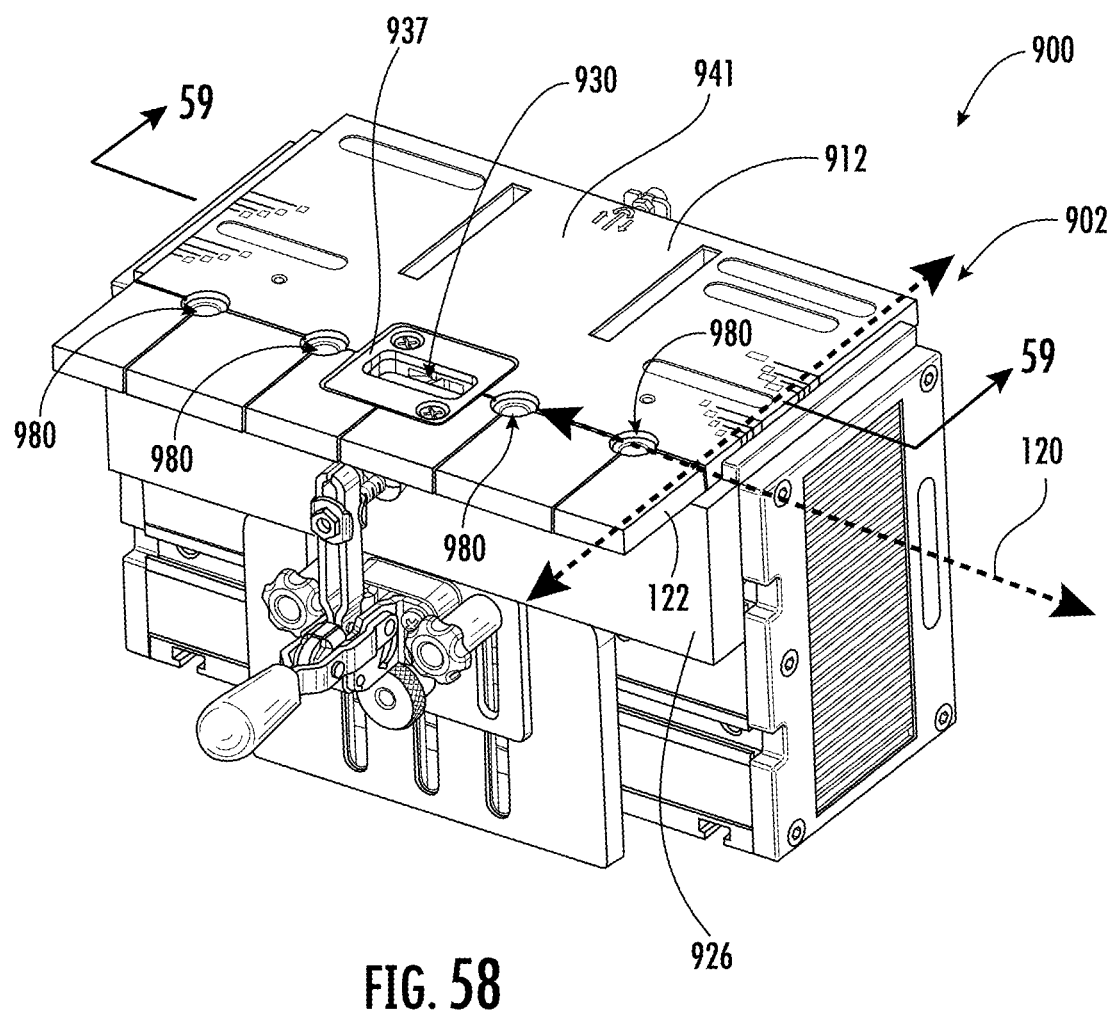
FIG. 58 is an isometric view of the assembled workpiece joining jig of FIG. 57.

FIG. 57 illustrates a partial assembly view of a seventh embodiment of a workpiece hold jig 900 showing the bottom surface 910 of a domino template 912 that includes a first alignment projection 914 and a second alignment projection 916. The alignment projections 914, 916 cooperate with the grooves 906, 908 such that the alignment projections 914, 916 are spaced apart the same distance as the grooves 906 and 908. The first and the second alignment projections 914, 916 are received at least partially in the grooves 906, 908 when the domino template 912 is positioned on the template holding jig 902 as seen in FIG. 58.

Figure 59:
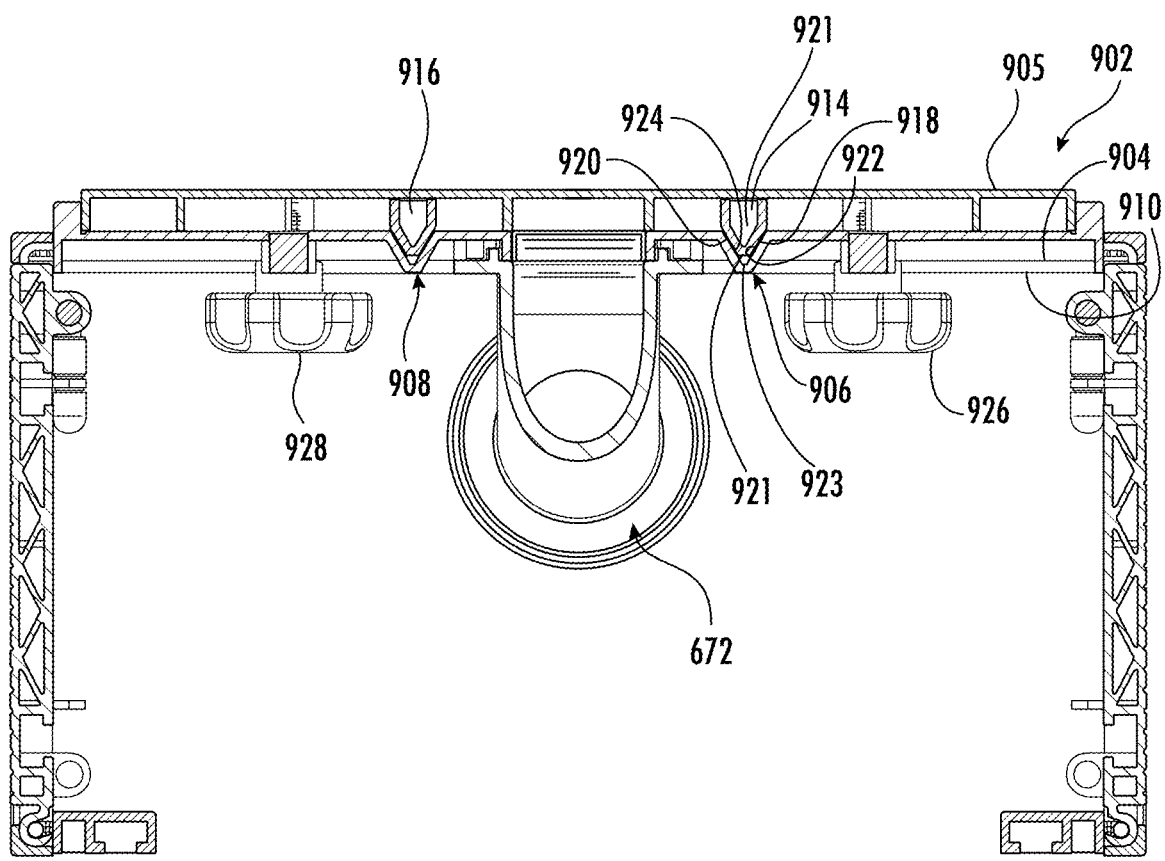
FIG. 59 is a vertical cross-section taken about line 59-59 of the workpiece joining jig of FIG. 58.

The cross section of FIG. 59 better illustrates the trapezoidal shape of each of the alignment projections 914, 916. Alignment projection 914 will be described but said description as readily understood from FIG. 59 applies equally to alignment projection 916. So too, the shape of grooves 906, 908 are the same and only the shape of groove 906 will be described.

Alignment projection 914 includes a pair of sides 918, 920 spaced apart on a body 921 of the alignment projection 914 and converging towards one another to a planar bottom 923 of the body 921 defining another side of the alignment projection 914. The converging sides 918, 920 abut against converging sides 922, 924 of the groove 906 to self-center the domino template 912 on the template holding jig 902 and template support 904. By converging sides 922, 924 of the groove 906 it is meant that the grooves open upward relative to a working position of the template holding jig 902.

Thus, the greatest distance between the converging sides 922, 924, is located at the top surface 905 of the template support 904. The converging sides 922, 924 intersect, that is meet at a bottom 923 of the groove 928 in the template support 904. Thus, the sides 922, 924 converge towards one another as they extend from the top surface 905 towards the bottom surface 910 of the template support 904.

The converging sides 918, 920 of the alignment projection 914 abut against the sides 922,924 of the groove 906 to self-center the domino template 912. Once the domino template 912 has been self-centered and the template fasteners 926, 928 have been received in the domino template 912, the domino template 912 remains slideable on the top surface in directions parallel to the second axis 122 (FIG. 58) to position the domino template 912 to the desired position over the workpiece 926 such that the template fasteners 926, 928 can be tightened to removably fix the domino template 912 on the template holding jig 902.

In the embodiment shown the greatest distance between the converging sides 918, 920 of the alignment projection 914 may be greater than the greatest distance between the converging sides 922, 924 of the groove 906. This may raise the bottom surface 910 domino template 902 slightly above the top surface 906 of the template support 904 by a distance of between 0.40 and 0.60 millimeters (mm) when the domino template 912 is properly positioned on the template holding jig 902. In a preferred embodiment the distance is zero, however machining tolerances result in the foregoing relationship between the greatest distance between the converging sides 918, 920 and between the converging sides 922, 924. This arrangement maintains the parallelism and centering of the domino template on the template support 904 to ensure proper alignment of the domino template relative to the workpiece 926.

Each of the templates 518, 520, 522, 524, 526, 528 (FIG. 28) previously described may include the alignment projections 914, 916 such that each template 518, 520, 522, 524, 526, 528 (FIG. 28) is useable with template holding jig 902 and such embodiments are referred to respectively as templates 1056, 1058, 1060, 1062, 1064, 1066. Indeed, the self-centering feature of the alignment projections 914, 916 serve to ensure even further self-centering accuracy than that which is provided by the template guide 540 (FIG. 29) with its first wall 542 (FIG. 29) and second wall 544 (FIG. 29).

As with templates 518, 520, and 522, domino template 912 uses a dust collection system 672 (FIG. 55). With respect to FIGS. 57 and FIG. 58, a router bit (not illustrated) protrudes through a domino slot 930 in the domino template 912 to route the workpiece 926. Dust from the workpiece 926 that is being routed flows through a collection region 932 that surrounds the domino slot 930 to provide a flow channel 934 to allow the dust to flow from the flow channel 934 through the vacuum aperture 935 of the template support 904.

Figure 64:
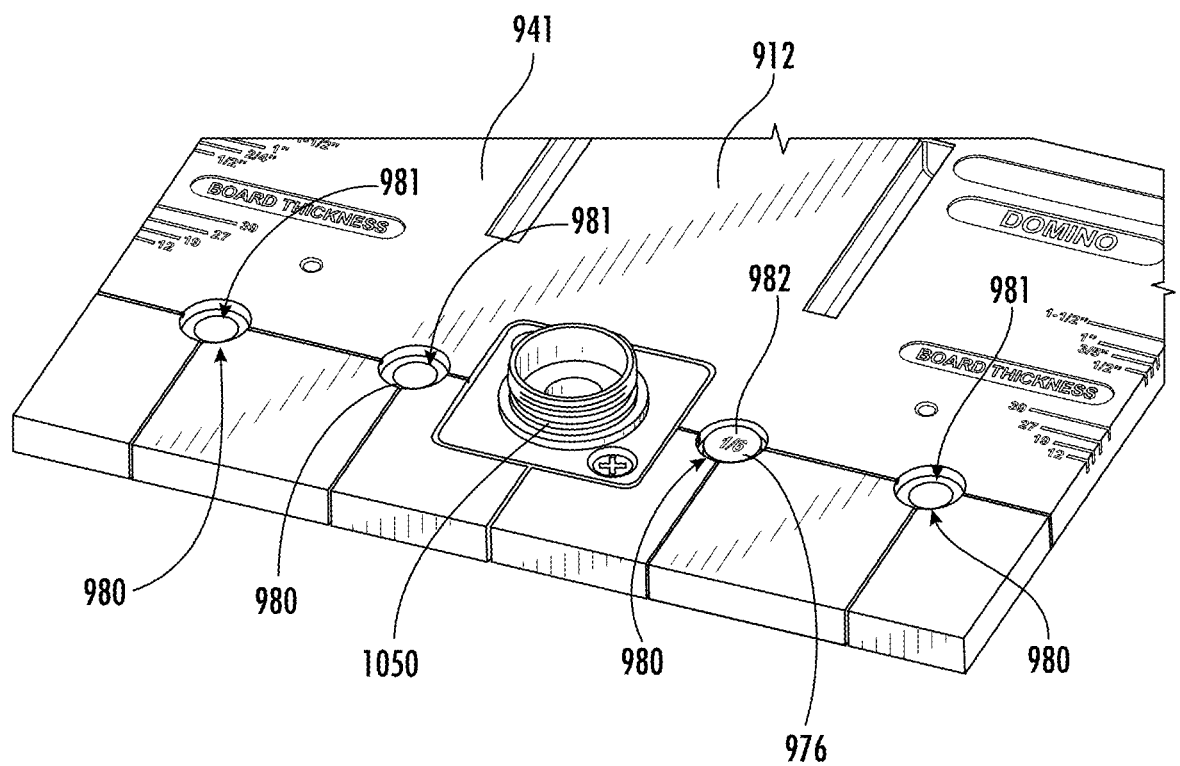
FIG. 64 is an enlarged partial top view of the domino template of FIG. 58 with a router bushing inserted therein.

Domino slot 930 in the template support 904 has a first length 934 and a first width 936 to accommodate a first domino (not illustrated). The domino slot 930 receives an insert 936 therein. The insert 936, when seated in the domino slot 930 has a top surface 939 that is flush with the top surface 941 of the template support 904 to provide a flat surface for the router (not illustrated). As seen in FIG. 64 the insert 936 of the domino template 912 can receive a router bushing 1050 for guiding a router bit (not illustrated).

Figure 60:
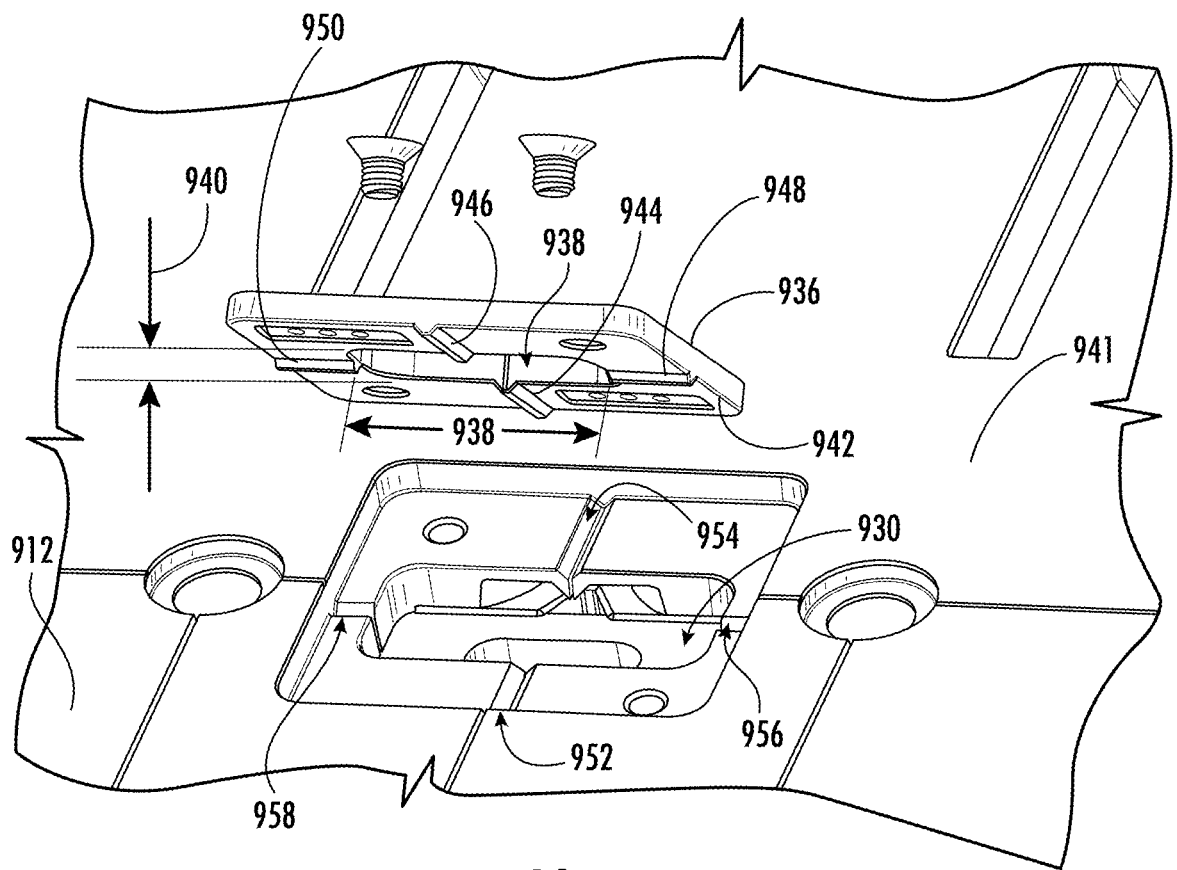
FIG. 60 is an enlarged partial assembly view of the domain template of FIG. 58.

As seen in FIG. 60, the insert 936 may be inserted and fastened in the domino slot 930, for example with fasteners such as screws 937 to provide, relative to slot 930, an insert slot 933 that has a second length 938 and or a second width 940 that are less than the first length 934 and or the first width 936 of the domino slot 930.

A bottom surface 942 of the insert 936 may include alignment projections 944, 946, that extend in directions parallel to the second axis 122 (FIG. 58). The bottom surface 942 may also include alignment projections 948, 950 that extend parallel to the first axis 120 (FIG. 58). The alignment projections 944, 946, 948, 950 have the same the trapezoidal shape of the alignment projections 914, 916 (FIG. 59). The alignment projections 944, 946, 948, 950 are received, respectively, at least partially into grooves 952, 954, 956 and 958 to self-center the insert 936 in the domino slot 930 in the same manner discussed above with respect to alignment projection 914 and groove 906.

Figure 61:
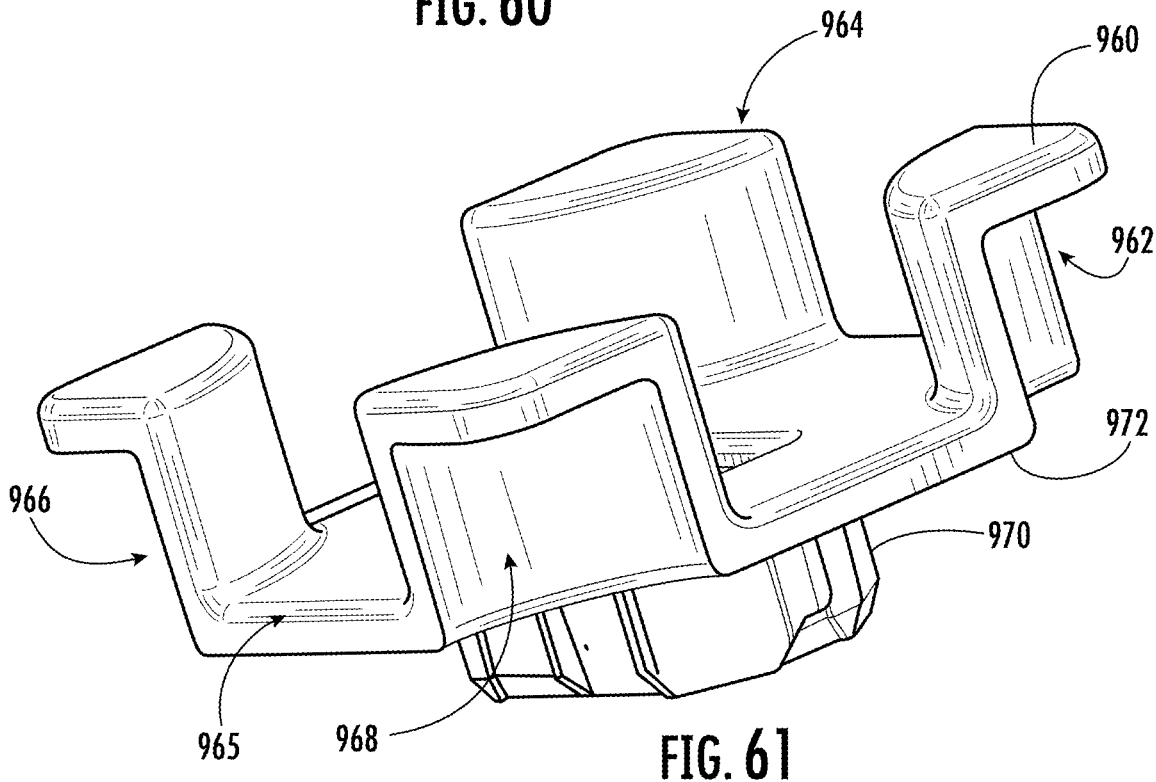
FIG. 61 illustrates an embodiment of a domino template insert.

FIG. 61 illustrates another embodiment of an insert 960 that may be considered a centerline alignment insert. The insert 960 may be inserted in the slot 930 (FIG. 60) of the domino template 912. Gripping regions 962, 964, 966, 968 located at least partially gravitationally above, that is upward, of the top surface 941 of the domino template 912 may be provided by insert 960 to facilitate ease of insertion into and removal from a friction fit of the insert 960 in the slot 930. Alignment projection 970, that is an insertion portion protrudes from a bottom surface 972 of a head portion 965 and is sized and shaped, to provide for the friction fit. The head portion 965 is sized larger than the router guide region 930 (FIG. 60) such that it does not pass through the router guide region 930 when the insert portion 970 is received in the router guide region 930.

Figure 62:
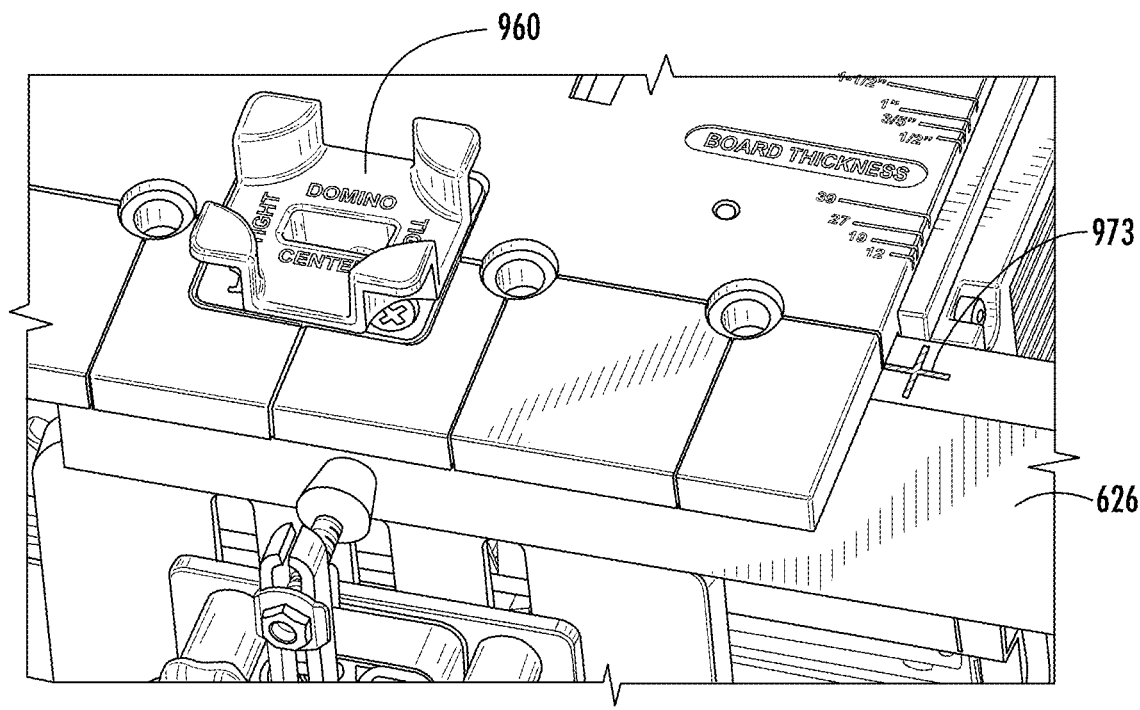
FIG. 62 is another enlarged partial view of the workpiece joining jig with the insert of FIG. 61.
Figure 63:
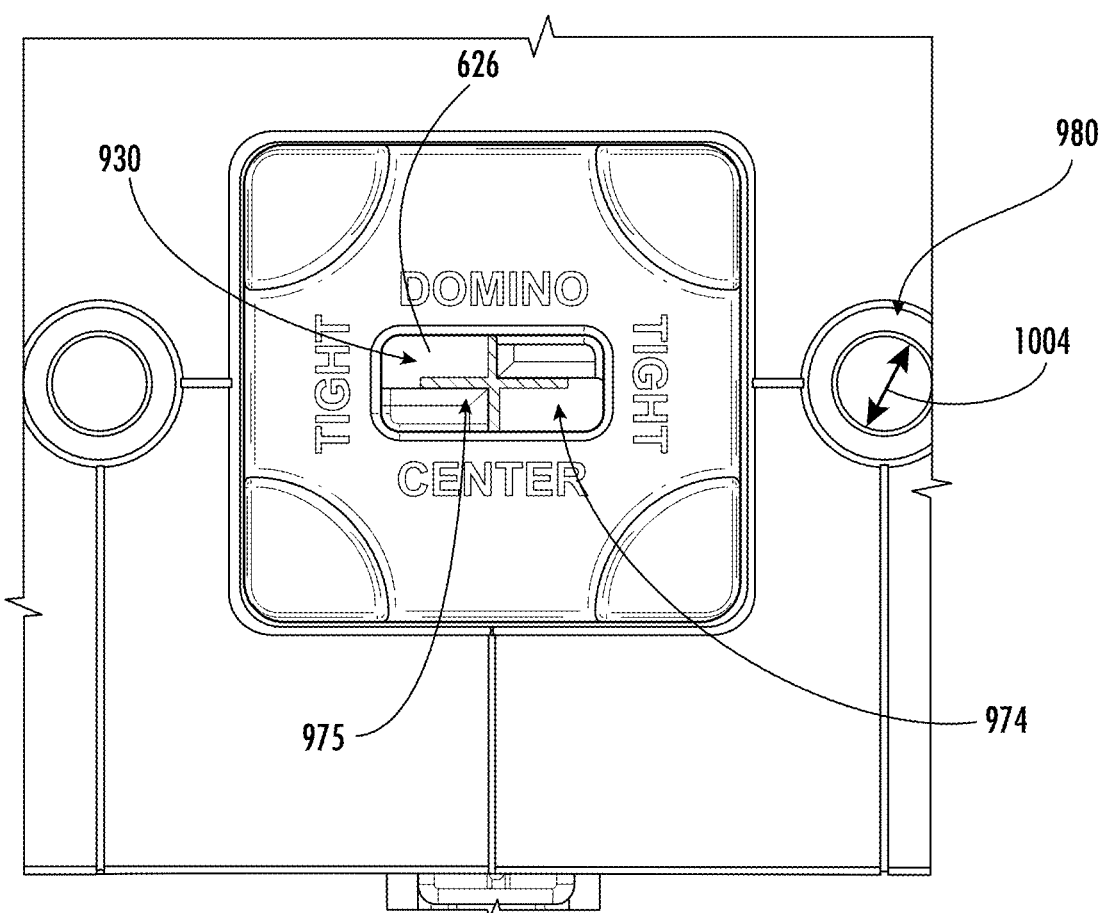
FIG. 63 is top view of the insert of FIG. 61.

As seen in FIGS. 62 and 63, where the workpiece 626 is pre-marked with a desired location to be routed, the mark 973 is typically formed by the intersection of two lines or a center point. Insert 960 has an alignment region 975 defining a slit 974 that is smaller in dimension then the slot 930 which is a router guide region. When the workpiece 926 is abutted against the workpiece support 963, the user is able to view through the slot 930 and the alignment region to visually align the alignment region 975 with the mark 973. The alignment ensures accurate routing of the workpiece 926 at the intersection/center 973. The slit 974 may be between 0.7-1.3 mm in width 961. In a preferred embodiment the width 961 may be between 0.8 and 1.2 mm and in another preferred embodiment may be between 0.9 and 1.1 mm. 975

Figure 65:
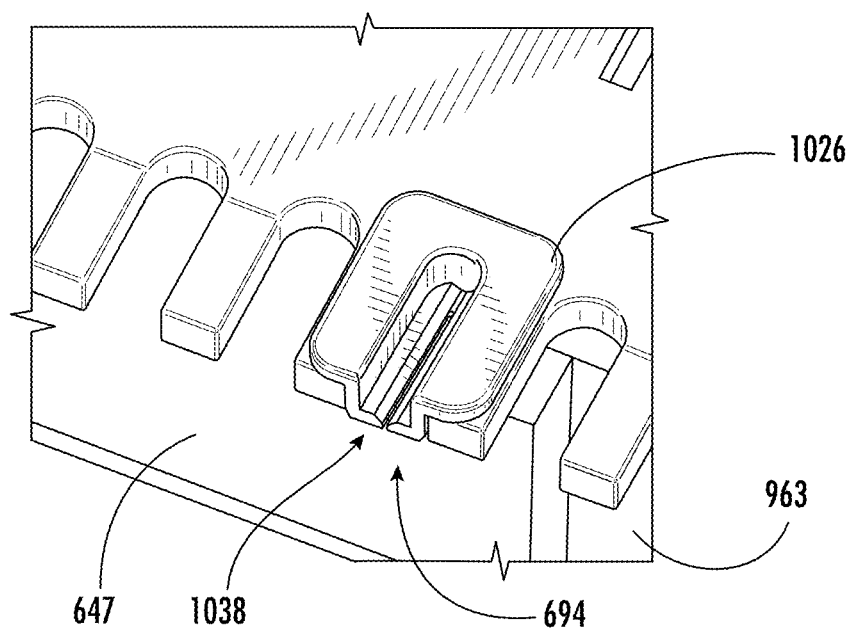
FIG. 65 illustrates a top view of another embodiment of an insert inserted in an open ended slot of dovetail template.
Figure 66:
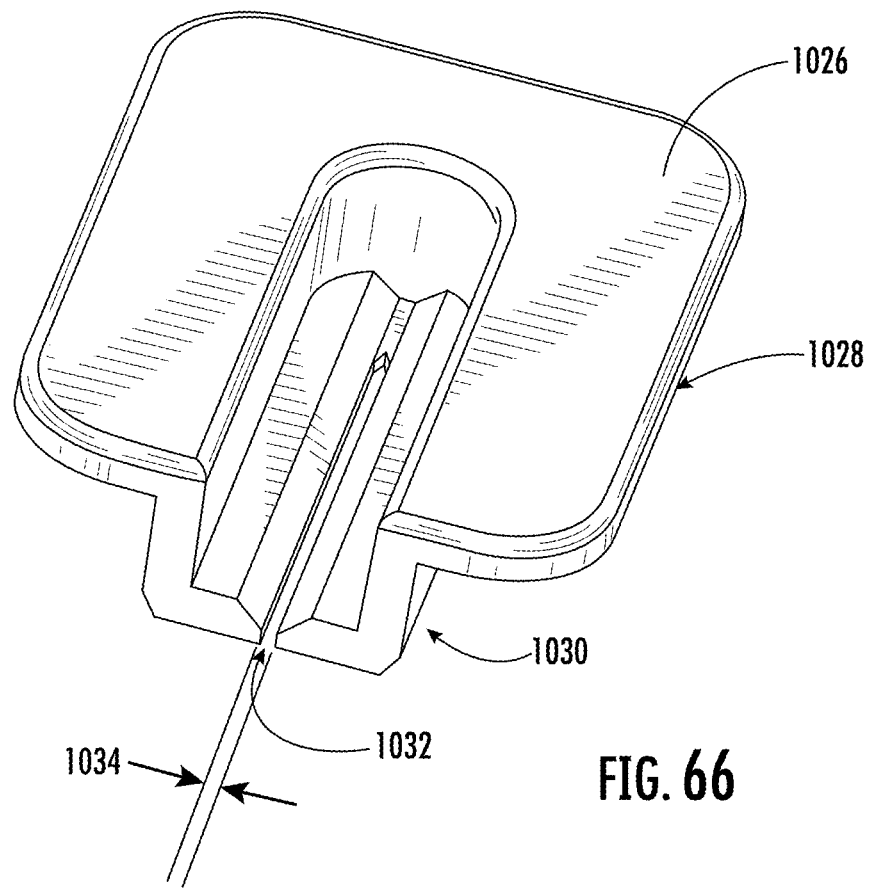
FIG. 66 illustrates an isometric view of the insert of FIG. 65.

Turning to FIGS. 65 and 66, another insert 1026 that is a centerline alignment insert may be provided for use, for example with templates 518 (FIG. 28), 520 (FIG. 28) and 522 (FIG. 28) and 524 (FIG. 28). The insert 1026 includes a head portion 1028 and an insert portion 1030 that extends from the head portion 1028. The insert portion 1030 is sized to extend into the open ended slot 694 that is a router guide region. The head portion 1028 is sized larger than the open ended slot 694 such that it does not pass through the open ended slot 694 when the insert portion 1030 is received in open ended slot 694.

The insert provides for a slit 1032 that is smaller in dimension including width of the slot then a width of the open ended slot 694. The slit 1032 is an alignment region through which the user is able view the mark 973 to ensure accurate routing of the workpiece 926 at the mark 973 (FIG. 62) when the workpiece 647 is abutted against the workpiece support 963.

Figure 67:
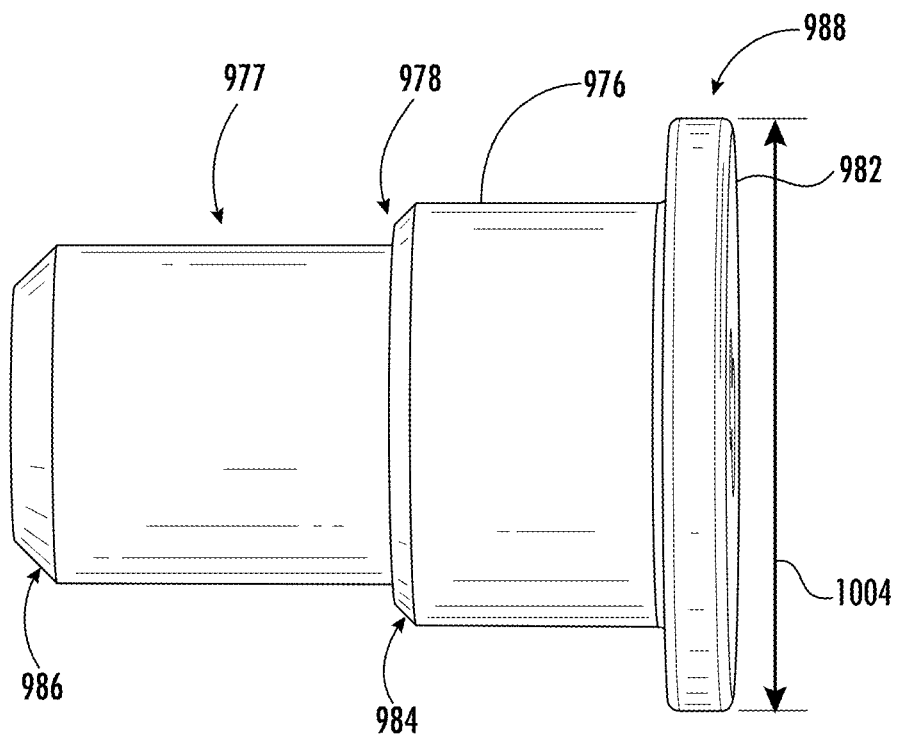
FIG. 67 illustrates a pin for the domino template of FIG. 58.
Figure 68:
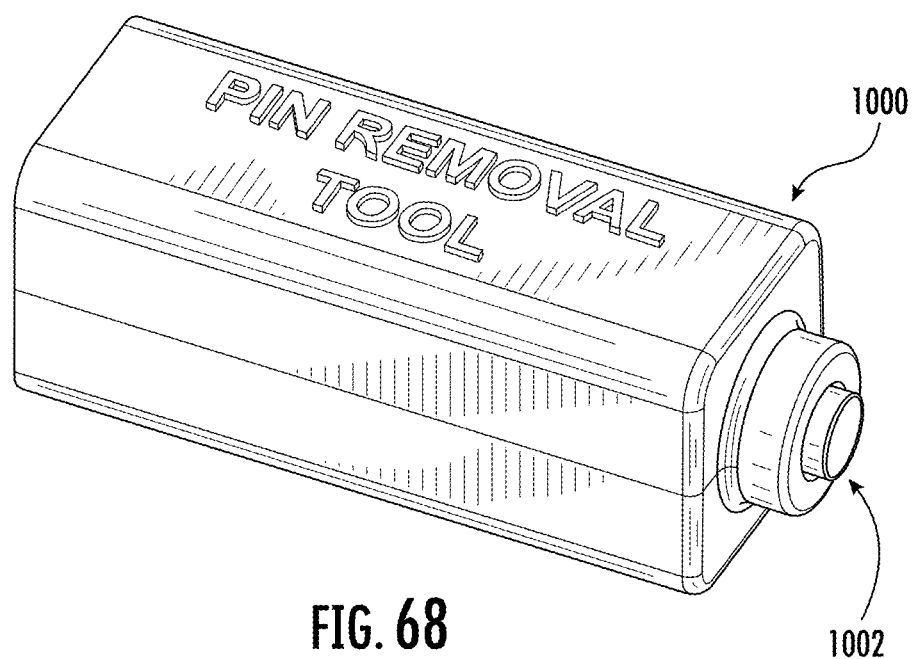
FIG. 68 illustrates a magnet removal tool for removing the pin of FIG. 67.
Figure 72:
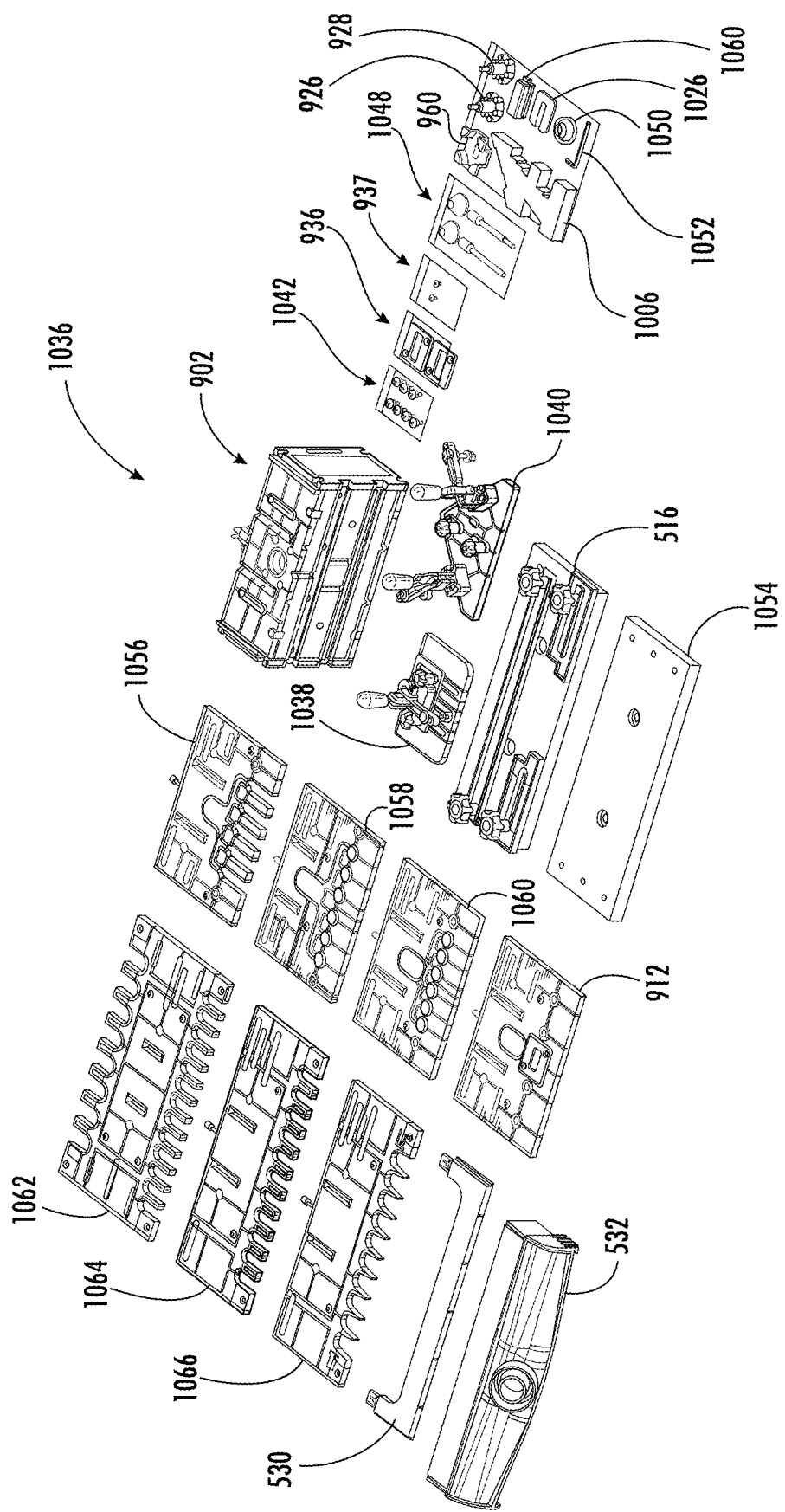
FIG. 72 illustrates a workpiece joining jig kit providing for various workpiece joining jig assemblies.

The work piece 647 may be aligned by inserting the insert 1026 insert into the open ended slot 694. The workpiece 647 is then located against the workpiece support 963. The workpiece 647 is adjusted relative to the workpiece support 963 until a mark 973 (FIG. 62) on the workpiece 647 representing the desired location to be routed is visible within the slit 1032. The slit 1032 may be between 0.7-1.3 mm in width 1034. In a preferred embodiment the width 1034 may be between 0.8 and 1.2 mm and in another preferred embodiment may be between 0.9 and 1.1 mm Domino template 912 (FIG. 64) may use a pin 976 (FIG. 64, FIG. 67) that permits the alignment and extension of a hole pattern in a workpiece 926 (FIG. 58) that is a longer board. The pin 976 (FIG. 64, FIG. 67) is inserted into one of a plurality of pin holes 980 (FIG. 64) having a counter bore 981 therein such that the top surface 982 of the pin 976 is flush or below the top surface 941 of the domino template 912. The pin 976 has a stepped profile 978 (FIG. 67) with tapers at the ends 984, 986 (FIG. 67) to facilitate insertion and alignment of the pin 976 when seated in the pinhole 980. As readily appreciated at this point in the disclosure the pin 976 is usable with the dowel, shelf pin, and Hoffmann templates (FIG. 28, FIG. 72).

The pin 976 has at least at a portion of its head 988 defining its top surface 982 made of ferrous material. Because at least a portion of an outer most surface of the head 988 is ferrous, a magnetic tool 1000 having a magnetic end 1002 may be used to remove the pin 976 from the pin hole 980. The outermost diameter 1004 of the head 984 of the pin 976 is greater than the innermost diameter 1006 (FIG. 63) of the pinholes 980 such that the pin 976 does not fall through the pinhole 980 but instead only a portion 977 of the pin 976 extends completely through the pinhole 980.

Figure 69:
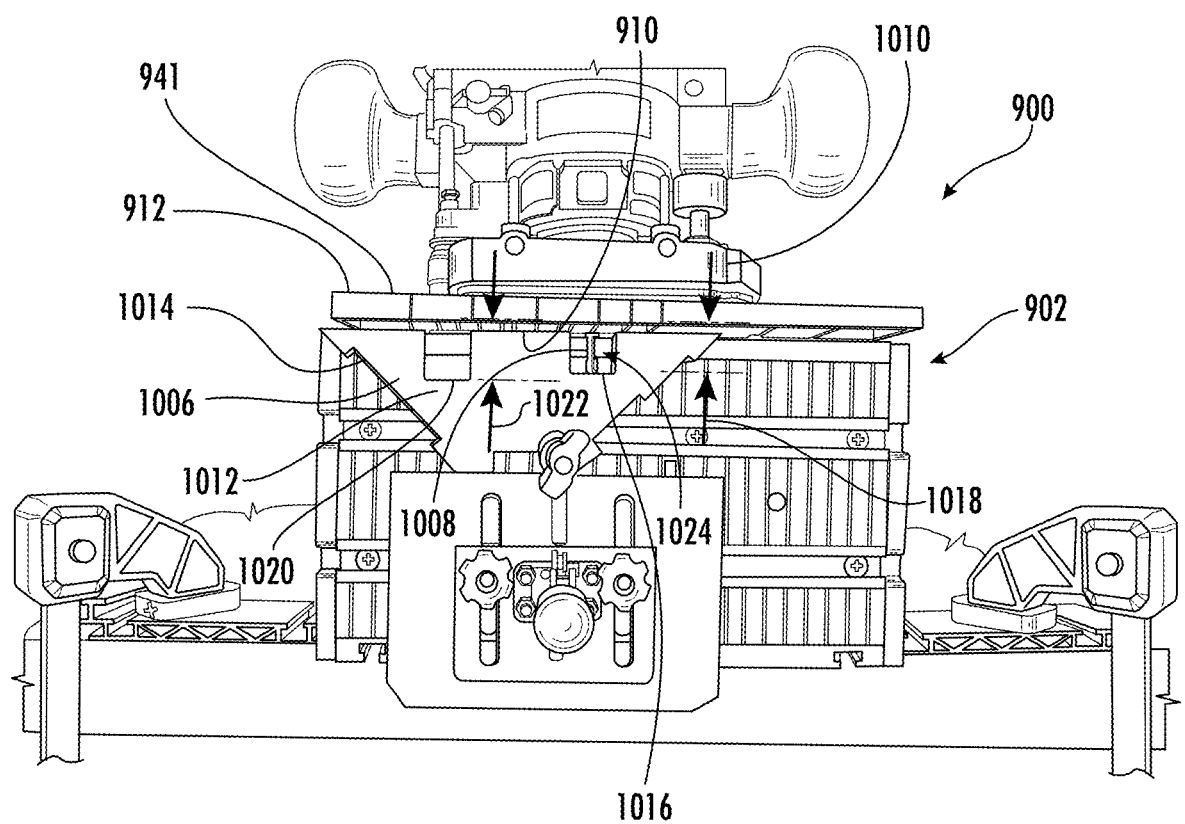
FIG. 69 illustrates a router in use with the domino template of FIG. 58 and with a router depth tool.
Figure 70:
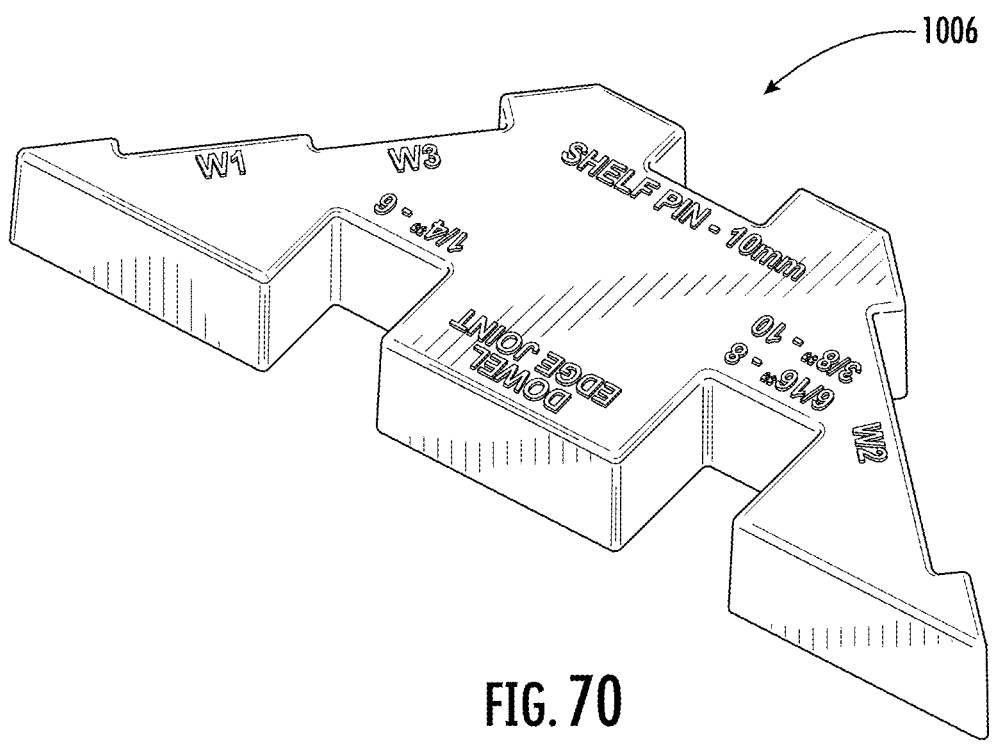
FIG. 70 illustrates an isometric view of the depth tool of FIG. 69.

Turning to FIG. 69 and FIG. 70, the workpiece joining jig assembly 900 may include a router depth tool 1006 that is useable with the template holding jig 902 and domino template 912. The router depth tool 1006 is also useable with templates 518, 520 and 522 (FIG. 28) and can be used, for example in a work bench clamp to adjust an extent 1018 of a router bit 1008.

The router bit depth tool 1006 has a body 1012 having an outer periphery 1014. A first router bit abutment 1016 is spaced inward a first distance 1018 from the outer periphery 1014 of the body 1012 defining a first extent that a router bit 1008 can extend into the body 1012 when the body 1012 is located below and against the bottom surface 910 of the domino template 912 with the first router bit abutment 1016 aligned with the slot 930 (FIG. 58). Slot 930 (FIG. 58) is considered a router guide region as are holes 674 (FIG. 38), open ended slots 694 (FIG. 43) and 794 (FIG. 50).

A second router bit abutment 1020 is spaced inward a second distance 1022 from the outer periphery 1014 of the body 1012 to define a second extent that the router bit 1008 can extend into the body 1012 when the body 1012 is located below and against the bottom surface 910 of the domino template 912. The second distance 1022 is different than the first distance 1018 and the second extent is different than the first extent.

As illustrated in FIG. 72 a router bit depth tool 1019 may have various shapes defining its outer periphery 1021 with sides 1023, 1025, 1027, 1029 defining router abutments 1031, 1033, 1035, 1037 and allowing for further abutments, said abutments being compatible for use with setting depths when using templates 518, 520, 522, (FIG. 28) and 912 (FIG. 58)

With respect to FIG. 70, a user can adjust the extent of the router bit 1008 extending below a bottom surface of the router 1010 using the workpiece joining jig assembly 900. The adjustment is done by locating the router 1010 on the top surface 941 of the domino template 912. Thereafter, the user can locate the body 1012 of the router bit depth tool 1006 against the bottom surface 910 of the domino template 912 with the first router bit abutment 1016 located aligned with the slot 930 that is a router guide region. The user can then abut a free end 1024 of the router bit 1008 against the first router bit abutment 1016 and then affix the router bit 1008 to the router 1010 such that the first extent 1011 is fixed as the depth of the router bit 1016.

At this point in the disclosure it can also be readily understood that the user can choose which router bit abutment 1016 or 1020 to use based on a desired routing depth. Moreover, the body of the depth tool 1006 could be provided with only one router bit abutment 1014, 1020 or a plurality of router bit abutments at various locations along the outer periphery 1014. Thus, for example, the user can locate the router 1010 on the top surface 941 of the template. Thereafter, the user can locate the body 1012 of the router depth tool 1006 against the bottom surface 910 of the domino template 912 or another one of the templates, 518, 520 and 522 (FIG. 28) with the second router bit abutment 1020 located aligned with one of the router guide regions 930 or 674 (FIG. 38), 694 (FIG. 43) or 794 (FIG. 50). The user may then abut the free end 1024 of the router bit 1008 against the second router bit extent.

Figure 71:
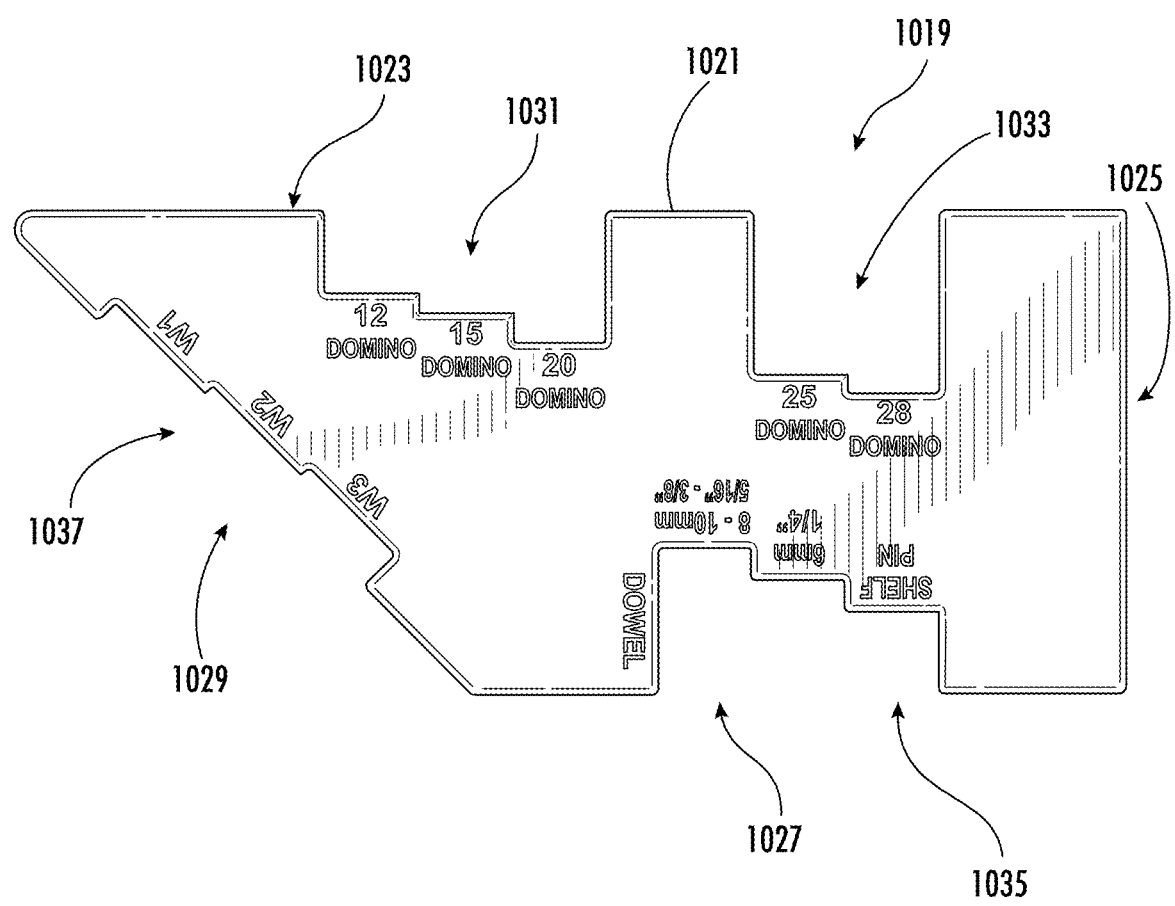
FIG. 71 illustrates another embodiment of a depth tool.

FIG. 71 illustrates another embodiment of workpiece joining kit 1036 that includes, the template holding jig 902, a workpiece stop clamping arrangement 1038, a miter fence clamping arrangement 1040, a plurality of spacer pins 976, domino template inserts 936 with fasteners 937, centering cones 1048 for centering a bottom plate of a router, insert 960, insert 1044 with center alignment feature 1044, template fasteners 926, 928, magnetic tool 1000, insert 1026, router bushing 1050, allen wrench 1052, router depth tool 1006, clamping bar arrangement 516 with backer board 1054, Hoffmann template 1056, a pin template 1058, a dowel template 1060, each template 1056, 1058, 1060 may include micro adjustment screw 533, a box joint template 1062, a dove tail template 1064, a dove tail pins template 1066, a router support 530, and a dust collector 532.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A workpiece joining jig assembly comprising:
   a template holding jig for holding a template for use with a router for routing a workpiece, the template holding jig comprising:
   a template support defining a template support plane;
   a workpiece support defining a workpiece support plane extending perpendicular to the template support plane;
   a template guide defining at least one abutment preventing motion of the template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane;
   a template attachment attaching a template to the template support;
   a vacuum arrangement comprising a cavity defined by a top surface of the template support and a bottom surface of the template, the vacuum arrangement defining a flow path for a flow of dust from the workpiece through an inlet of the cavity and an outlet of the cavity.

2. The workpiece joining jig assembly of claim 1, wherein the outlet is a vacuum aperture forming part of the vacuum arrangement and extending through the top surface of the template support and a bottom surface of the template support.

3. The workpiece joining jig assembly of claim 2, wherein the vacuum aperture is connected to and in fluid communication with a coupling configured for fluid communication with a source of vacuum, the coupling forming part of the vacuum arrangement.

4. The workpiece joining jig assembly of claim 3, wherein there is a fluid flow path through the inlet of the cavity, through the outlet of the cavity, and through the coupling.

5. The workpiece joining jig assembly of claim 3, wherein the coupling is attached to the bottom surface of the template support and surrounds the vacuum aperture.

6. The workpiece joining jig assembly of claim 1, wherein the template includes at least one router guide region through which a router bit extends in use, the inlet of the cavity is defined by at least one port in fluid communication with the router guide region.

7. The workpiece joining jig assembly of claim 6, wherein the at least one port includes a plurality of ports, each one of the plurality of ports is defined by a wall, the wall defining a height of the cavity and extending from the bottom surface of the template to a bearing surface of the template.

8. The workpiece joining jig assembly of claim 7, wherein the bearing surface bears against the top surface of the template support.

9. The workpiece joining jig assembly of claim 6, wherein the template includes a plurality of router guide regions through which a router bit extends in use, the inlet of the cavity is defined by a plurality of ports, each router guide region has a corresponding port in fluid communication therewith;
    the cavity includes a collection region and a plurality of flow passages, the fluid flow passages fluidly connecting the plurality of ports with the collection region.

10. The workpiece joining jig assembly of claim 9, wherein the collection region, flow passages, and ports define a dust collection manifold, the manifold is defined by a wall.

11. The workpiece joining jig assembly of claim 10, wherein the collection region at least partially covers the vacuum aperture, the flow path extending from the collection region through the vacuum aperture through the coupling.

12. The workpiece joining jig assembly of claim 9, wherein the router guide regions are in the form of through holes extending through the top surface of the template and the bottom surface of a template for receiving a router bit there through.

13. The workpiece joining jig assembly of claim 12, wherein a continuous wall extends around the plurality of through holes and the continuous wall defines the plurality of ports, the flow passages, and the collection region, the wall defining a height of the cavity and extending from the bottom surface of the template to a bearing surface of the template.

14. The workpiece joining jig assembly of claim 13, wherein the flow path extends from the plurality of through holes, through the plurality of ports, through the flow passages, through the collection region, through the vacuum aperture, and through the coupling, the coupling configured for connection to a source of vacuum and extending the flow path into the source of vacuum.

15. The workpiece joining jig assembly of claim 9, wherein the router bit receiving regions are in the form of elongated open ended slots that extend through the top surface of the template and the bottom surface of a template for receiving a router bit there through;
    each open ended slot having a corresponding port from the plurality of ports associated therewith; and
    each corresponding port being located at an opposite end of the open end of the open ended slot.

16. The workpiece joining jig assembly of claim 15, wherein the ports, collection region, and flow passages are formed from a plurality of wall portions forming a discontinuous wall, the wall portions of the discontinuous wall defining a height of the cavity and extending from the bottom surface of the template to a bearing surface of the template.

17. The workpiece joining jig assembly of claim 16, wherein the flow path extends from the plurality of open ended slots, through the plurality of ports, through the flow passages, through the collection region, through the vacuum aperture, and through the coupling, the coupling configured for connection to a source of vacuum.

18. The workpiece joining jig assembly of claim 9, wherein the template support includes:
    a first through slot having a major axis extending in directions parallel to the second axis;
    a second through slot having a major axis, the second through slot being spaced from the first slot in a direction parallel to the first axis;
    further comprising;
    a first fastener inserted from the bottom of the template support through the first slot and received into the template;
    a second fastener inserted from the bottom of the template support through the second slot and received into the template;
wherein the first and second fasteners moveable within the first and second slots, respectively, in directions along the major axes of the first and second slots, the template moveable with the fasteners;
wherein the collection region is sized to cover at least partially the vacuum aperture throughout the full extent of the movement of the template due to movement of the fasteners along the major axes of the first and second slots to provide a flow path from the collection region through the vacuum aperture.

19. A workpiece joining jig assembly comprising:
a template holding jig for holding a template for use with a router for routing a workpiece, the template holding jig comprising:
    a template support defining a template support plane;
    a workpiece support defining a workpiece support plane extending perpendicular to the template support plane;
    a template attachment attaching a template to the template support;
a template providing a plurality of router guide regions extending through a top surface and a bottom surface of the template, the bottom surface of the template abutting the template support;
a vacuum arrangement providing a flow path for a flow of dust generated by routing a workpiece with a router guided by the router guide regions;
wherein the vacuum arrangement includes a router support removably attached to the template proximate the plurality of router guide regions, the plurality of router guide regions being in the form of a plurality of open ended slots of the template;
wherein the vacuum arrangement further includes a dust collector removably attached under the router support on an opposite side of the template, the dust collector operably couplable to a source of vacuum;
wherein a dust collection cavity is defined by the router support and the dust collector, the dust collection cavity being positioned, at least in part, below the template support plane;
wherein the template includes a first mounting cavity proximate the open ended slots and a second mounting cavity proximate the open ended slots, wherein open ended slots are located between the first mounting area and the second mounting area;
wherein the router support includes a first arm having a first tab and a second arm having a second tab and a longitudinal member extending between the first arm and the second arm, wherein the first arm and the second arm define a gap facing the plurality of open ended slots;
wherein the first tab is received into the first mounting cavity, the second tab is received into the second mounting cavity to removably fix the router support to the template;
wherein the dust collector has a first side, a second side and a third side extending between the first side and the second side, wherein the dust collection cavity is surrounded, at least in part, by the router support, the first side, the second side and the third side;
wherein a first mounting flange extends from the first side of the dust collector;
a second mounting flange extends from the second side of the dust collector;

a first channel is defined by the first arm of the router support;

a second channel is defined by the second arm of the router support;

wherein the first mounting flange is received in the first channel and the second mounting flange is received in the second channel to mount the dust collector to the router support.

20. The workpiece joining jig assembly of claim 19, wherein the template is a box joint template or a dovetail template or a dovetail pins template.

21. The workpiece joining jig assembly of claim 19, further comprising, a clamping bar arrangement removably fixed to the workpiece support and located under the template to selectively position and secure the workpiece for routing, the clamping bar arrangement comprising:

a base having a length greater than a width of the workpiece support along a first axis being parallel to the workpiece support plane and the template support plane, the width being parallel to the first axis;

a clamping bar removably fixed to the base to clamp a workpiece to the base, the dust collector being located between the router support and the clamping bar.

22. The workpiece joining jig assembly of claim 21, the clamping bar arrangement further comprising:

a pair of fasteners removably fixing the clamping bar to the base;

wherein each one of the pair of fasteners include a spring mounted thereto, the spring acting between the base and the clamping bar, the spring biasing the clamping bar away from the base.

23. The workpiece joining jig assembly of claim 22, the clamping bar arrangement further comprising:

a first stop defining a first slot having a first major axis extending parallel to the first axis;

a second stop defining a second slot having a second major axis extending parallel to the first axis, the second stop being laterally spaced apart defining a gap between the first stop and the second stop;

a first fastener extending through the first slot to selectively fix the first stop to the base;

a second fastener extending through the second slot to selectively fix the second stop to the base;

wherein the first stop and the second stop are independently moveable in directions parallel to the first axis to selectively position the workpiece parallel to the first axis.

24. The workpiece joining jig assembly of claim 21, wherein the dust collector includes sealing members provided at an outer periphery of the dust collector facing the clamping bar arrangement.

25. The workpiece joining jig assembly of claim 24, wherein the outer periphery is defined by edges of the sides that face the clamping bar arrangement and wherein the sealing members are bristles.

26. The workpiece joining jig assembly of claim 1, further comprising a micro-adjustment arrangement connecting the template support to the template, wherein the micro-adjustment arrangement is actuatable to provide a force orthogonal to the workpiece support plane and parallel to the second axis to move the template in directions parallel to the second axis.

* * * * *